(12) United States Patent
Moriyama et al.

(10) Patent No.: US 7,613,983 B2
(45) Date of Patent: Nov. 3, 2009

(54) ERROR CORRECTION DEVICE OF OPTICAL DISK UNIT

(75) Inventors: Katsutoshi Moriyama, Yokohama (JP);
Yusuke Ikeda, Chigasaki (JP);
Tomoyuki Maekawa, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 690 days.

(21) Appl. No.: 11/473,180

(22) Filed: Jun. 23, 2006

(65) Prior Publication Data

US 2007/0011582 A1 Jan. 11, 2007

(30) Foreign Application Priority Data

Jun. 24, 2005 (JP) ............................. 2005-184842
Jun. 9, 2006 (JP) ............................. 2006-161034

(51) Int. Cl.
*H03M 13/00* (2006.01)
(52) U.S. Cl. ..................................... 714/769
(58) Field of Classification Search ................. 714/755, 714/761, 765, 769
See application file for complete search history.

(56) References Cited

U.S. PATENT DOCUMENTS 4,764,927 A * 8/1988 Izumita et al. .............. 714/761
5,696,774 A * 12/1997 Inoue et al. ................. 714/755
5,901,159 A * 5/1999 Ichikawa .................... 714/765

FOREIGN PATENT DOCUMENTS

| JP | 2000-132868 | 5/2000 |
|----|-------------|--------|
| JP | 3286205 | 3/2002 |
| JP | 2004-95081 | 3/2004 |

* cited by examiner

*Primary Examiner*—Shelly A Chase
(74) *Attorney, Agent, or Firm*—Oblon, Spivak, McClelland, Maier & Neustadt, L.L.P.

(57) ABSTRACT

An error correction device for an optical disk reproduction unit for reproducing recorded information from an optical disk recorded with a code row data added with an error code in the same direction as a sequence of recorded information in the recording portion of the optical disk, and recorded guide information recorded in an inerasable state as a guide for recording the code row data before the code row data is recorded, wherein a prepit decoder as a first position detection portion is configured to detect a physical configurational singular point in the recorded guide information as a first position, a second position generating portion is configured to generate a second position replacing the first position detected by the prepit decoder with the code row data position, and an error correction circuit is configured to erase-correct error in the code row data using the second position.

20 Claims, 52 Drawing Sheets

ERROR CORRECTION DEVICE OF OPTICAL DISK UNIT

CROSS REFERENCE TO RELATED APPLICATIONS

This application is based upon and claims the benefit of priority from the prior Japanese Patent Application No. 2005-184842, filed on Jun. 24, 2005 and No. 2006-161034, filed on Jun. 9, 2006, the entire contents of which are incorporated herein by reference.

BACKGROUND

1. Technical Field

The present application relates to an error correction device of an optical disk unit, and more in particular, it relates to an error correction device of an optical disk unit, which, when reproducing data recorded in the optical disk capable of recording information, corrects an error occurred on a correction block based on the position of a physical singular point according to the position where a physical singular point of an optical disk as recorded guide information exists.

2. Related Art

In a digital versatile disk (hereinafter referred to as DVD), as a recordable DVD, there exist DVD-RAM [Rewritable], DVD-R [Recordable]/RW [Re-recordable], +R/RW, and the like. A specific example of information recording in such recordable DVD will be described by using the drawings of Japanese Patent Application No. 2004-95081 (taken as Patent Document 1). In this recordable DVD, as shown in FIG. 14A in Patent Document 1, a guide groove (recorded guide) referred to as a groove for guiding a pickup of the optical disk unit is pre-formatted. This groove, as exaggeratedly shown in the Figure, slightly winds its way in a radial direction as referred to as "wobbling-tottering and swaying". A track configuration in which the groove winds its way in this manner is referred to as "wobbled land groove". Further, as shown in FIGS. 14B and 14C in Patent Document 1, in DVD-R/RW, a prepit 104 is engraved in advance in a land 101, which is a protruded portion between grooves 102.

The conventional optical disk unit is configured as shown in FIG. 20. After reading information recorded in an optical disk 1 by a pickup 2, a matrix amplifier 3 calculates signals from the optical detector 1 in the pickup 2, and outputs an RF signal, a wobble signal and a prepit signal. The RF signal is supplied to a demodulator circuit 4, and the wobble signal is supplied to a wobble PLL circuit 12. The prepit signal is supplied to a prepit decoder 13. These wobble signal and prepit signal are shown in FIG. 15A of Patent Document 1, and a sync frame 1 in FIG. 15A of Patent Document 1 is a sync frame of even-numbered position (even number sync frame/1488T), and a sync frame 2 in the Figure is a sync frame of odd-numbered position (odd number sync frame/1488T). The prepit signal as shown in FIG. 15B of Patent Document 1 is inputted to the prepit decoder 13 shown in FIG. 20.

The RF signal outputted by the matrix amplifier 3, at the time of reproduction, is outputted to a host computer 8 through the demodulator circuit 4, an error correction circuit 5, a correction RAM 6, and a data buffer circuit 7. At the time of recording, a recorded data is outputted to the data buffer circuit 7 from the host computer 8, and is inputted to a modulator circuit 10 through a parity generating circuit 9.

Incidentally, the wobble PLL circuit 12 outputs a wobble clock based on the wobble signal outputted by the matrix amplifier 3. Further, the prepit decoder 13 detects recorded guide information (preformat information) recorded with address information and the like on the optical disk 1 based on the wobble clock outputted by the wobble PLL circuit 12 and the prepit signal outputted by the matrix amplifier 3, and generates recording timing, thereby to output it to the modulator circuit 10.

The modulator circuit 10 modulates the recorded data added with parity to generate a modulating signal, and outputs the modulating signal to a laser control circuit 11 so that a sync of the generated modulating signal and a phase of the prepit are matched based on the recording timing generated by the prepit decoder 13. The laser control circuit 11 drives a recording laser of the pickup 2 and writes the recorded data on the optical disk 1. Here, a product code takes a parity of the inner code (PI) and a parity of the outer code (PO) as elements.

In the product code adopted in DVD, to utilize the feature such as "it is possible to perform an erasure correction by the outer code: PO (the inner code: PI) based on error position information on the inner code: PI (the outer code: PO)" for burst errors (continuous errors generated in the same direction as data rows continuously generated from the disk), it is common that error correction processing (hereinafter referred to as correction processing) for a PI code is performed first, and then, the correction processing for the PO code is performed. By utilizing this feature, in Japanese Patent Application Laid-Open No. 10-285053 (hereinafter referred to as Patent Document 2), by adding weights to burst error position information, it is made possible to correct an error pattern (burst error), which has been not possible to correct in the art prior to Patent Document 2.

In the system giving a priority to reproduction performance, it is often the case that correction processing is performed based on a correction applied once of PO. However, in case the reproduced data includes a number of errors and such errors are no longer possible to be corrected by the correction applied once of PO, an error correction processing such as increasing the number of correction times of PI or PO until correcting and exhausting all the errors by way of correction applied twice of PI-PO or correction applied thrice of PO-PI-PO is also considered.

Since DVD-R/RW records information in the groove as a concave portion formed on the disk surface as a physical format, it is, as described above, formed with a pit referred to as a land prepit, in which information such as addresses and the like are set in the land between grooves. In case the information recorded in the groove is read by scan by a beam spot, when a light quantity of the reflected light from the groove is small comparing with a light quantity of the reflected light from the prepit, the reflected light component from the prepit is operated as noises against the reflected light from the groove, thereby making it potentially difficult to detect information on the groove with high accuracy. To avoid this problem, there is proposed Japanese Patent Application Laid-Open No. 2000-132868 (hereinafter referred to as Patent Document 3), and in this Patent Document 3, a shape is used in which the effect of the prepit for the groove of the recording reproducing medium is minimized so as not to affect the reproducing signal.

As shown in the foregoing Prior Art, in general, since the reproducing signal reproduced from the disk such as DVD-R/RW media where the prepit information exists tends to be disturbed and is low in a level of data reproduction comparing with the disk such as a stamped DVD-ROM and the like, it is often the case that the correction applied twice of PI-PO is performed as a basis. Performing multiple corrections of PI and PO causes a delay of reproduction speed in order to secure the processing time, and thus, it has created a problem of decreasing the reproduction performance.

Further, in order to repeatedly perform multiple corrections of PI-PO while maintaining the reproduction speed until the error is completely corrected, the correction processing portion must be operated at high speed, and this has created a problem of increasing power consumption. Further, there is also a limit to high speed operation of the correction processing portion, and when reaching the limit, the correction processing is performed by delaying the reproduction speed. This also creates a problem of lowering the reproduction performance.

As described above, in the conventional error correction device, for example, in case the recorded data is reproduced from the optical disk in which the recorded guide information (pre-format information) on the track adjacent to the recorded data track such as DVD-R/RW is formed, when an error occurs in positional data on the correction block corresponding to the position of this recorded guide information due to existence of the recorded guide information, it is not possible to correct the errors by the correction applied twice of a first code row (PI) to a second code row (PO), thereby creating a problem of affecting the reproduction performance.

Further, in the reproduction of the optical disk such as Patent Document 2, an error occurs in the data on the correction block equivalent to the position of the prepit due to the effect of the prepit, and for example, the error is uncorrectable by the correction applied twice of the first code row (PI) to the second code row (PO), and therefore, the correction applied thrice of PO-PI-PO must be performed, and this has created a problem of increasing the number of correction processing times and lowering the reproduction performance.

SUMMARY

The error correction device of the optical disk according to the basic configuration is an error correction device of the optical disk reproducing unit for reproducing recorded information from the optical disk recorded with a code row data added with an error code in the same direction as a sequence of recorded information in the recording portion of the optical disk and recorded guide information pre-recorded in an inerasable state before the code row data is recorded as a recorded guide for recording the code row data in the optical disk, and is provided with a first position detecting portion configured to detect a physical configurational singular point in the recorded guide information as a first position, a second position generating portion configured to generate a second position replacing the first position detected by the first position detecting portion with a position of the code row data, and an error correction portion configured to erasure-correct the error of the code row data by using the second position.

DETAILED DESCRIPTION OF THE EMBODIMENTS

Figure 1:
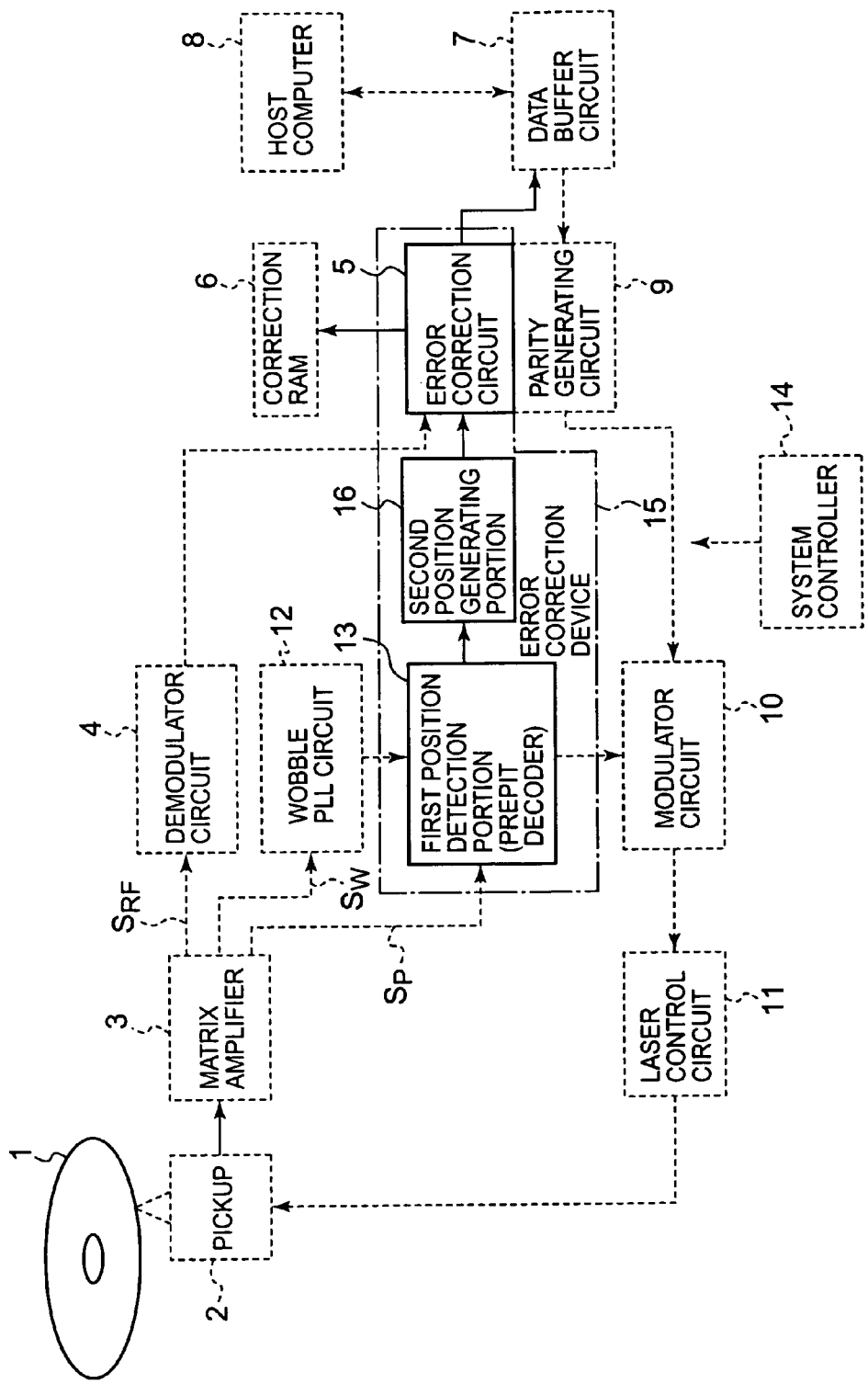
FIG. 1 is a block diagram showing a configuration of an error correction device of a first embodiment equivalent to a basic configuration.

Embodiments of an error correction device of an optical disk unit will be described below in detail with reference to the accompanying drawings First Embodiment FIG. 1 is a block diagram showing a configuration of an error correction device of an optical disk unit according to a first embodiment as a basic configuration. From among component parts of FIG. 1, those attached with the same reference numerals as FIG. 20 show the same or equivalent component parts as the conventional error correction device.

In FIG. 1, the error correction device of the optical disk unit is provided with an error correction device 15 of an optical disk reproducing unit for reproducing recorded information from the optical disk, which is recorded with a code row data added with an error code in the same direction as a sequence of recorded information in the recording portion of an optical disk 1, and recorded guide information pre-recorded in an inerasable state before the code row data is recorded as recorded guide for recording the code row data in the optical disk.

The error correction device 15 is provided with a first position detecting portion (prepit decoder) 13 for detecting a physical configurational singular point in recorded guide information as a first position, a second position generating portion 16 for generating a second position replacing the first position detected by the first position detecting portion 13 with a code row data position, and an error correction circuit 5 as an error correction portion for erasure-correcting a code row data error by using the second position.

Figure 20:
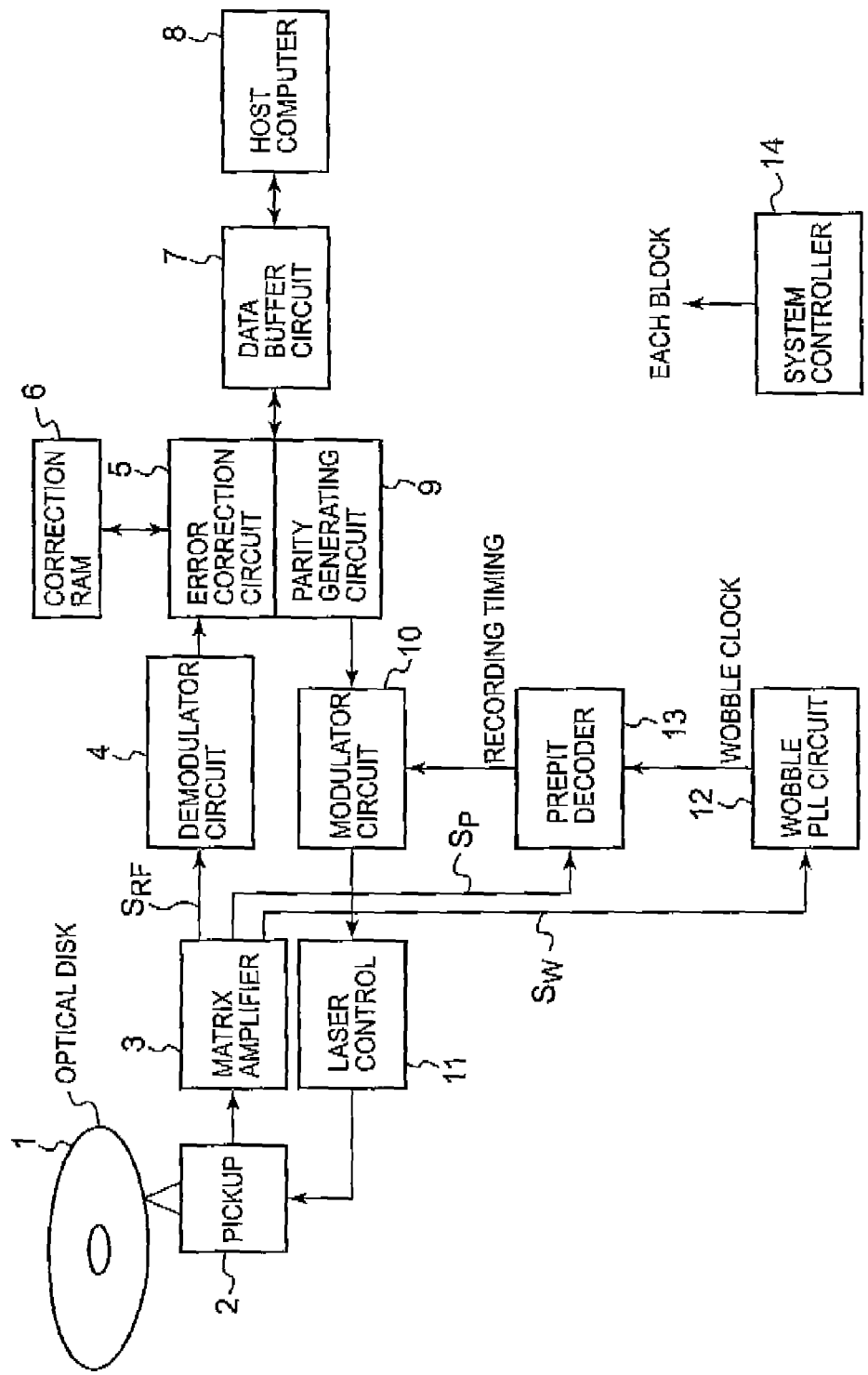
FIG. 20 is a block diagram showing the configuration of the convention optical disk unit.

Incidentally, while the error correction device 15 according to the first embodiment of FIG. 1 is provided with the configuration in the conventional optical disk unit shown in FIG. 20, that is, the component parts such as an optical disk 1, a pickup 2, a matrix amplifier 3, a demodulator circuit 4, a correction RAM 6, a data buffer 7, a host computer 8, a parity generating circuit 9, a modulator circuit 10, a laser control circuit 11, a wobble circuit 12, a system controller 14, and the like, the configuration of an error correction circuit 15 only according to the first embodiment is shown by a block of solid line, and the same component parts as the conventional optical disk unit are shown by a block of broken line. The matrix amplifier 3, similarly to FIG. 20, outputs a radio frequency signal $S_{RF}$ for the demodulator circuit 4, and outputs $S_W$ for the wobble PLL circuit 12, and outputs a prepit signal $S_P$ as a first position information setting portion.

Figure 2:
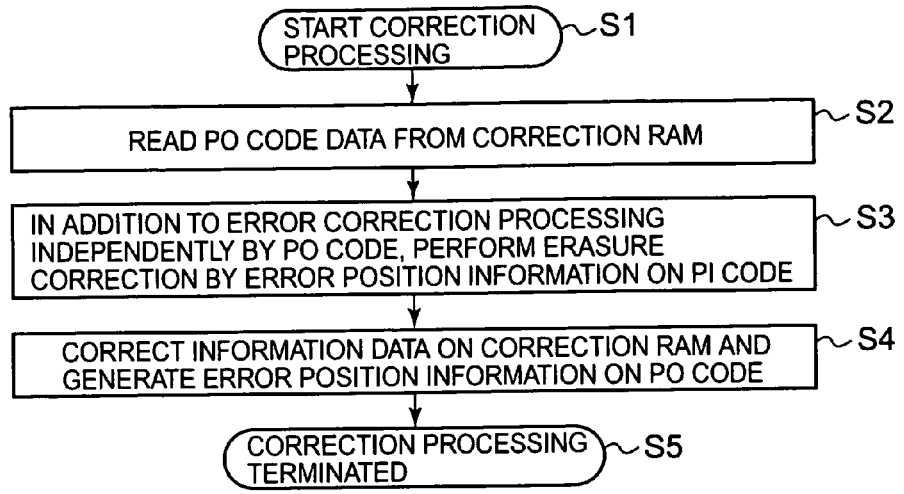
FIG. 2 is a flowchart showing a correction applied once of PO in the error correction processing.
Figure 3:
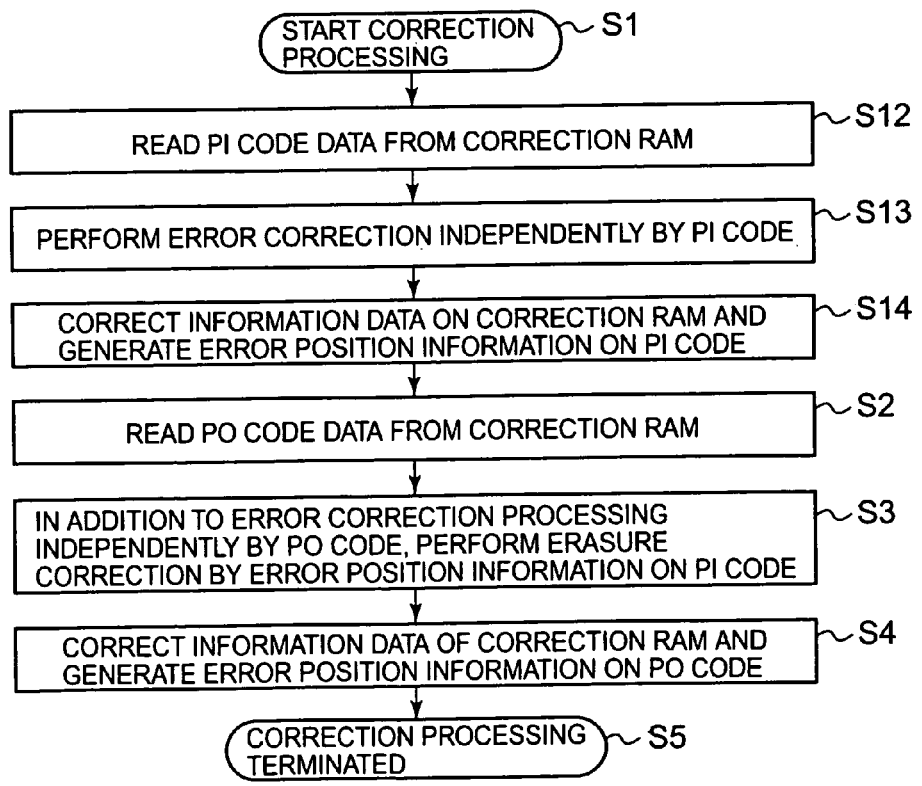
FIG. 3 is a flowchart showing a correction applied twice of PI-PO in the error correction processing.
Figure 4:
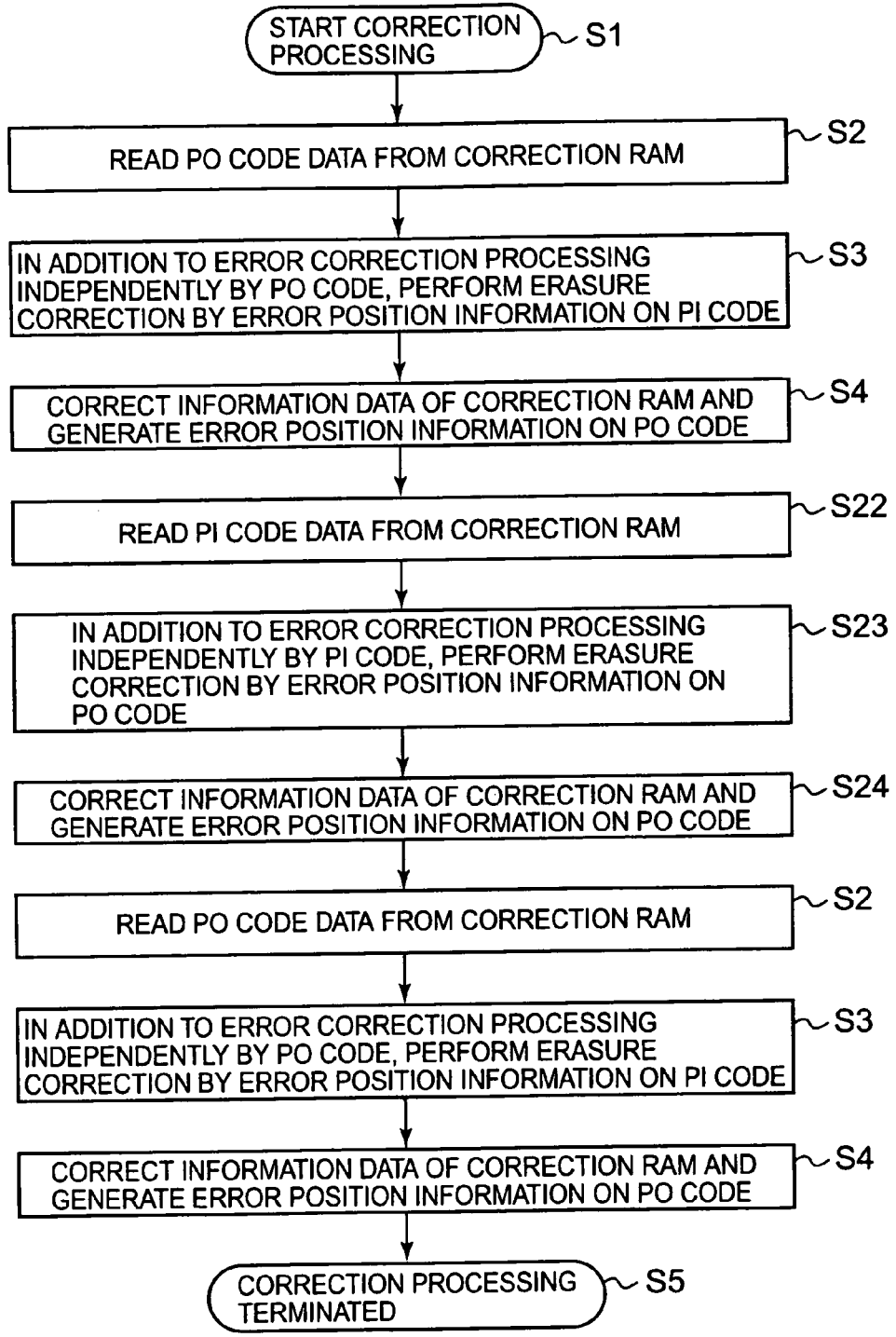
FIG. 4 is a flowchart showing a correction applied thrice of PO-PI-PO of the error correction processing.

An operation of the optical disk unit shown in FIG. 1 will be described below. The operation of the component parts other than the error correction device 15 is the same as the operation of the conventional optical disk shown in FIG. 20. The operation of the optical disk unit shown in FIG. 20 is as shown in FIGS. 2 to 12, and the operation other than the error correction device 15 is the same as the first embodiment. In a system giving a priority to reproduction performance, it is often the case that the correction processing is performed on the basis of a correction applied once of PO as shown in FIG. 2. However, the reproduced data includes a number of errors and in case the errors are uncorrectable by the correction applied once of PO, the number of correction times of PI or PO is increased until errors are corrected by the correction applied twice of PI-PO as shown in FIG. 3 and the correction applied thrice of PO-PI-PO as shown in FIG. 4.

Since DVD-R/RW, as a physical format, records information in grooves as shown in FIGS. 14A and 14B of Patent Document 1, it is formed with a pit as shown in FIG. 14C of Patent Document 1, which is referred to as a land prepit set with information such as an address and the like in the land between the grooves. This prepit is a physical configurational singular point artificially formed in advance for the recording portion of the optical disk, and the first position detecting portion (prepit decoder) 13 detects this prepit as the first position. Incidentally, the recording portion is an area recorded with the code row data, and the prepit as the physical singular point is artificially formed in advance, for example, by disk manufacturers and the like before the code row data is recorded in the place equivalent to this recording portion. As shown in FIG. 1, in case the information recorded in the groove is read by scan by a beam spot, when a change in the light quantity of the reflected light from the groove is small, comparing with the light quantity of the reflected light from the prepit, the reflected light component of the prepit is operated as noises for the reflected light component of the groove, and a case is considered that the detection of the information on the groove with high accuracy becomes difficult. To avoid this problem, a shape is proposed by the foregoing Patent document 2 in which the effects of the groove and the prepit of recording reproducing medium are minimized so as not to affect the reproduced signal.

As shown by the example of the foregoing Patent Document 2, in general, when a prepit signal such as DVD-R/RW exists, a signal (regenerative signal) reproduced from the disk tends to be disturbed, and is low in a level of data reproduction comparing with the disk such as a stamped DVD-ROM and the like, and hence it is often the case that the correction applied twice of PI-PO is performed as a basis.

Performing multiple corrections of PI and PO causes a delay of reproduction speed in order to secure the processing time, thereby creating a problem of lowing the reproduction performance. Further, in order to repeatedly perform multiple corrections of PI and PO while maintaining the reproduction speed until the error is completely corrected, the correction processing portion must be operated at high speed, and this leads to the increase in power consumption. Further, there is a limit to the high speed operation of the correction processing portion, and when reaching the limit, the correction processing is performed by delaying the reproduction speed, thereby to lower the reproduction performance. Hence, in the error correction device of the first embodiment, since the erasure correction of PI is performed first by using the second position information, the errors can be corrected even by the normal correction applied twice of PI-PO without operating the correction processing portion at high speed.

Figure 5:
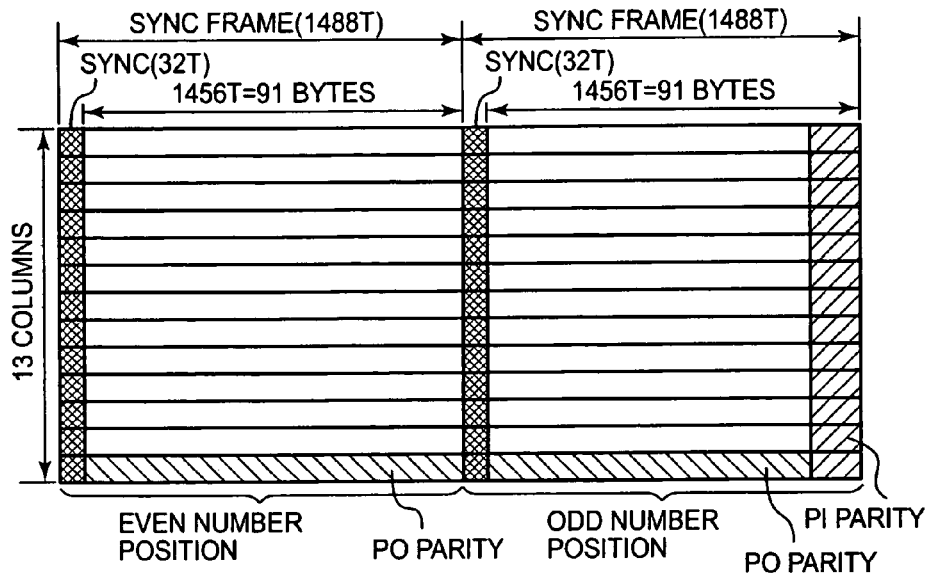
FIG. 5 is a schematic illustration showing the configuration of one sector.
Figure 6:
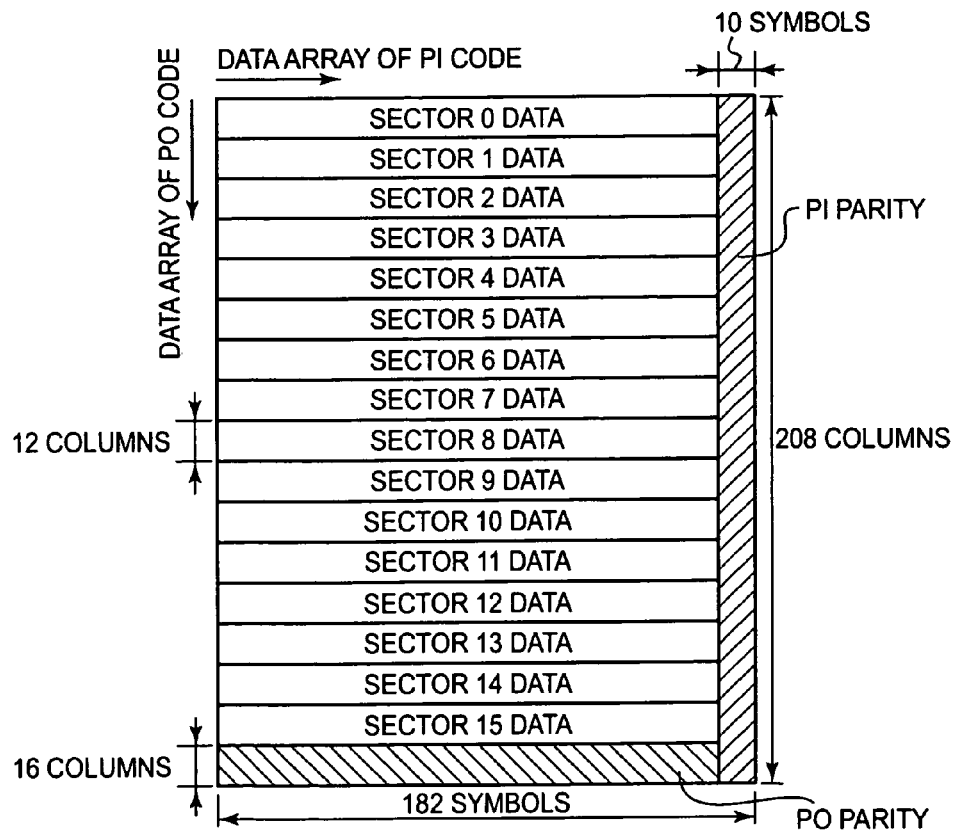
FIG. 6 is a schematic illustration showing the configuration of one correction block.

Next, the relationship between the recording format of the prepit and correction block data will be described. One sector is configured as shown in FIG. 5. One correction block, as shown in FIG. 6, is configured such that PO parity is de-interleaved. One sector is formed by 26 sync frames, and One ECC block is formed by 16 sectors. One symbol represents one byte data, and one byte data is equivalent to 16 times (16T) the channel bit length (hereinafter referred to as T) which is defined by a recording format when recording recorded information. The symbol frame shown in FIG. 5 has a length of 1488T, and moreover, a length portion of 32T for the leading head of one sync frame is used as synchronous information for synchronizing for every sync frame.

At the time of recording the recorded data, since the recorded data is recorded so as to synchronize with the synchronous signal of the preformat information in conformity with the standard, at the time of reproducing the recorded data, the preformat information (prepit) appears on a land adjacent to the area where the synchronous information (sync) in the sync frame of the recorded data is recorded.

Figure 7:
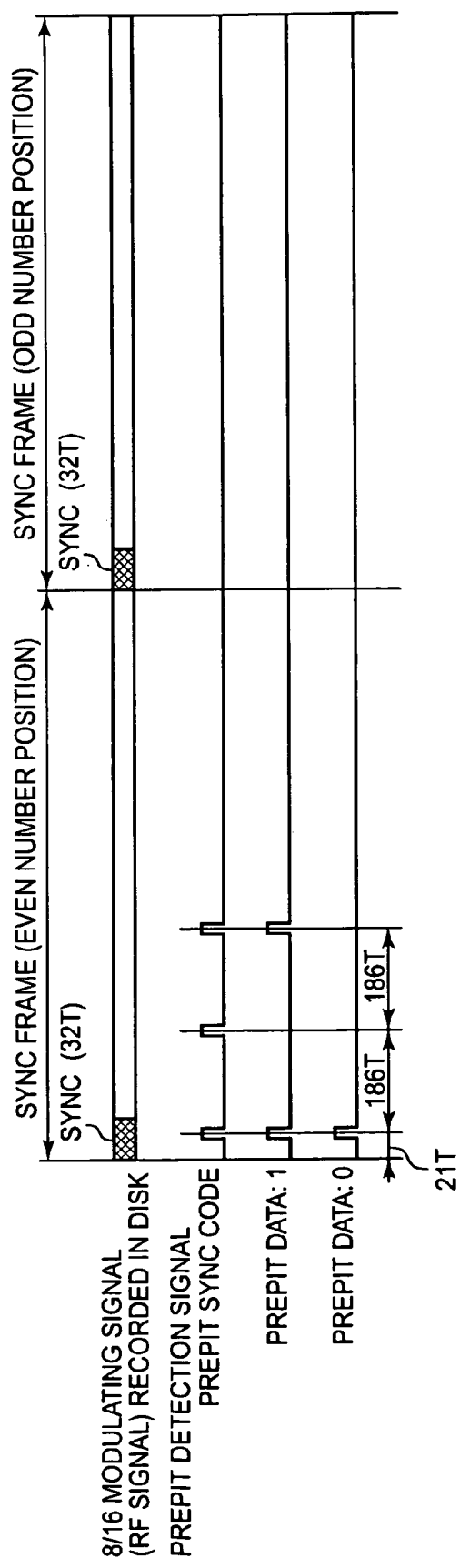
FIG. 7 is a schematic illustration showing the relationship between an RF signal and a prepit detection signal of even number position.
Figure 8:
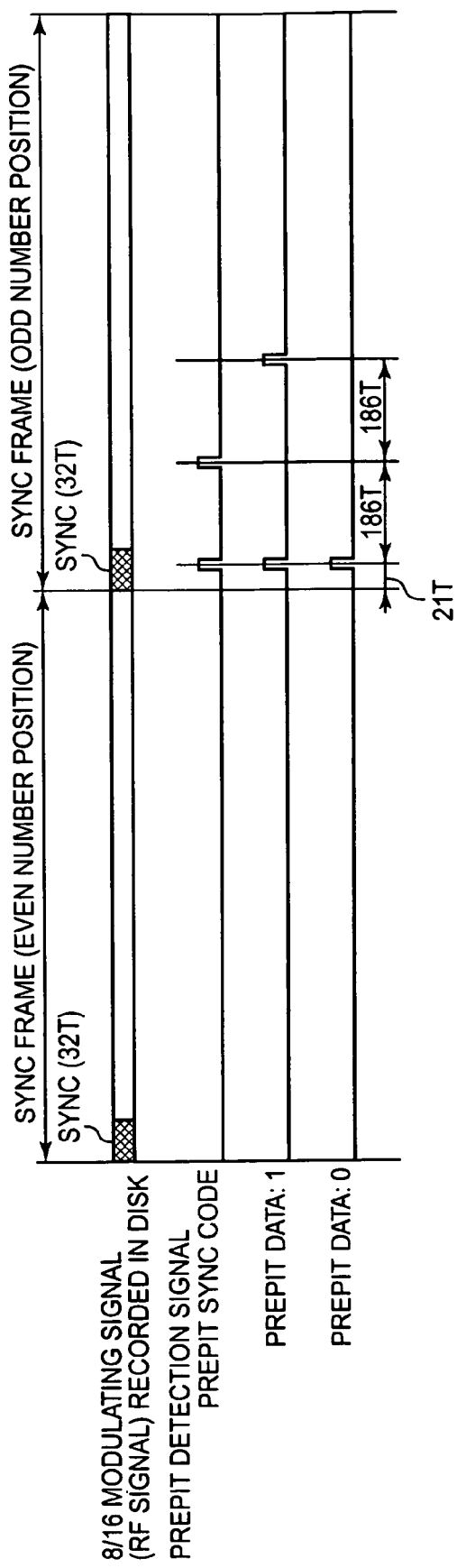
FIG. 8 is a schematic illustration showing the relationship between an RF signal and a prepit detection signal of an odd number position.

It is FIGS. 7 and 8 that schematically show the relationship between the sync frame of the recorded data and the prepit of the preformat information. In the sync frame of an even number position, a prepit SYNC code shown in FIG. 7 is formed to show the synchronous signal in the preformat information, and prepit data: 1 or prepit data: 0 shown in FIG. 7 are formed to show the data. In the case of the sync frame of an odd number position, similarly to the sync frame of the even number position, the prepit SYNC code shown in FIG. 8 is formed to show the synchronous signal in the preformat information, and the prepit data: 1 or the prepit data: 0 shown in FIG. 8 are formed to show the data.

Although the prepit usually appears on the sync frame of the even number position, when it comes close to the prepit on the adjacent land formed in a preceding manner, a prepit appears on the sync frame of the odd number position in order to avoid a cross talk. When the prepit SYNC code and the prepit data appear in the sync frame of the even number position, they will not appear in the sync frame of the odd number position. On the contrary, when they appear in the sync frame of the odd number position, they will not appear in the sync frame of the even number position.

In the sync frame of the even number position of the first row of each sector, the prepit SYNC code as shown in FIG. 7 appears, and in the sync frame of the odd number position, the prepit SYNC code as shown in FIG. 8 appears. In the second row to the thirteenth row, the prepit data as shown in FIGS. 7 and 8 appear depending on the content of the preformat information.

Figure 9:
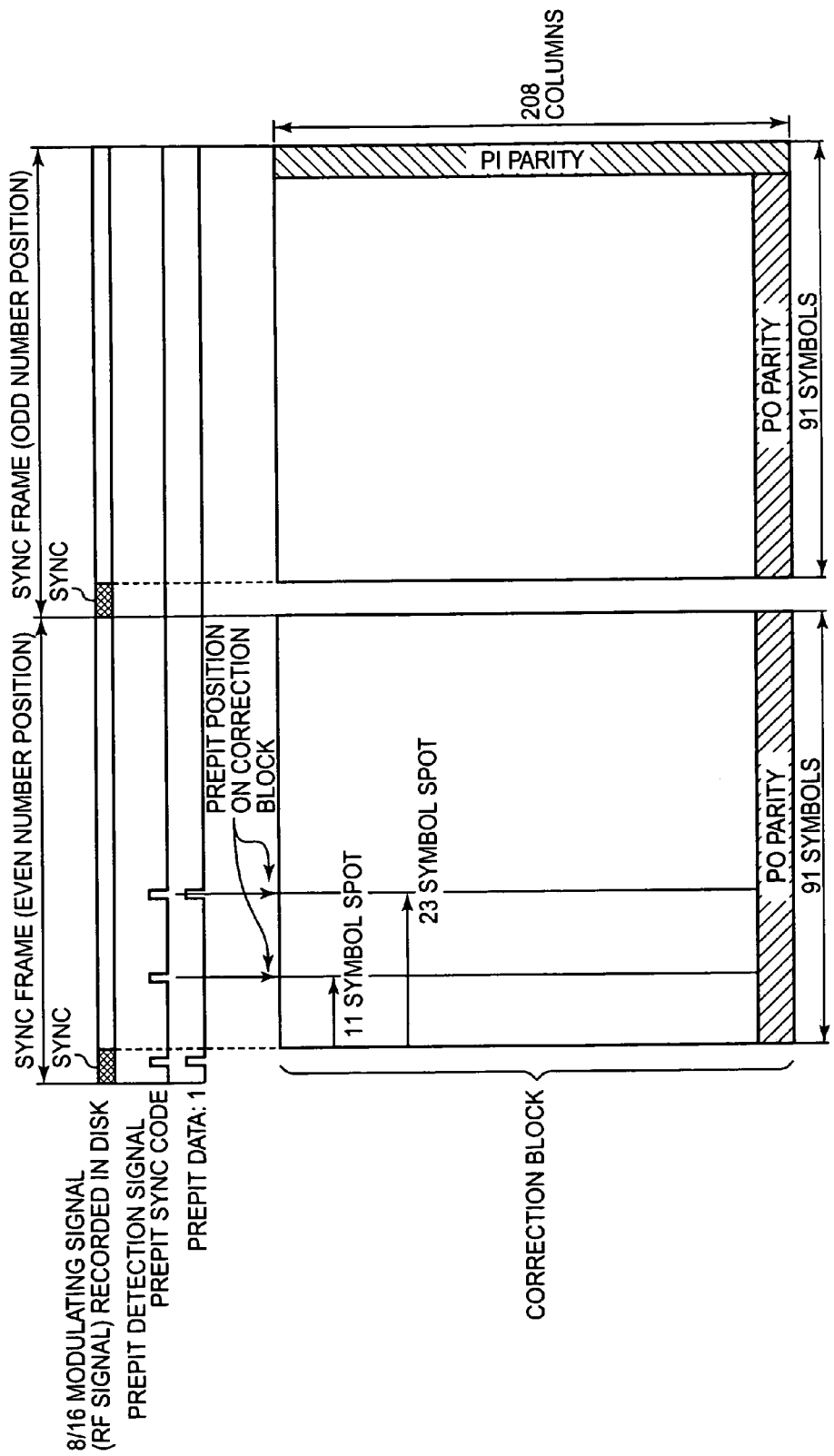
FIG. 9 is a schematic illustration showing the bog-standard relationship between the prepit detection signal of even number position and a correction block data.

A position of the prepit having the preformat information in the sync frame of the even number position and a position on the correction block have the relationship as shown in FIG. 9. Since the recorded data is recorded so as to synchronize with the preformat information, the prepit SYNC code of the even number position of the second prepit position comes to the eleventh symbol position of the PI code row. Further, the third prepit position comes to the twenty third symbol position of PI code row.

Figure 10:
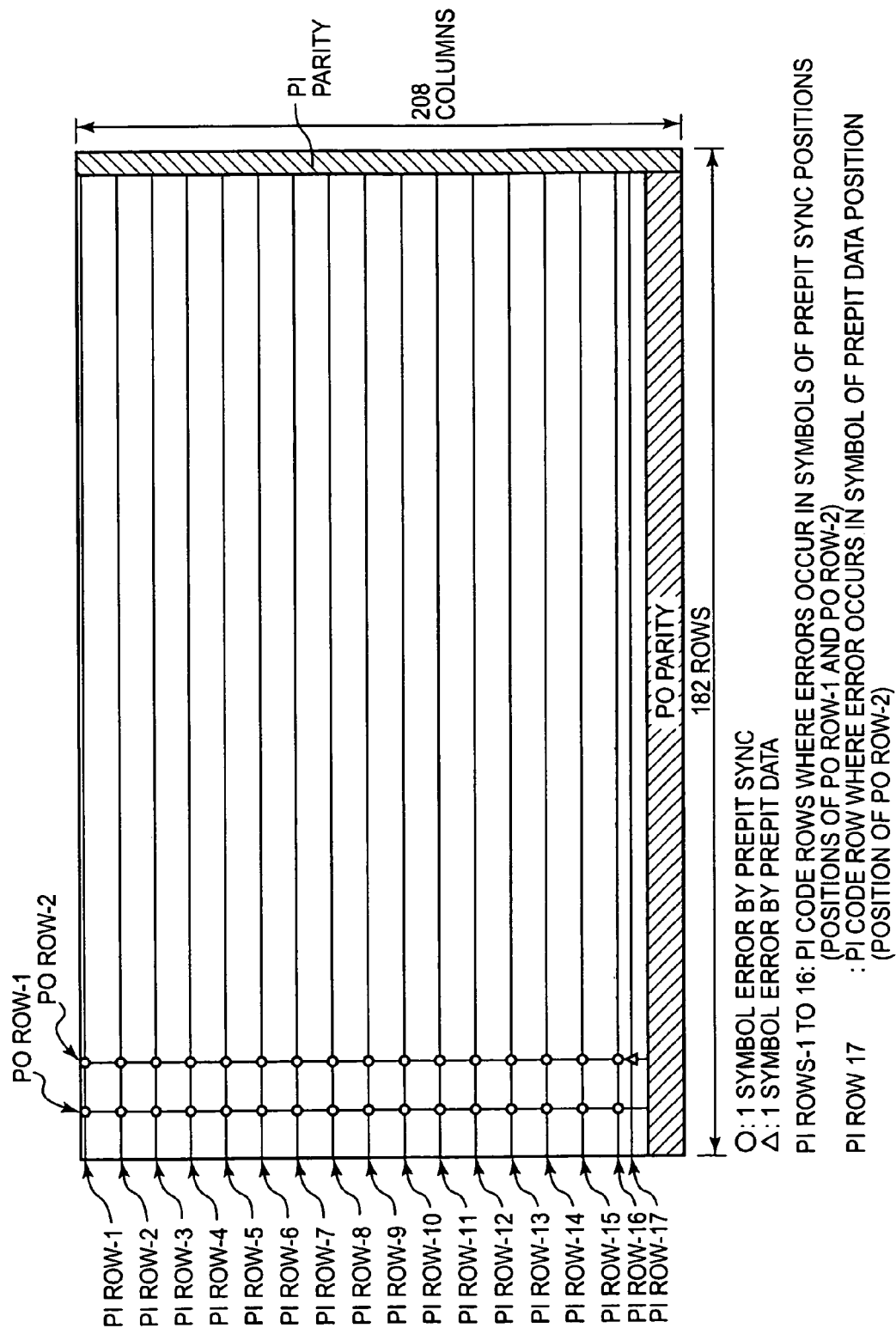
FIG. 10 is a schematic illustration showing a status of an error occurrence on a correction block in case one symbol error occurs due to the effect of the prepit.
Figure 11:
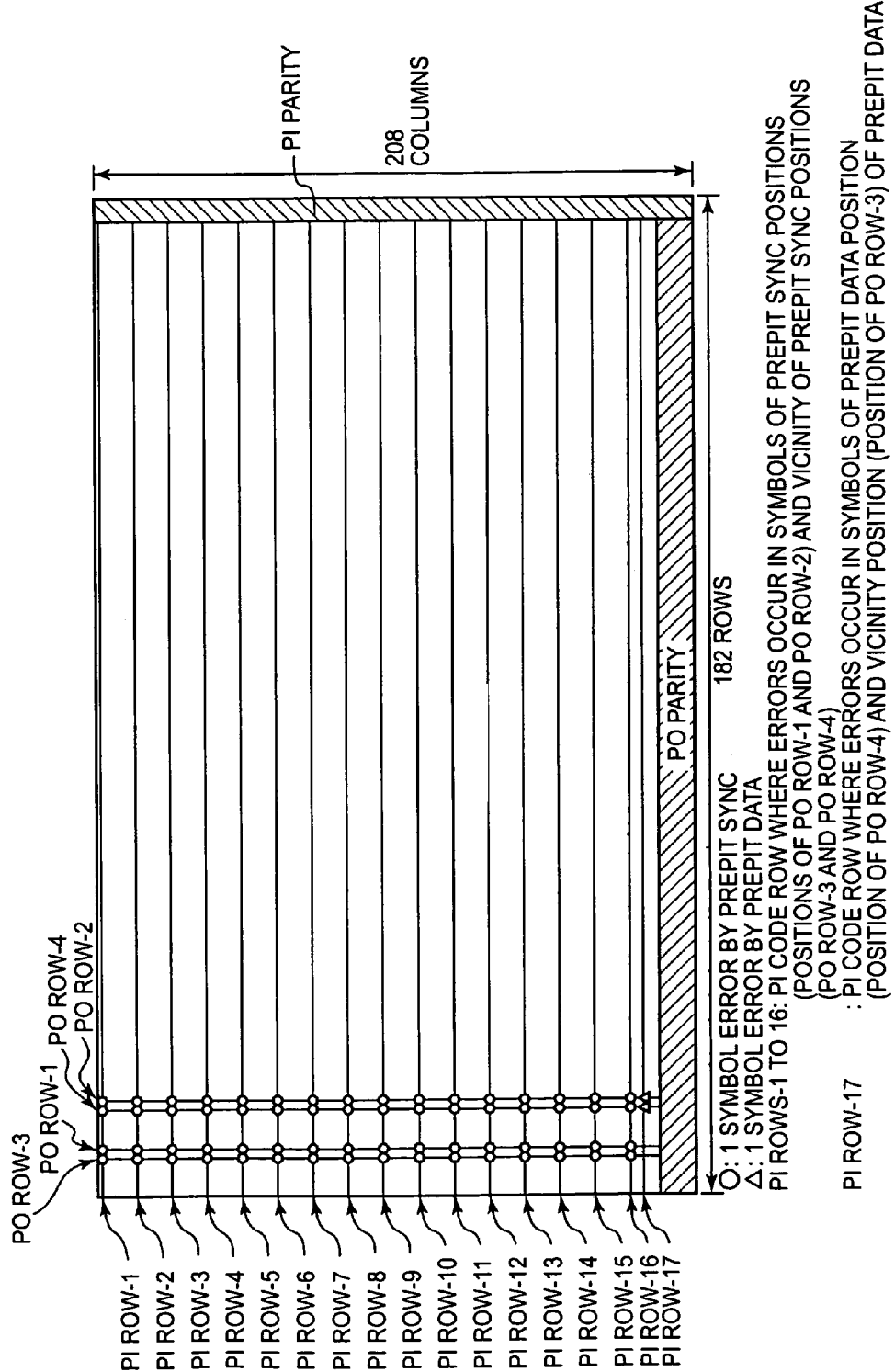
FIG. 11 is a schematic illustration showing a status of an error occurrence on the correction block, in case two symbol errors occur due to the effect of the prepit.
Figure 12:
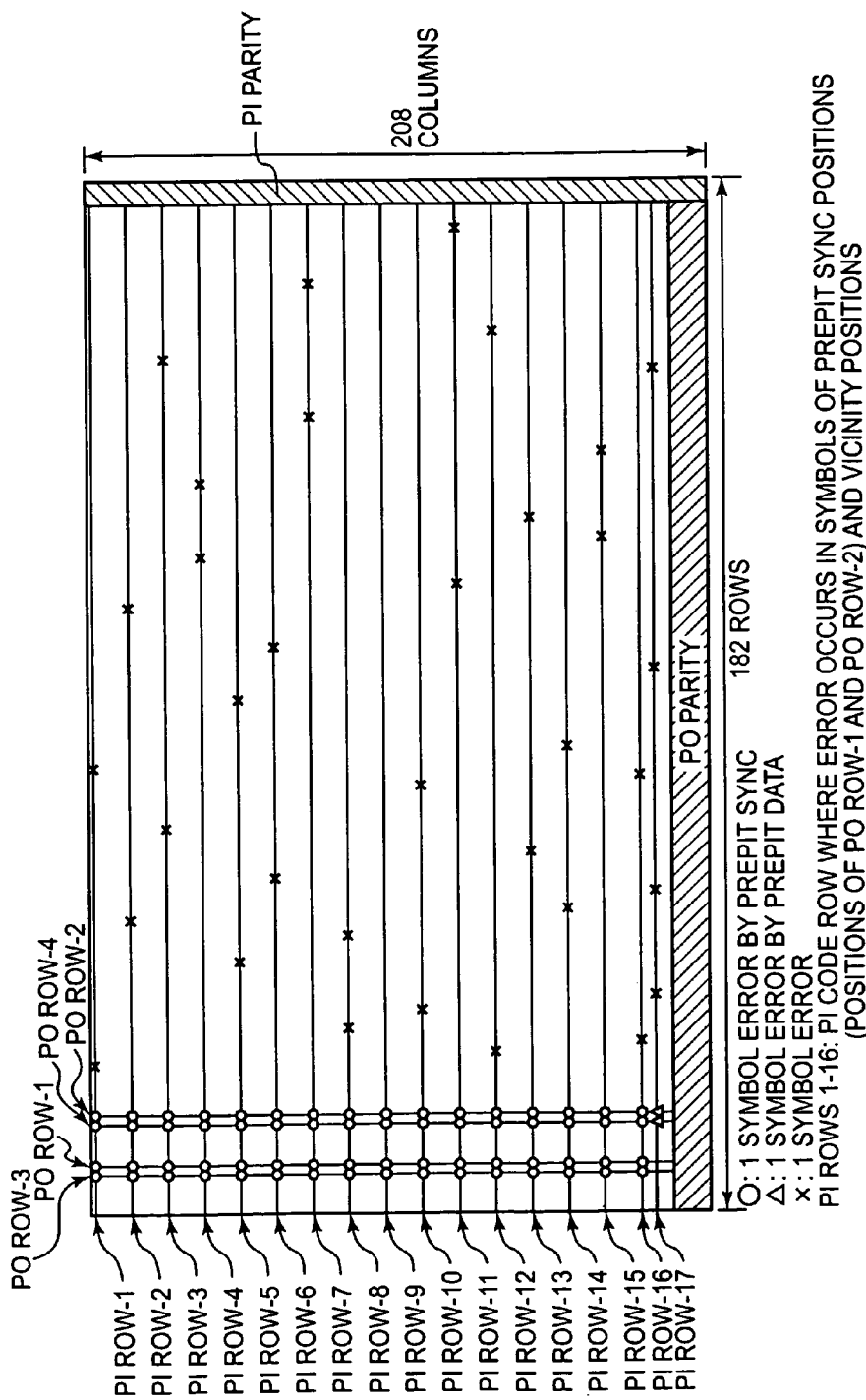
FIG. 12 is a schematic illustration showing a status of an error occurrence on the correction block in case two symbol errors and other errors occur due to the effect of the prepit.

In the conventional error correction device shown in FIG. 20, the reproduction performance in case the errors as shown in FIGS. 10, 11 and 12 occur due to the effect of the prepit will be described. When the errors as shown in FIG. 10 occur due to the effect of the prepit, though the correction applied once of PO as shown in FIG. 2 is unable to correct all the errors, the correction applied twice of PI-PO as shown in FIG. 3 can correct all the errors. Hence, in the system having the correction applied twice of PI-PO as a basis, the reproduction performance is not lowered. FIGS. 11 and 12 show the case where continuous two symbol errors occur due to the effect of the prepit.

In the standard of DVD, when demodulating one symbol data, in case the symbol of the prepit position is put into an error state so as to reflect a demodulated result of the subsequent one symbol, a case is considered where a symbol adjacent to the symbol put into an error state due to the prepit position is put into an error state. Further, as shown in FIG. 15B of Patent Document 1, it is specified in the standard of DVD that the prepit of the optical disk and the center of a 14T period of a recording sync are matched. It is considered difficult that a sync of the recorded data modulated by a clock generated on the basis of wobble due to blurring of a wobble signal and a phase of the prepit are matched. To avoid this problem, in Patent Document 1, a method of controlling a recording operation is proposed, where the prepit position comes to a data position originally defined by the standard.

As shown in the foregoing example, it is often the case that the sync of the recorded data and the position of the prepit are different from the phase defined by the standard due to a recording system and a recording disk. When the prepit is located in the vicinity of the boundary between the symbols, a case is considered where the continuous two symbols sandwiching the boundary are put into an error. When the errors as shown in FIG. 11 occur due to the effect of the prepit, though all the errors are uncorrectable by the correction applied once of PO as shown in FIG. 2, all the errors are correctable by the correction applied twice of PI-PO. Hence, in the system having the correction applied twice of PI-PO as a basis, the reproduction performance is not lowered.

When the errors as shown in FIG. 12 occur due to the effect of the prepit, since all the errors are uncorrectable by the correction applied once of PO as shown in FIG. 2 and the correction applied twice of PI-PO as shown in FIG. 3, the correction applied thrice of PO-PI-PO as shown in FIG. 4 is performed. Hence, in the system having the correction applied twice of PI-PO as a basis, the reproduction speed is delayed in order to secure the time for performing the correction applied thrice of PO-PI-PO, thereby lowering the reproduction performance.

The correction applied once of PO, the correction applied twice of PI-PO, and the correction applied thrice of PO-PI-PO will be described by using FIGS. 2 to 4. FIG. 2 shows the processing operation of the correction applied once of PO. In FIG. 2, first, at step S1, when the correction processing is started, at step S2, PO code data is read from the correction RAM 6. Next, at step S3, an independent error correction processing by the PO code is performed, and at the same time, in addition to this, an erasure correction by error position information on the PI code is performed. After that, at step S4, information data on the correction RAM 6 is corrected to generate an error position of the PO code, thereby terminating the correction processing at step S5.

FIG. 3 shows the processing operation of the correction applied twice of PI-PO. In FIG. 3, at step S1, when the correction processing is started, at step S12, PI data code is read from the correction RAM 6. At step S13, the independent error correction by the PI code is performed, and at step S14, information data of the correction RAM 6 is corrected to generate error position information on the PI code. These steps S12 to S14 are the steps for PI correction, and after that, PO correction of the steps S2 to S4 is performed, and at step S5, the correction processing is terminated. Although this processing is based on the conventional configuration shown in FIG. 20, in the first embodiment, it is the processing operation in which the step of [determining whether or not the optical disk is recordable" (step S31 of FIG. 14 to be described later) if the optical disk is determined as recordable, and the step of [the independent error correction by the PI code is performed, and at the same time, an erasure correction is performed by using the prepit position information" (step S33 of FIG. 14) are interposed between step 12 and step 13.

FIG. 4 shows the processing operation of the correction applied thrice of PO-PI-PO. In FIG. 4, when the correction processing is started at step S1, PO code data is read from the correction RAM 6 at step S2. Next, at step S3, the independent error correction processing by only the PO code is performed, and at the same time, in addition to this, an erasure correction by error position information on the PI code is performed. The error position information on the PI code is based on information generated by the demodulator circuit 4 or the like (see Japanese Patent No. 3340933). After that, at step S4, information data on the correction RAM 6 is corrected to generate an error position of the PO code. Although the operation up to this step is the same as FIG. 2, after that, at step S22, the PI data code is read from the correction RAM 6, and at step S23, the independent error correction by the PI code is performed, and at the same time, in addition to this, the erasure correction by error position information on the PO code is performed, and after that, at step S24, information data on the correction RAM 6 is corrected to generate the error position information on the PO code. These steps S22 to S24 are the steps for PI correction similarly to steps S12 to S14 of FIG. 3. After that, the PO correction of steps S2 to S4 is performed again, thereby terminating the correction processing at step S5.

When the conventional configuration of FIG. 20 is used, in case the correction applied twice of PI-PO is not sufficient because of the reason as described above, it has been necessary to perform the correction applied thrice of PO-PI-PO as shown in FIG. 4. According to the error correction device of the first embodiment, the feature of the device lies in that the determining step of determining whether or not the optical disk is recordable is interposed between steps 12 and 13 in the correction applied twice of PI-PO shown in FIG. 3, and at the same time, in case the optical disk is recordable, the erasure correction similarly to the step S23 of FIG. 4 is performed not by the error position information on the PO code but by the prepit position information.

As described above, according to the first embodiment, with respect to the configuration, the second position information generating portion 16 is provided for the error correction device 15 of FIG. 1, and with respect to the operation, an operation for performing the erasure correction by prepit position information is interposed between steps 12 and 13 of FIG. 3 in case the optical disk is recordable, so that there is no need to perform the correction applied thrice of PO-PI-PO even in case the error correction by the correction applied twice of PI-PO is insufficient, thereby enabling the error correction to improve the reproduction performance without lowering the reproduction speed at the time of reproducing information from the optical disk.

Second Embodiment

Figure 13:
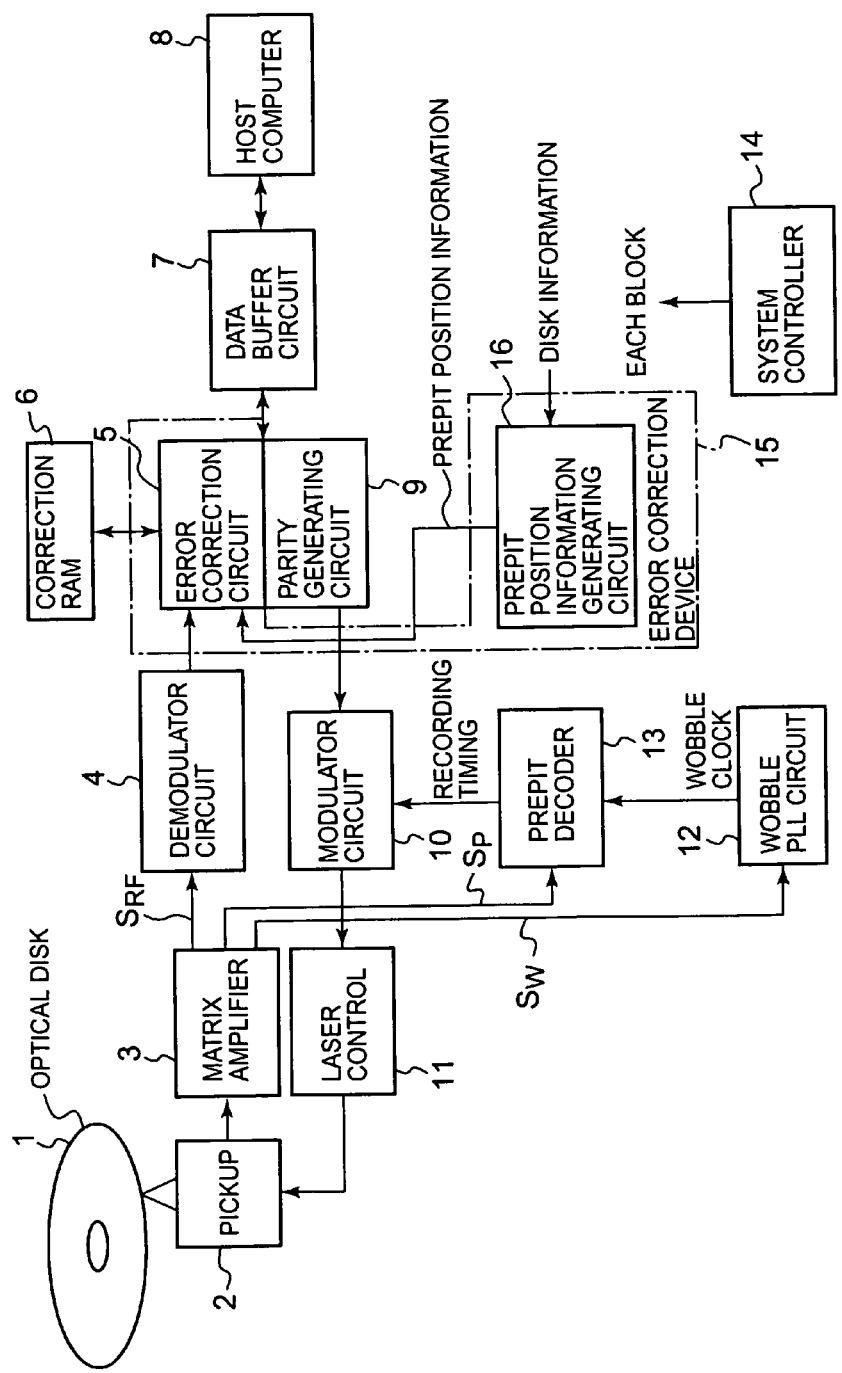
FIG. 13 is a block diagram showing the configuration of the error correction device of a second embodiment.
Figure 14:
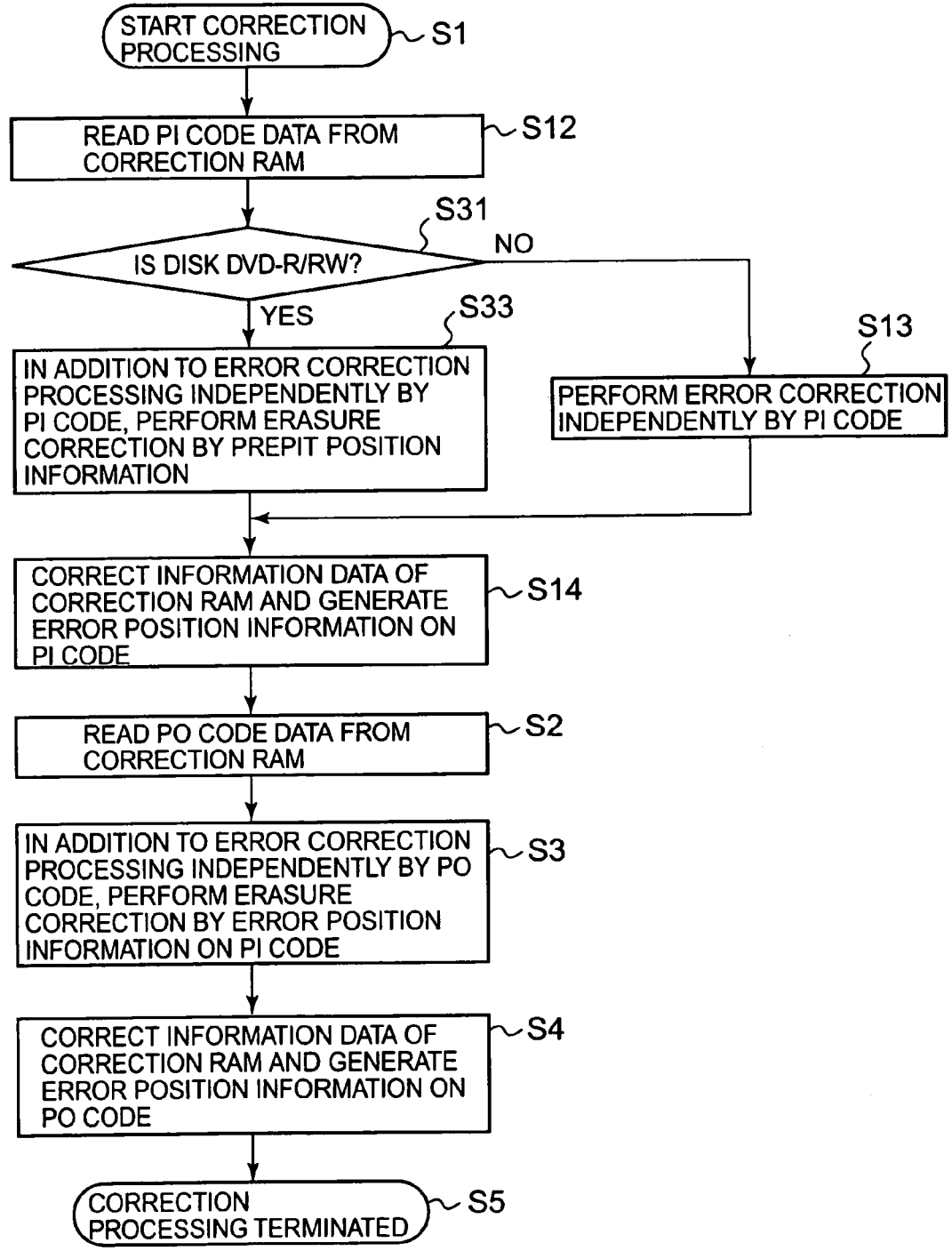
FIG. 14 is a flowchart showing a processing operation of the correction applied twice of PI-PO in the second embodiment.

In the foregoing first embodiment, though a description has been made only on the basic configuration of the error correction device of the optical disk unit, an error correction device of a second embodiment showing more detailed configuration will be described with reference to FIGS. 13 and 14. In FIG. 13 is shown a schematic configuration of the error correction device of the second embodiment, and in FIG. 14 is shown a flow of the processing operation based on the configuration of FIG. 13.

In FIG. 13, a prepit position information generating circuit 16 configuring an error correction device 15 is supplied with disk information regarding an optical disk 1 in the midst of reproduction, and in case the optical disk 1 in the midst of reproduction is recordable based on this information, an erasure correction processing is performed based on the prepit position information.

A description will be made on the correction processing in case the foregoing errors as shown in FIG. 12 occur. In the reproduction of recorded data, an RF signal $S_{RF}$ outputted by a matrix amplifier 3 is outputted to a host computer 8 through a demodulator circuit 4, an error correction circuit 5, a correction RAM 6, and a data buffer circuit 7. In the prepit position generating circuit 16, in case a reproducing disk is DVD-R/RW, prepit position information on a correction block set up from a system controller is outputted to the error correction circuit 5. In the error correction circuit 5, the prepit position information received from the prepit position generating circuit 16 is converted into a pointer for erasure correction to be used for PI correction. In the PI correction, erasure correction of the prepit position on the correction block and error correction of the other positions are performed.

By the system controller, a PO row-3 adjacent to a PO row-1 of FIG. 12 and a PO row-4 adjacent to a PO row-2 are added with the pointer for erasure correction, thereby to perform the PI correction. Since the positions of the PO row-1 and the PO row-2 are usually recorded with data in conformity to the standard at the prepit position shown in FIG. 9, the PO row-1 comes to the eleventh symbol from the leading head of the PI code row, and the position of the PO row-2 comes to twenty third symbol from the leading head of FIG. 9. In the PI code row, in case there exist errors of four symbols in which the error positions are known, since it is possible to correct the errors in which error positions are unknown up to three symbols, the errors of the PI row-1 to the PI row-16 of FIG. 12 are correctable by the PI correction.

In the PI code row, in case there exist two symbol errors in which error positions are known, since it is possible to correct the errors in which the error positions are unknown up to four symbols, the error of the PI row-17 of FIG. 12 is correctable by the correction applied once of PI. Even in case the errors as shown in FIG. 12 occur, the correction can be made by the correction applied twice of PI-PO in the second embodiment of FIG. 13, and therefore, the reproduction performance is improved, comparing with the case of the conventional error correction device shown in FIG. 20. FIG. 12 shows an example in case of adding two pointers for erasure correction to a piece of prepit. The pointer for erasure correction to be added may be increased to the maximum possible number of erasure corrections (10 pieces in the case of the PI code row) for the code row to be added with the pointer for erasure correction.

The foregoing operations are all put together and will be described by the flowchart shown in FIG. 14. When the correction processing is started at step S1 of FIG. 14, at step S12, the PI code data is read from the correction RAM 6, and at step S31, it is determined whether or not the optical disk in the midst of reproduction is DVD-R/RW. At step S31, when it is determined that the optical disk is DVD-R/RW, that is, a recordable disk, at the step S33, an independent error correction processing by the PI code is performed, and at the same time, in addition to this, the erasure correction is performed by the prepit information. At step S31, when it is determined that the optical disk in the midst of reproduction is a read only disk, at step S13, the independent error correction by the PI code is performed.

Next, at step S14, the information data of the correction RAM 6 is corrected to generate error position information on the PI code. After that, at step S2, the PO code data is read from the correction RAM 6, and at step S3, the independent error correction by PO code is performed, and at the same time, in addition to this, the erasure correction by error position information on the PI code is performed, and at step S4, the information data of the correction RAM 6 is corrected to generate error position information on the PO code, thereby performing the PO correction.

Consequently, the processing operation of the second embodiment shown in FIG. 14 is such that the determining step S31 is provided between steps S12 and S13 in the flow-chart of FIG. 3 in which the operation of the correction applied twice of PI-PO in the conventional optical disk shown in FIG. 20 is described, and in case the optical disk is recordable, at step S33, the erasure correction by the prepit position information is performed, and in case the optical disk is not recordable, that is, a read only disk, the PI correction is performed similarly as before. The determination as to whether or not the optical disk 1 is recordable is performed in the second embodiment by the disk information supplied to the prepit position information generating circuit 16 of the FIG. 13.

Third Embodiment

In the foregoing second embodiment, though the determination as to whether or not the optical disk 1 is recordable has been performed by disk information supplied to the prepit position information generating circuit, the present application is not limited to this, the determination may be performed by a signal read from an optical disk 1. An error correction device according to a third embodiment as a specific example of this determination will be described by using FIGS. 15 to 19.

Figure 16:
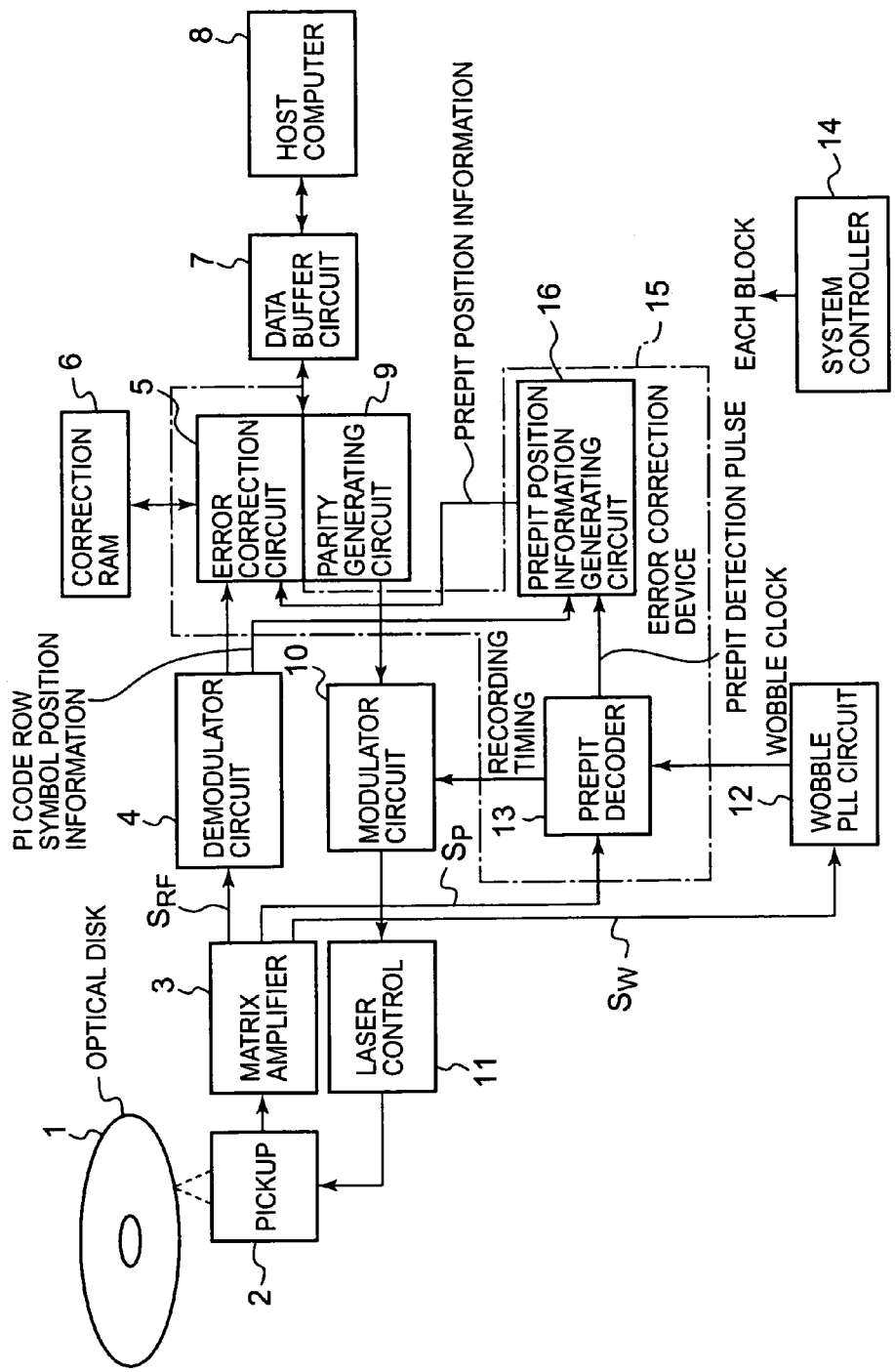
FIG. 16 is a block diagram showing the configuration of the error correction device of a third embodiment.

The optical disk unit according to the second embodiment, as shown in FIG. 16, is provided with the component parts same as or equivalent to the component parts attached with reference numerals 1 to 14, and in addition to this, and is provided with the error correction device 15 according to the second embodiment. The error correction device 15, as shown in FIG. 16, is provided with a prepit decoder 13 outputting a prepit detection pulse based on a prepit signal SP outputted by a matrix amplifier 3 and a wobble clock outputted by a wobble PLL circuit; a prepit position information generating circuit 16 outputting prepit position information based on the prepit detection pulse outputted by the prepit decoder 13 and PI code row position information outputted by a demodulator circuit 4; and an error correction circuit 5 as an error correction portion for erasure-correcting the errors of PI code row as a second code row by using prepit position information as second position information outputted by the prepit position information generating circuit 16.

Figure 15:
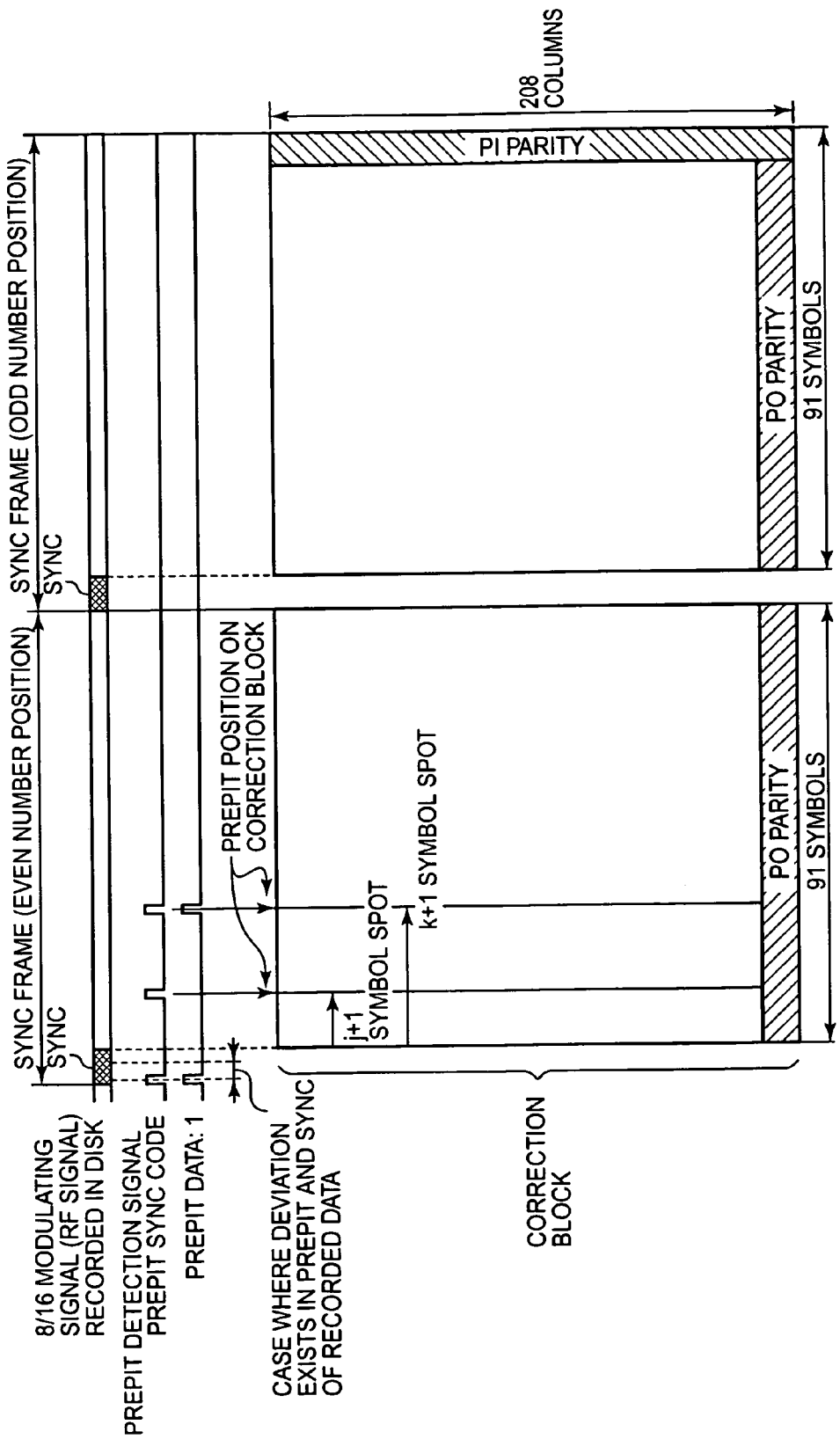
FIG. 15 is a schematic illustration showing the bog-standard relationship between the prepit detection signal of even number position and the correction block data.

Next, the operation based on the configuration of FIG. 16 will be described. A description will be made on the case where the errors as shown in FIG. 12 described in the first embodiment occur and a position of the prepit and an error position on the correction block are equivalent to a j+1st row and a k+1st row from the leading head of the PI code row as shown in FIG. 15. In the reproduction of the recorded data, an RF signal $S_{RF}$ outputted by the matrix amplifier is outputted to a host computer 8 through a demodulator circuit 4, an error correction circuit 5, a correction RAM 6, and a data buffer circuit 7. In the prepit position generation circuit 16, when a reproducing disk is DVD-R/RW, that is, a recordable optical disk, a prepit position on the correction block set up from a system controller 14 is converted into pointer information for erasure correction in the correction of the PI code row, and is outputted to the error correction circuit 5.

Figure 17:
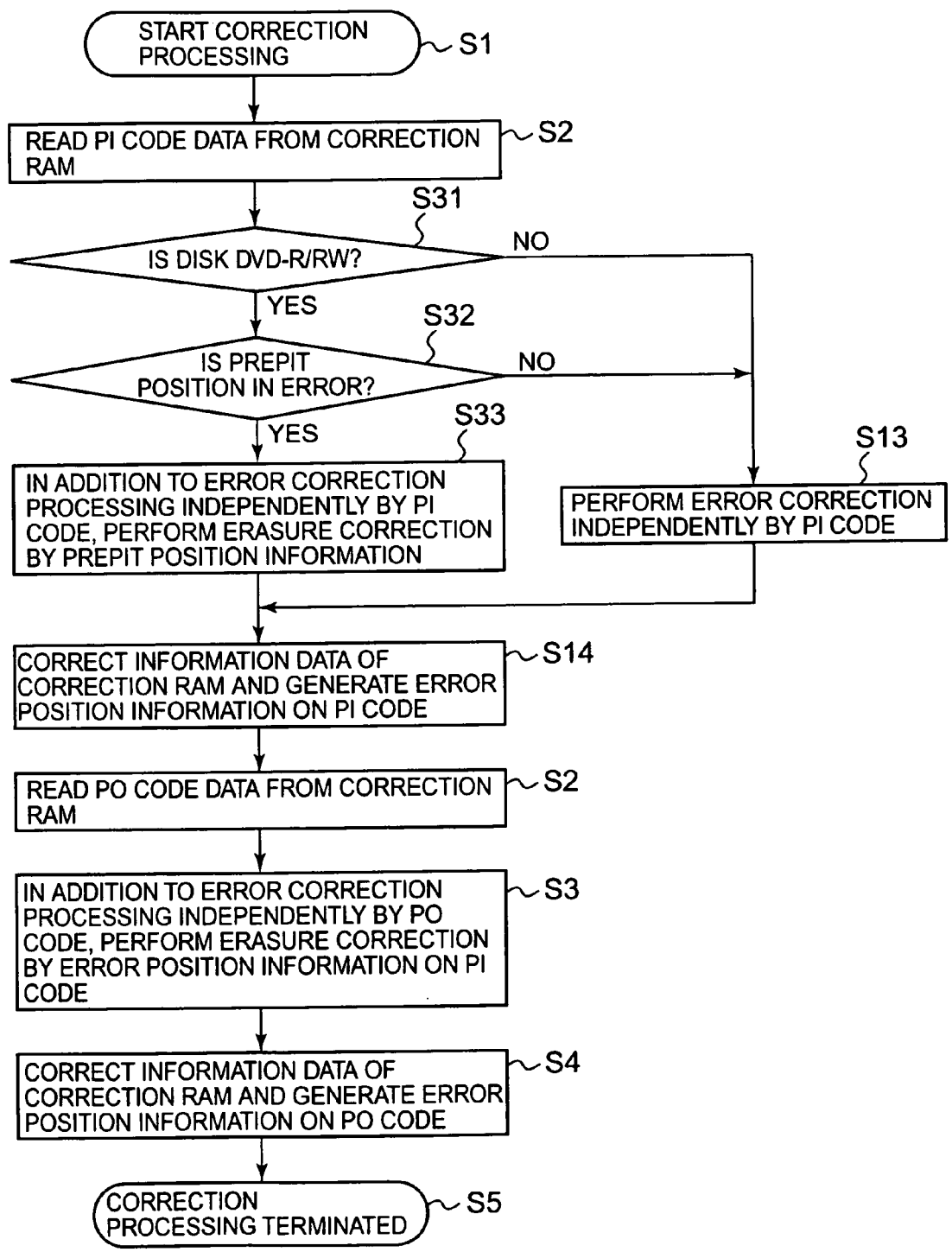
FIG. 17 is a flowchart showing a processing operation of the correction applied twice of PI-PO in the third embodiment.

The error correction operation of the error correction device 15 will be described by using the flowchart shown in FIG. 17. In FIG. 17, a point of difference with FIG. 14 describing the operation of the second embodiment is that step S32 of determining whether or not the prepit position is in error is added between steps S31 and S33. At step S1, the correction processing is started, and at step S2, the PI code data is read from the correction RAM 6.

Next, similarly to the processing operation of the second embodiment, at step S31, it is determined whether or not the disk is DVD-R/RW, that is, a recordable optical disk, and in case the disk is determined as an unrecordable optical disk, similarly to the correction applied twice of PI-PO as described in FIG. 3, at step S14, the information or data stored in the correction RAM 6 is corrected to generate error position information on the PI code. At step S31, in case the disk is determined as a recordable optical disk, at step S32, it is determined whether or not the prepit position is in error. In case the prepit position is determined to be not in error, at step S13, an independent error correction by the PI code is performed, and after that, the processing proceeds to step S14.

Figure 18:
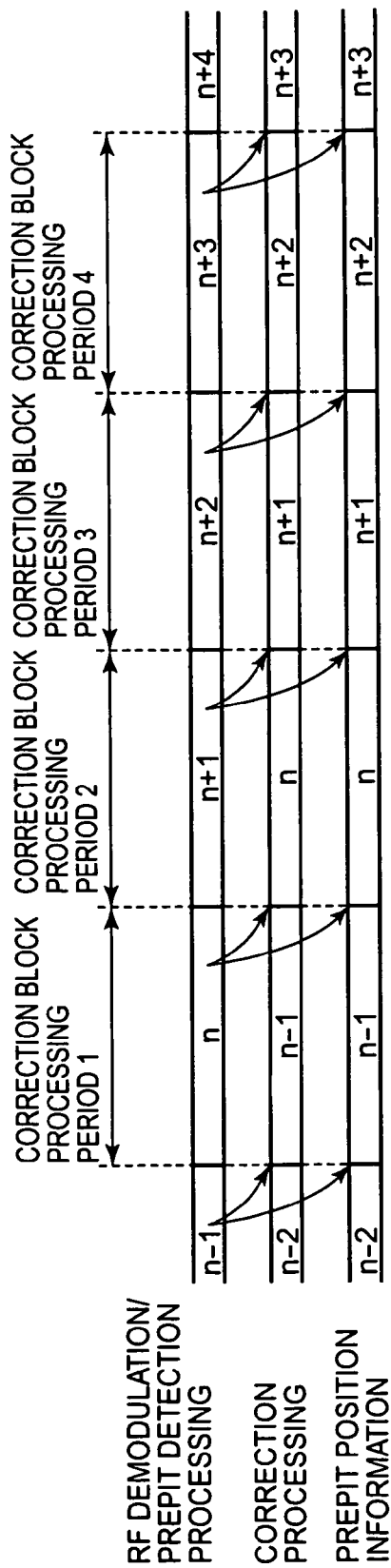
FIG. 18 is a schematic illustration showing the relationship between demodulation processing of the RF signal and prepit detection processing.

At step S32, when it is determined that the error exists at the prepit position, similarly to the second embodiment, at step S33, the independent error correction processing by the PI code is performed, and at the same time, in addition to this, the erasure correction by prepit position information is performed. After that, the flow of processings from step S14 to steps S2 to S5 is the same as FIG. 3. The demodulating processing of the RF signal $S_{RF}$ in the demodulator circuit 4 and the detection processing of the prepit signal $S_P$ in the prepit decoder 13, the correction processing in the error correction circuit 5, and the prepit position information in the prepit position information generating circuit 16 have the relationship as shown in FIG. 18.

A correction block period shows a processing period for processing a correction block portion. The RF signal reproduced from the optical disk is demodulated as a correction block data n in the demodulator circuit in a correction block processing period 1, and is subjected to the correction processing in the next correction block processing period 2. At the same time, the prepit signal reproduced from the disk is detected in the prepit decoder in the correction block processing period 1, and the prepit position information generated in the prepit position information generating circuit is used for the correction processing in the next correction block processing period 2.

In the prepit position generating circuit 16, when the reproducing disk is DVD-R/RW, the demodulator circuit 4 outputs PI code row symbol position information. The error correction circuit 5, as shown in FIG. 19, receives a value (hereinafter referred to as PI code row symbol position) of a 182 decimal counter in the direction of the PI code row showing a symbol position in the direction of the PI code row formed by synchronizing with a sync frame in the demodulator circuit 4, and a pulse (hereinafter referred to as prepit detection pulse) notifying to the effect that the prepit detection signal decoded by the prepit decoder 13 or the prepit is detected, thereby generating the prepit position on the correction block.

Further, information showing the prepit position on the correction block (hereinafter referred to as prepit position information) receives a signal selecting either of the prepit position or the position adjacent to the prepit position and an enabling signal adding the pointer for erasure correction by PI correction to the prepit position from the system controller, and outputs these signals to an error correction circuit and an error measurement circuit of the prepit position as prepit position information. The PI code row symbol positions (j and k of FIG. 19) when receiving the prepit detection pulse come to the prepit positions on the correction block (j+1 symbol spot and k+1 symbol spot in FIG. 19).

Figure 19:
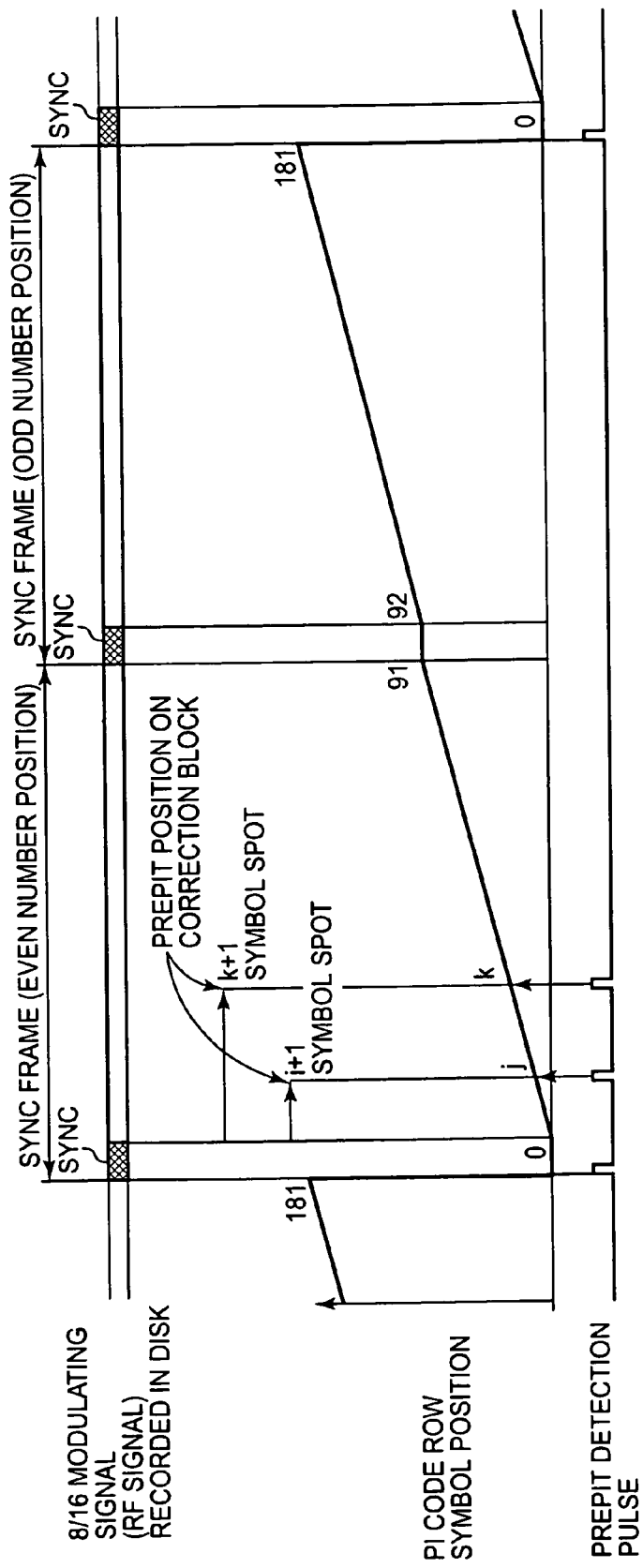
FIG. 19 is a schematic illustration showing a prepit position on the correction blocks in a prepit information generating circuit.

In the error correction circuit 5, before starting the correction processing, the prepit position information is received from the prepit position information generating circuit 16, and the prepit position on the correction block (j+1 symbol spot and k+1 symbol spot in FIG. 19) is used as the pointer for erasure correction at the time of the PI correction (hereinafter, j+1 symbol spot of FIG. 19 is referred to as a position of a prepit error 1, and k+1 symbol spot of FIG. 19 is referred to as a position of a prepit error 2). In the PI correction, the erasure correction of the prepit position generated by the prepit position generating circuit 16 and the error correction of other positions are performed.

The PO row-1 of FIG. 12 corresponds to the position of the prepit error 1, and the PO row-2 of FIG. 12 corresponds to the position of the prepit error 2. Consequently, the pointer for erasure correction is added to the PO row-3 adjacent to the PO row-1 of FIG. 12 and the PO row-4 adjacent to the PO row-2 from the system controller, thereby to perform the PI correction. In the PI code row, in case there exist four symbol errors in which the error positions are known, since it is possible to correct the errors in which the error positions are unknown up to three symbols, the errors of the PI row-1 to the PI row-16 of FIG. 12 are correctable by the PI correction.

In the PI code row, in case there exist two symbol errors in which the error positions are known, since it is possible to correct the errors in which the error positions are unknown up to four symbols, the errors of the PI row-17 of FIG. 12 are correctable by the PI correction. Even in case the errors as shown in FIG. 12 occur, since they are correctable by the correction applied twice of PI-PO, the reproduction performance is improved, comparing with the case of the conventional error correction device.

FIG. 12 shows an example in case of adding two pointers for erasure correction to a piece of prepit. The pointer for erasure correction to be added may be increased to the maximum possible number of erasure corrections (10 pieces in the case of the PI code row) for the erasure correction of the code row added with the pointer for erasure correction.

Fourth Embodiment

Figure 21:
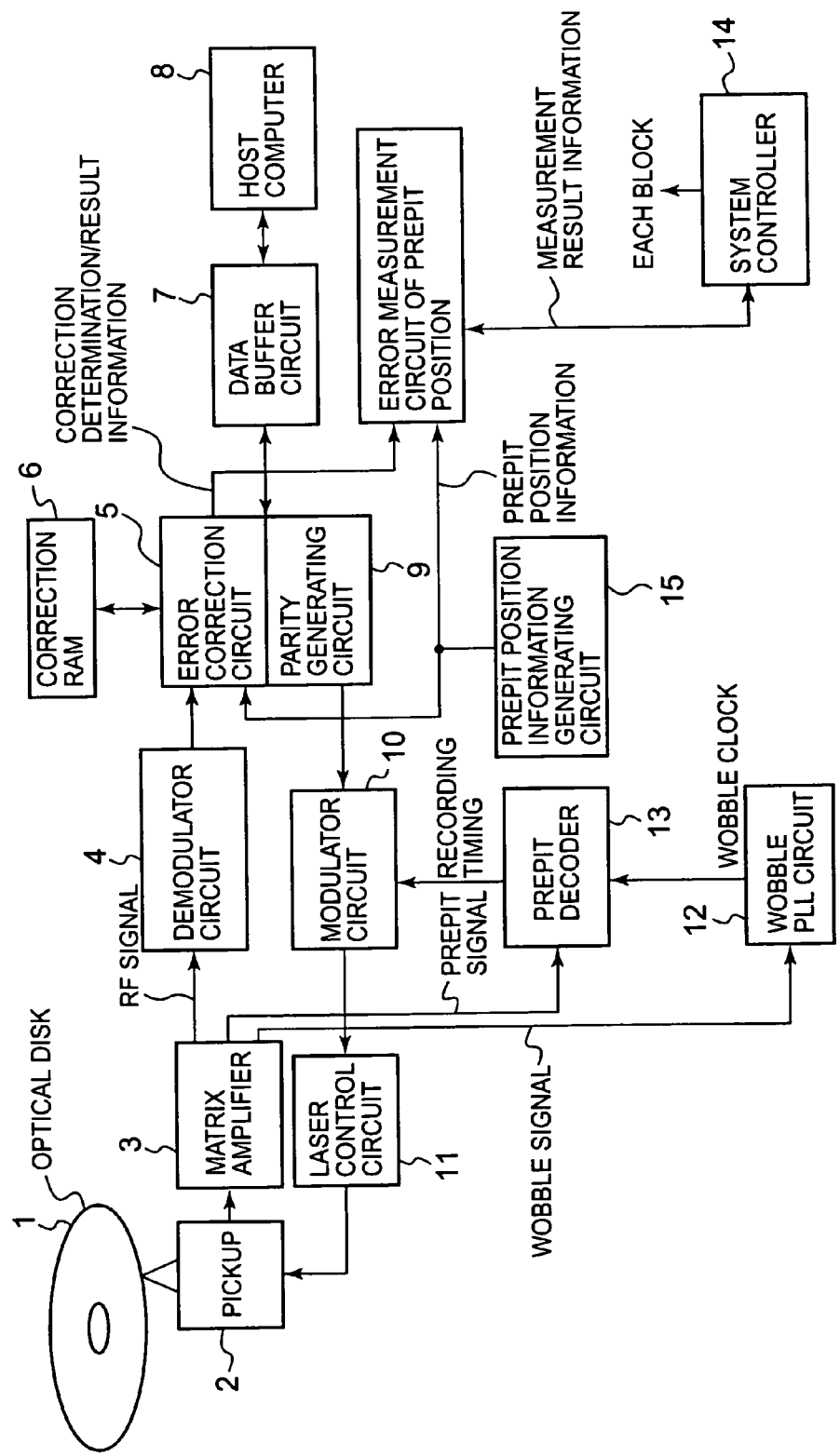
FIG. 21 is a block diagram showing the configuration of the error correction device of the optical disk according to a fourth embodiment.

The configuration of an error correction device of an optical disk according to a fourth embodiment is shown in FIG. 21

Information recorded in the optical disk 1 is read by a pickup 2, and is outputted by finding an RF signal, a wobble signal and a prepit signal in a matrix amplifier 3. The RF signal is supplied to a demodulator circuit 4, and the wobble signal is supplied to a wobble PLL circuit 12, and the prepit signal is supplied to a prepit decoder 13, respectively.

At the time of reproduction, the RF signal is demodulated by the demodulator circuit 4, and the demodulated RF signal is stored in a correction RAM 6 through an error correction circuit 5. The data stored in the correction RAM 6 is outputted to a host computer 8 through a data buffer circuit 7.

At the time of recording, recorded data is given from the host computer 8 to a parity generating circuit 9 through the data buffer circuit 7, and a parity is generated added to the recorded data.

The wobble PLL circuit 12 is inputted with a wobble signal and a wobble clock is generated, and is given to the prepit decoder 13 together with the prepit signal. The prepit decoder 13 detects recorded guide information (preformat information) recorded with address information and the like on the optical disk 1 and generates a recording timing signal, thereby to output it to a modulator circuit 10.

The modulator circuit 10, based on a recording timing signal, modulates recorded data added with a parity generated by a parity generating circuit 9, thereby to generate a modulating signal, and outputs the modulating signal to a laser control circuit 11. By the laser control circuit 11, the recorded laser of the pickup 2 is driven, whereby the recorded data is written in the optical disk 1.

Now, in DVD, a product code taking a parity of the inner code (hereinafter referred to as PI) and a parity of the outer code (hereinafter referred to as PO) as elements is adapted. In the error correction of the product code such as DVD, there exists the feature such as [it is possible to perform an erasure correction based on error position information on the inner code: PI (the outer code: PO) by the outer code: PO (the inner code: PI)". In the optical disk, when the burst errors, which are continuous errors occurred in the same row direction (data array direction of PI code) as the data rows continuously reproduced, are corrected, it is common that the error correction processing of the PI code is performed first, and then, the correction processing of the PO code in the row direction (PO code data array direction) orthogonal to the PI code is performed.

DVD-R/RW is formed with a pit referred to as a land prepit in which information such as addresses and the like are set in advance between grooves in order to record information in the grooves. This pit is a physical configurational singular point artificially formed in advance in the recording portion (storage area) of the optical disk, and the prepit decoder 13 detects this prepit.

When information recorded in the groove is read by scanning by beam spot, the reflected light component from the prepit operates as noises, comparing with the light quantity of the reflected light from the prepit, and there is a case where it is difficult to detect the information on the groove with high accuracy.

Consequently, in general, when the prepit signal exists, the reproduced signal from the optical disk tends to be disturbed. Hence, in the fourth embodiment, a pointer for erasure correction is added in advance to the prepit position in a correction block, and then, the PI correction is performed, thereby to realize the correction applied twice of PI-PO and improve the reproduction performance.

Here, the pointer for erasure correction is such that regardless of whether or not an error exists at a certain specific position (here, the prepit position on the correction block), and assuming that an error exists, instructions are issued to compulsorily perform the error correction processing in this position.

When the error correction is performed within its own code row only in a state in which the error position is unknown (here, referred to as detection correction), the number of errors one half the number of parities only can be corrected. However, in case the error position is given in advance (here, referred to as erasure correction), the same number of errors as the number of parities can be corrected.

Here, among the X number of errors within own code row only in which the error positions are not known, the Y number of errors correctable by the erasure correction given with the error position, and the Z number of parities, the following relational formula (1) is established.

$$2*X+Y \leq Z \tag{1}$$

By adding such pointer, the erasure correction is performed by assuming that an error exists in the prepit position in which an error is easy to occur, so that the number of correctable errors is increased so as to decrease the number of times for correction processing and improve the reproduction performance.

Figure 22:
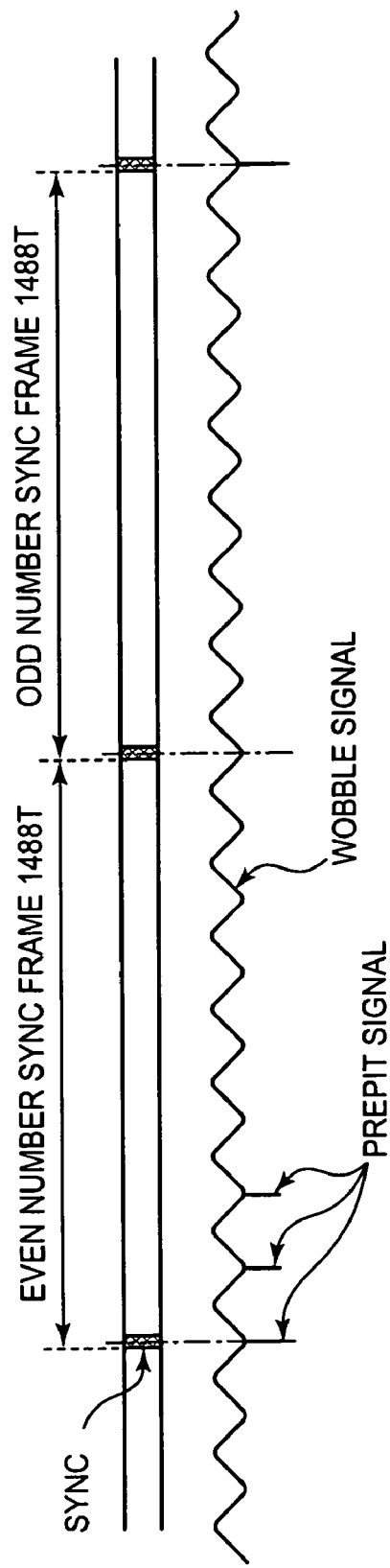
FIG. 22 is an explanatory drawing showing a recorded data, a wobble signal and a prepit signal when a prepit exists in an even number sync frame.
Figure 23:
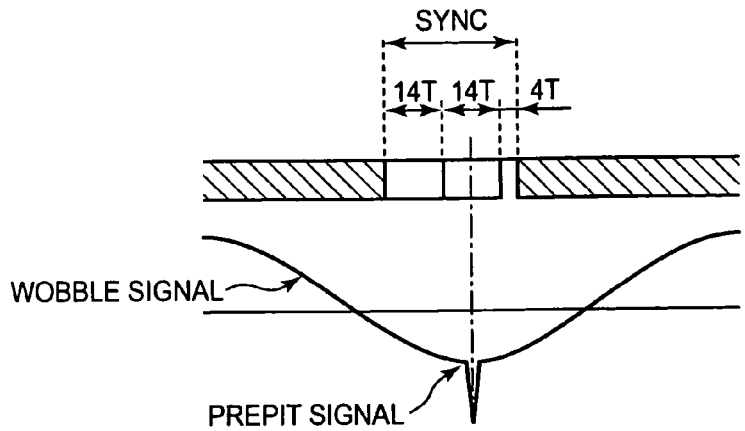
FIG. 23 is an explanatory drawing showing the relationship between a first prepit and a sync of the recorded data when the prepit exists.

In case the prepit (prepit sync) exists in an even number sync frame, the recorded data, the wobble signal, and the prepit signal have the relationship as shown in FIG. 22, and in case the prepit exists, the relationship between the first prepit and the sync (32 channel pit length (hereinafter, the channel length is referred to as T)) of the recorded data is as shown in FIG. 23.

Here, in the prepit, as described later, there exist three types of a prepit SYNC, a prepit data "1", and a prepit data "0" depending on its position and number by way of the standard.

Figure 24:
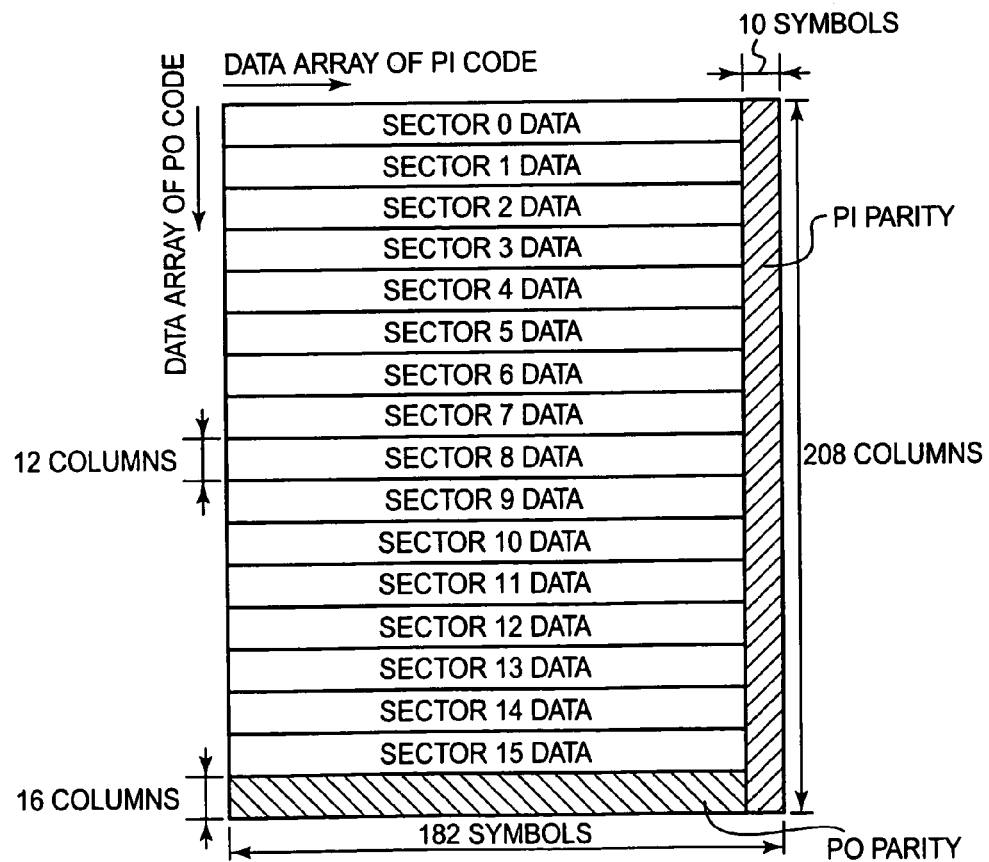
FIG. 24 is an explanatory drawing showing the configuration of one correction block.

Further, one correction block (ECC block), as shown in FIG. 24, is configured such that the PO parity is de-interleaved. One sector is configured by twenty six sync frames, and one correction block is configured by sixteen sectors.

One symbol is composed of one byte data, and is equivalent to sixteen times the channel bit length defined by the recording format when recording the recorded information, that is, equivalent to 16T. The sync frame has a length of 1488T, and the portion having a length of 32T of one sync frame head is used as information for synchronization for every sync frame.

Since the number of correctable errors in the PI code row has ten symbols in the number of PI parities for a line, the correctable number of X in its own code row only in which the error position is unknown and the correctable number of Y by the erasure correction given with the error position have the following relationship established.

$$2*X+Y \leq 10 \tag{2}$$

Since the correctable number of errors in the PO code row has sixteen symbols in the number of parities for one row, the correctable number of X in its own code row only in which the error position is unknown and the correctable number of Y by the erasure correction given with the error position have the following relationship established.

$$2*X+Y \leq 16 \tag{3}$$

Figure 25A:
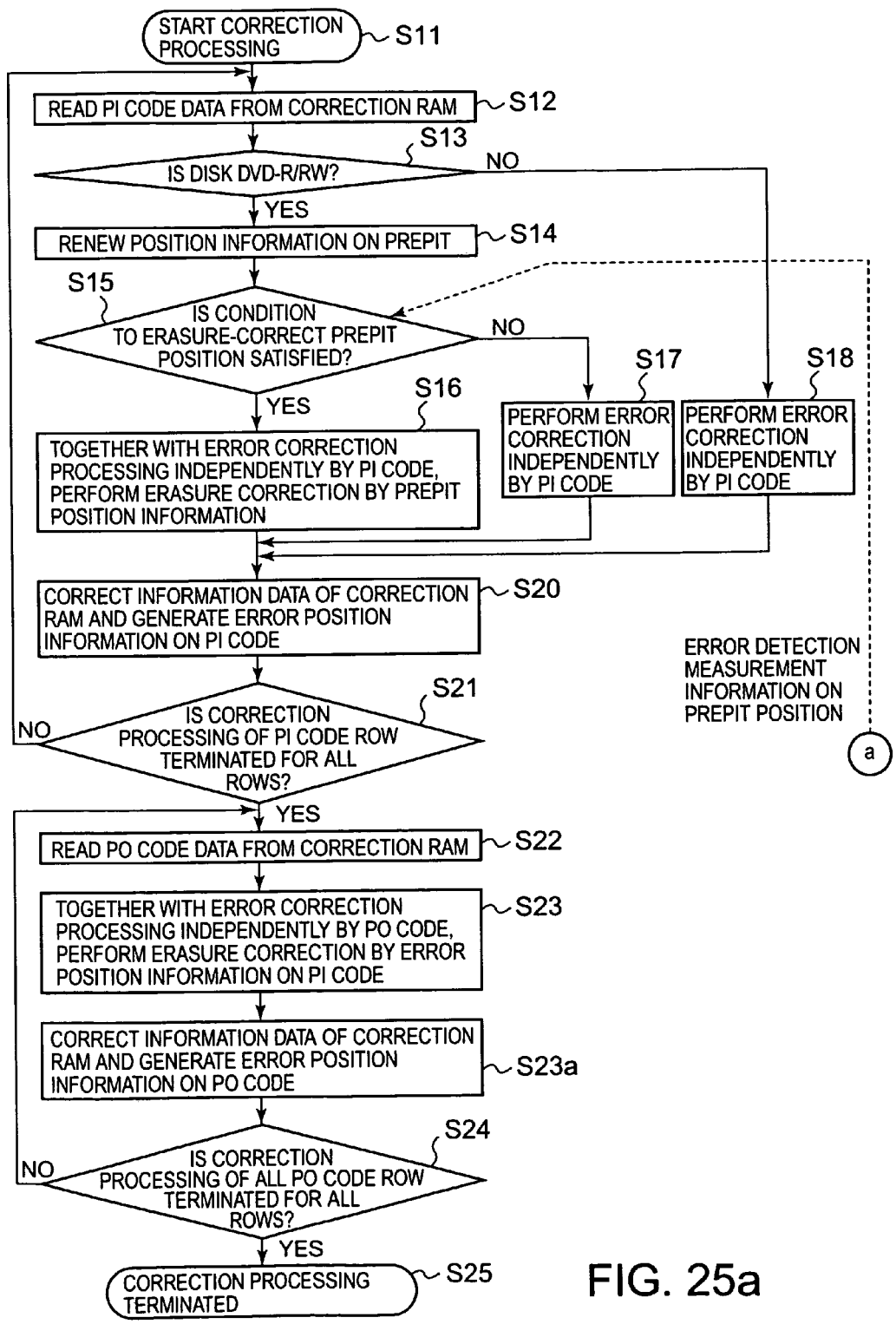
FIGS. 25a and 25b are portions of a flowchart showing a procedure of correction processing in the error correction method of the optical disk in the fourth embodiment.
Figure 25B:
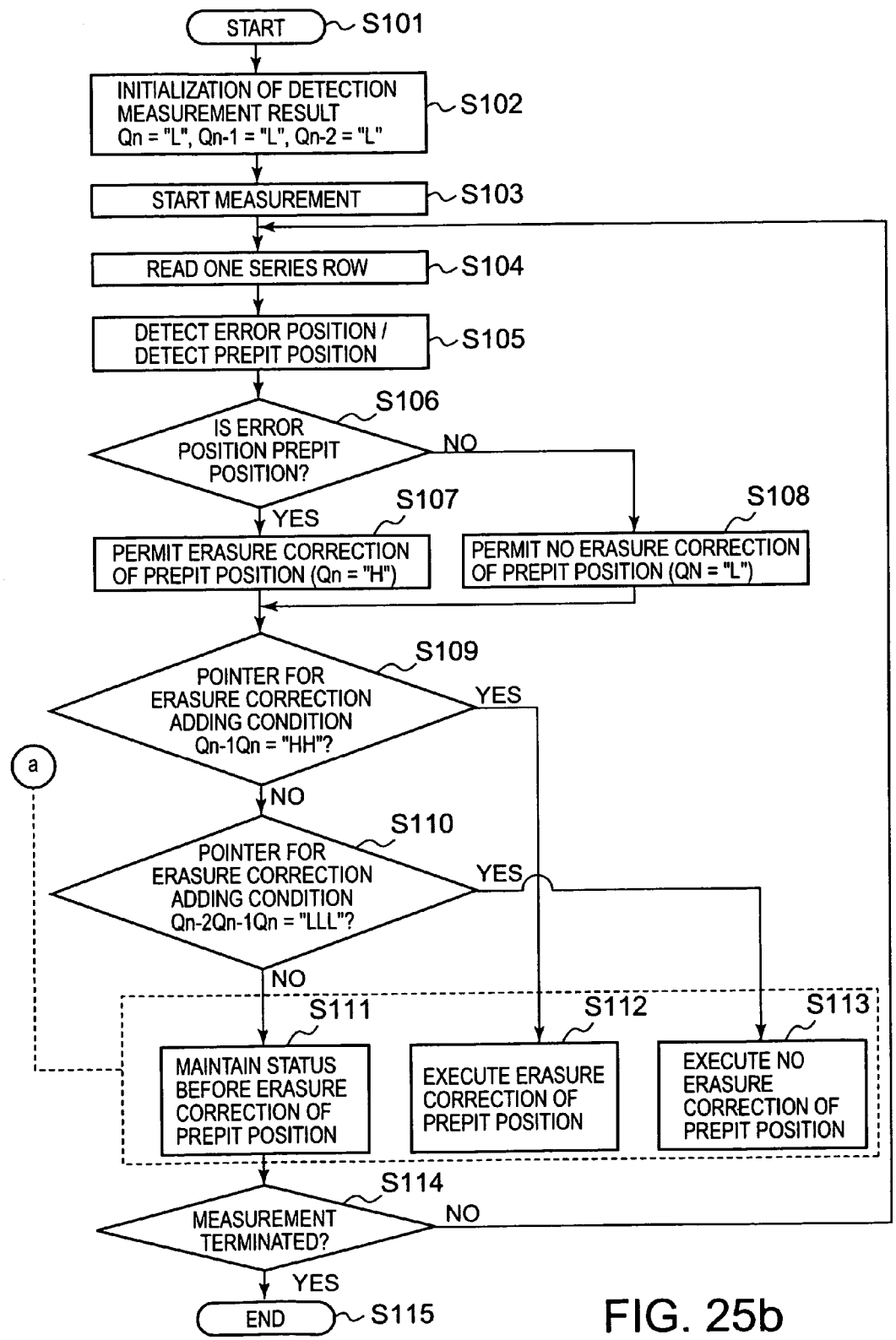

The procedure of the correction operation in the fourth embodiment will be described by using the flowchart of FIGS. 25*a* and 25*b*.

At step S11, the correction processing by the error correction circuit 5 is started.

At step S12, by the error correction circuit 5, PI code data is read from the correction RAM 6.

At step S13, by a system controller 14, the procedure determines whether or not the optical disk 1 is DVD-R/RW. In this manner, the presence or absence of a standard prepit is clarified.

In case the optical disk 1 is not DVD-R/RW, since no prepit exists, at step S18, the independent error correction by the PI code is performed, that is, the detection correction correctable in its own code row only is performed by the error correction circuit 5 without given the information regarding the error existing position, and the procedure proceeds to step S20.

In case the optical disk 1 is DVD-R/RW, the procedure proceeds to step S14, and the position information of the prepit is renewed. In this manner, by the error correction circuit 5, the prepit position in the current correction block is recognized.

At step S15, whether or not the condition to add the pointer for performing erasure-correction of the prepit position to be described later is satisfied is determined by using error detection and measurement information on the prepit position. For example, by correction processing of the correction block one piece before or continuous plural correction blocks one or more pieces before, if it becomes clear that there exist a number of errors in the prepit position in the optical disk 1, it is better to perform the erasure correction assuming that the errors exist in the prepit from the very beginning. By so doing, since the number of correctable errors can be increased, the pointer for erasure correction is added in advance.

This determination is performed by the system controller 14 or the outside controller not shown in FIG. 21. If the condition is not satisfied, at step S17, the independent error correction by the PI code is performed.

Here, the independent detection correction by the PI code, as described above, can be performed up to five pieces per a row of the PI code data shown in FIG. 24, and in case there exists six or more pieces, the detection correction is not possible, and this step is terminated in a state in which it is unknown where the error exists in this row.

In case the condition to perform the erasure correction is satisfied, at step S16, the independent error correction by the PI code is performed, and at the same time, that is, the detection correction existing in a random manner at other than the prepit position and an erasure correction compulsorily performed in the prepit position by using the prepit position information are performed.

At step S20, by the error correction circuit 5, the correction of the information data stored in the correction RAM 6 is performed, and further, the error position information on the PI code regarding the error position existed in this PI code row is generated.

At step S21, the procedure determines whether or not the correction processing of the PI code row is terminated for all the rows, and if not terminated, the procedure returns to step S12, and if terminated, the procedure proceeds to step S22.

At step S22, by the error correction circuit 5, the PO code data is read from the correction RAM 6.

At step S23, together with the independent detection correction by the PO code without given the information regarding the error existing position, the erasure correction by using the generated error position information on the PI code is performed by the error correction circuit 5.

At step S24, the procedure determines whether or not the correction processing of the PO code row is terminated for all the rows, and if not terminated, the procedure returns to step S22, and if terminated, at step S25, the procedure terminates the correction processing.

Next, a routine for generating error detection and measurement information on the prepit position will be described, which is used when determining whether or not the condition to perform the erasure correction of the prepit position is satisfied.

At step S101, the system controller controls a start of the error detection and measurement of the prepit position.

At step S102, the error detection and measurement result of the prepit position Q is initialized ($Q_n$="L", $Q_{n-1}$="L", $Q_{n-2}$="L").

At step S103, the error detection and measurement processing of the prepit position is started.

At step S104, the data of one code row (PI code row) is read, thereby to detect the prepit position and the error position.

At step S105, the prepit position is detected based on prepit position information generated by a prepit position information generating circuit, and the error position detection is performed based on information on the correction processing by the error correction circuit of one code row.

At step S106, in case the error position is a prepit position, as step S107, the error detection and measurement result of the prepit position is set with instructions to the effect that the erasure correction of the prepit position is permitted ($Q_n$="H").

In case the error position is not the prepit position, as step S108, the error detection and measurement result of the prepit position is set with instructions to the effect that the erasure correction of the prepit position is not permitted ($Q_n$="L").

At step S109, in case the condition to add the pointer for erasure correction to the prepit position is satisfied (in case the erasure correction of the prepit position is permitted in two rows of the continuous PI code rows ($Q_{n-1}$ $Q_n$="HH")), as step S112, the error detection and measurement information on the prepit position to the effect that the erasure correction of the prepit position is performed is generated.

At step S110, in case the condition to erase the pointer for erasure correction in the prepit position is satisfied (in case the erasure correction of the prepit position is not permitted in three rows of the continuous PI code rows ($Q_{n-2}$ $Q_{n-1}$ $Q_n$="LLL")), as step S113, the error detection and measurement information on the prepit position to the effect that the erasure correction is not executed in the prepit position is generated.

In case neither the condition to add the pointer for erasure correction to the prepit position nor the condition to erase the pointer for erasure correction in the prepit position is satisfied, as step S111, the error detection and measurement information on the prepit position to the effect that the previous state is maintained regarding the erasure correction in the prepit position is generated.

At step S114, if the measurement termination condition set up by the system controller 14 is satisfied, at step S115, the measurement is terminated, and if not satisfied, the procedure returns to step S104, and starts the measurement processing.

Although the foregoing routine is a processing for the error detection and measurement in one prepit position, the same processings are performed for other prepit positions.

In the present fourth embodiment, though the start of the error detection and measurement of the prepit position is controlled from the system controller 14, it may be coupled with the correction processing of the error correction circuit 5.

In the present fourth embodiment, though the error position detection is based on the correction processing by the error correction circuit 5 of one code row, an exclusive circuit may be provided for error position detection.

Figure 26:
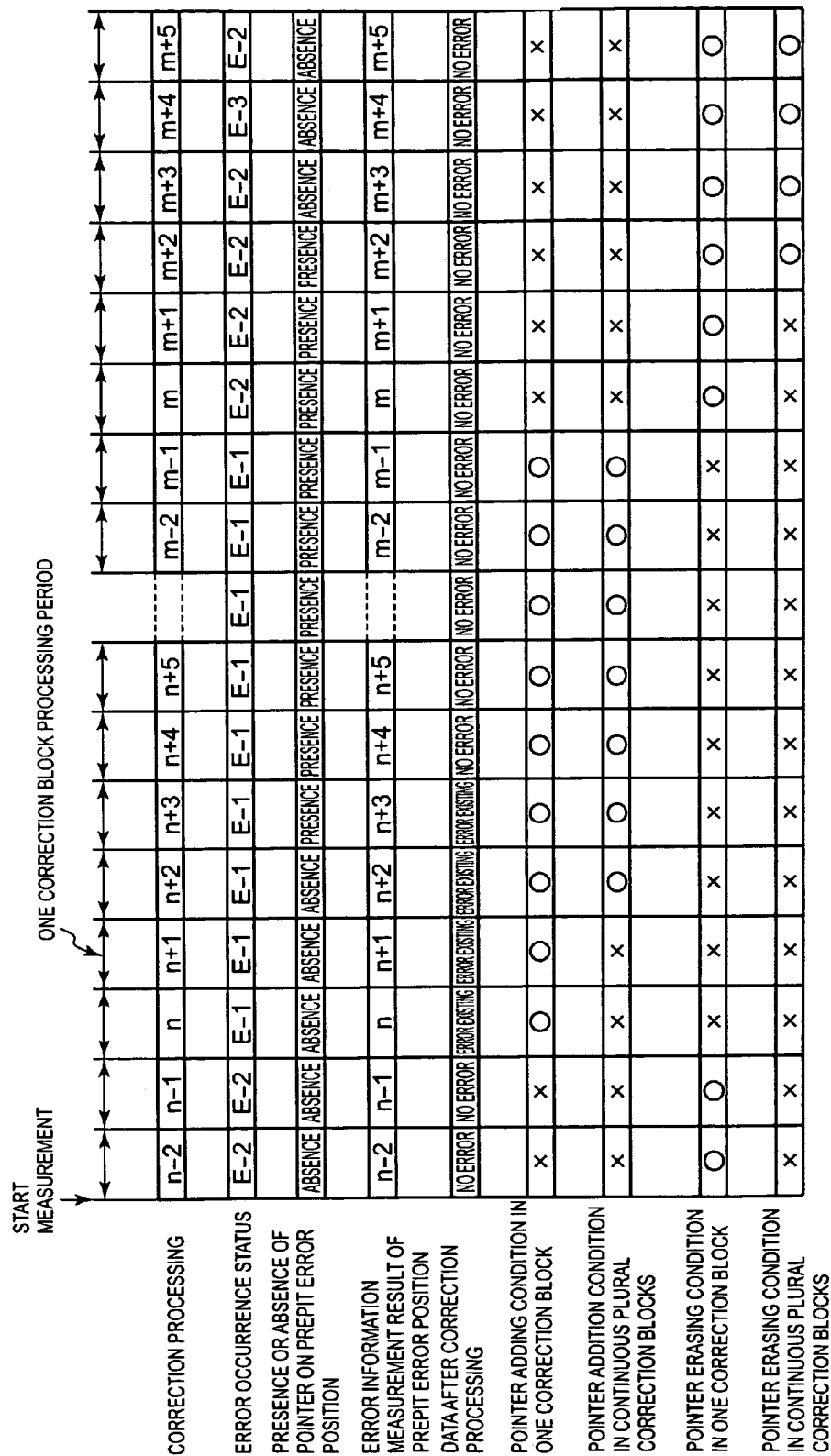
FIG. 26 is an explanatory drawing showing the presence or absence of a pointer for erasure correction of an error occurrence status of the correction block reproduced from the optical disk and a prepit position.

In FIG. 26 is shown an example of the error occurrence status for every correction processing block, the presence or absence of the pointer for erasure correction of the prepit error position, the error information measurement result of the prepit error position, the data after correction processing, the pointer adding condition for erasure correction in one correction block, the pointer adding condition for erasure correction in the continuous plural correction blocks, the erasing condition of the pointer for erasure correction in one correction block, and the erasing condition of the pointer for erasure correction in the continues plural correction blocks.

Signs "n−2, n−1, n, n+1, ..." are used for the correction block performing a processing to erase the pointer for erasure correction, and signs "m−2, m−1, m, m+1, ..." are used for the correction block performing a processing to add the pointer for erasure correction.

Figure 27:
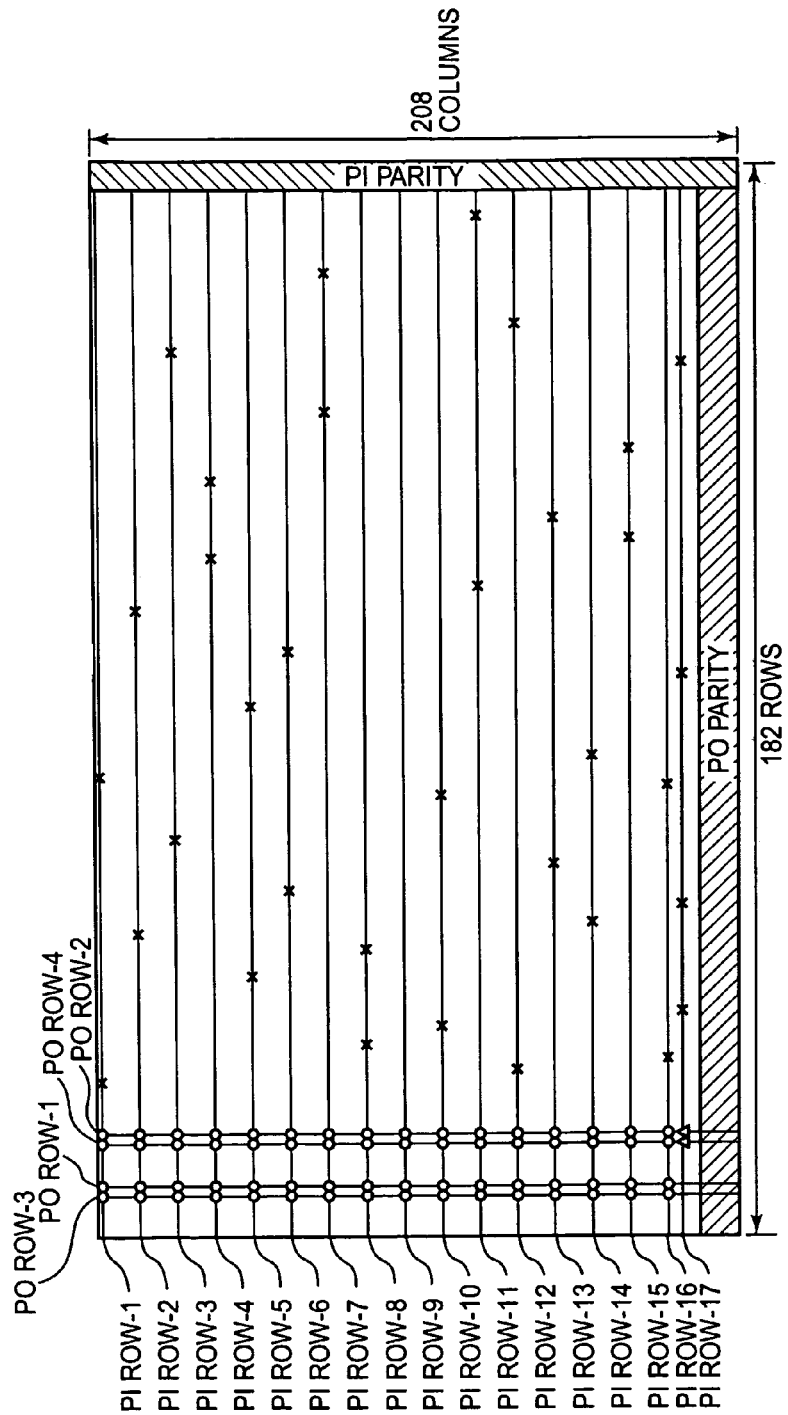
FIG. 27 is an explanatory drawing showing the error occurrence status on the correction block in case a two symbol error occurred due to the effect of the prepit and other errors occur.
Figure 28:
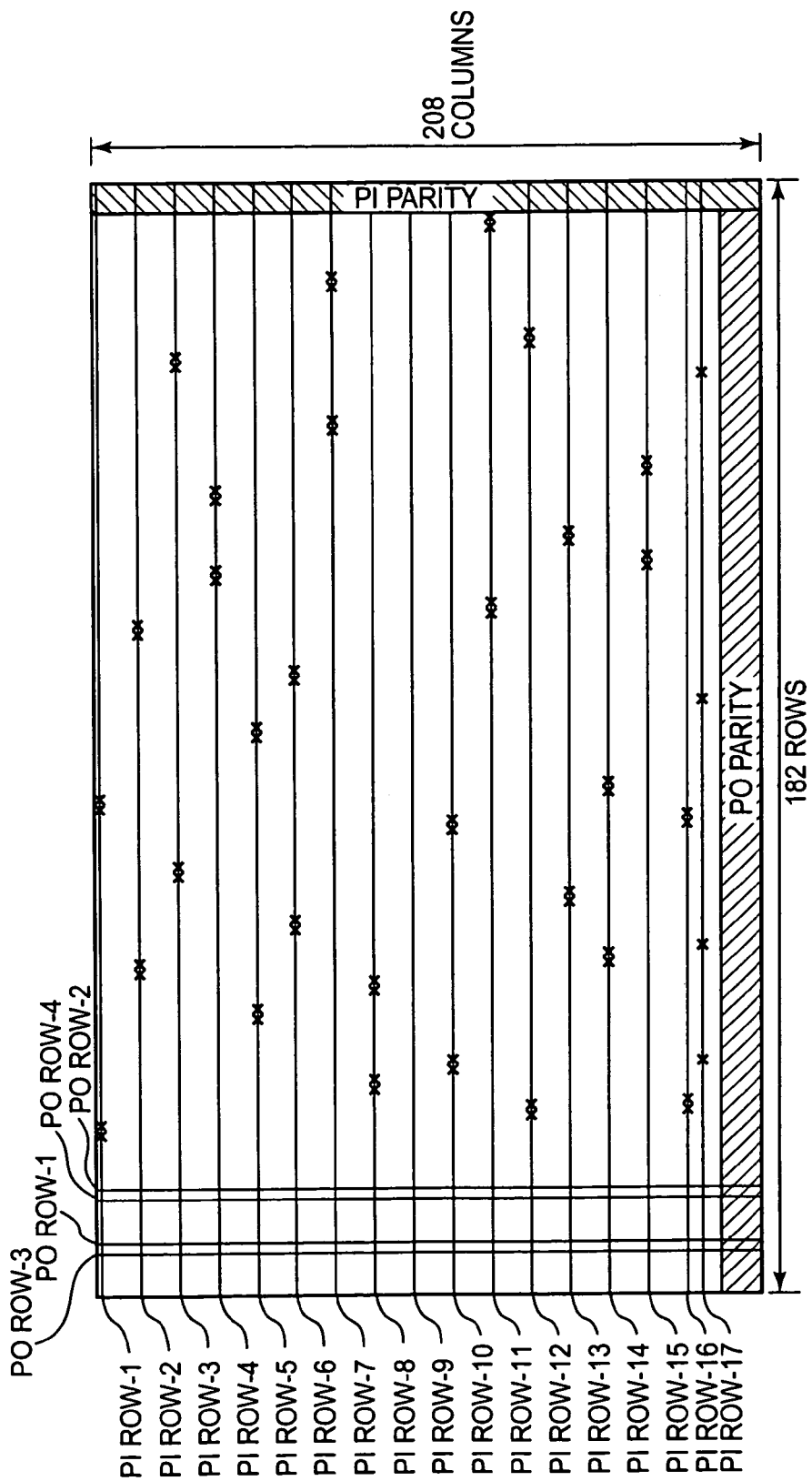
FIG. 28 is an explanatory drawing showing the error occurrence status on the correction block in case an error occurs on other than the prepit position.
Figure 29:
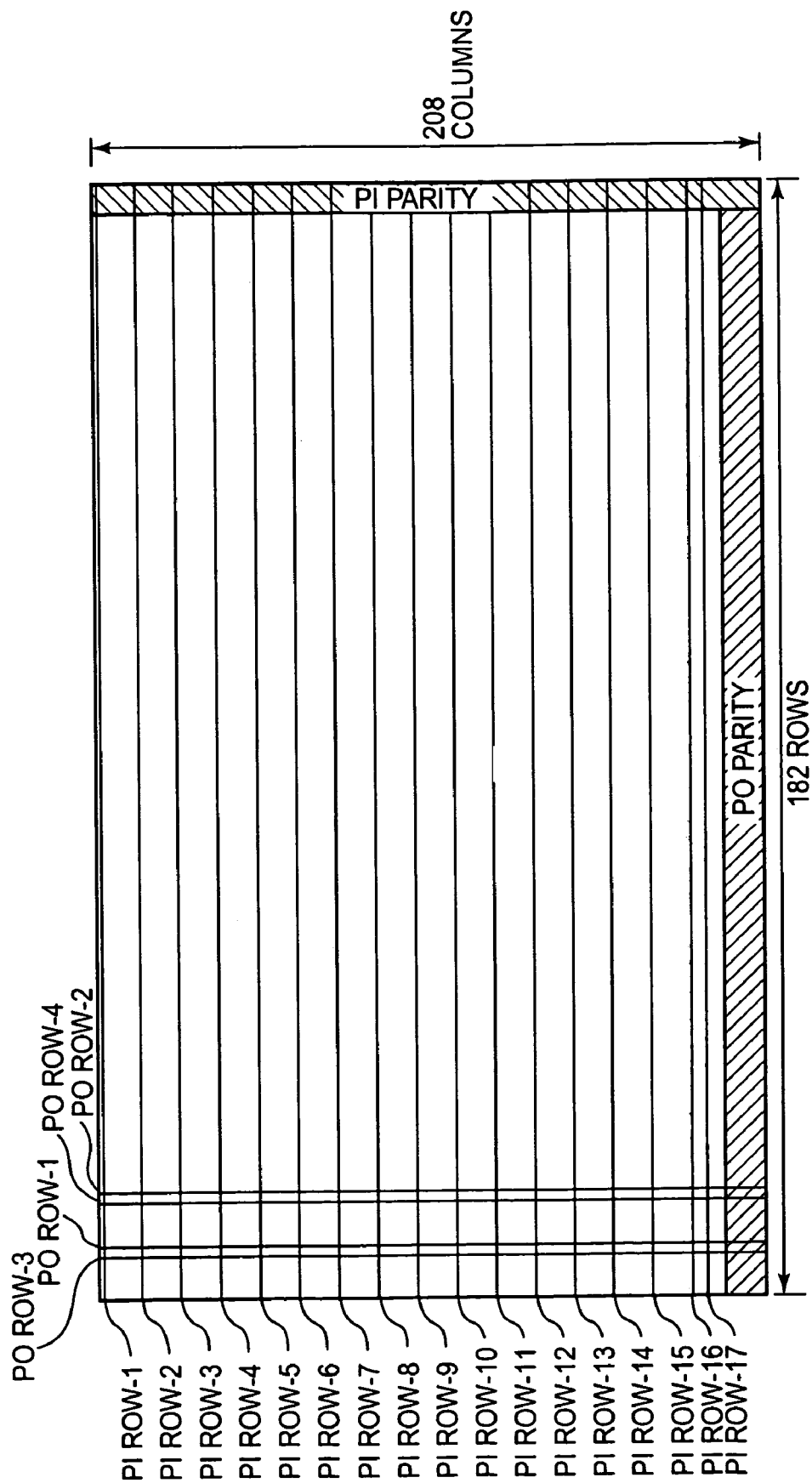
FIG. 29 is an explanatory drawing showing the correction block in case no error occurs.

As the error occurrence status, a sign "E−1" shows the error occurrence status as shown in FIG. 27, a sign "E−2" shows the error occurrence status as shown in FIG. 28, and a sign "E−3" shows the error non-occurrence status as shown in FIG. 29, respectively.

In the Figure, the "presence" in "the presence or absence of the pointer of the prepit error position" shows the addition of the pointer for erasure correction, and the "absence" shows the erasure of the pointer for erasure correction.

"The data after correction processing" shows the presence or absence of the error included after the correction applied twice of PI-PO is performed.

"O" in "the adding condition in one correction block" or "the erasing condition in one correction block" shows a block satisfying the adding condition or the erasing condition in one correction block, and "X" shows a block not satisfying the condition.

Further, "O" in the "pointer adding condition" or the "pointer erasing condition" shows each condition satisfied, and "X" shows each condition not satisfied.

The errors shown in FIG. 27 continuously occur along the longitudinal (PO row) direction by the prepit.

In the Figure, "O" shows one symbol error by the prepit sync, "Δ" shows one symbol error by prepit data "1", and "X" shows errors occurred in a random manner.

The PI rows-1 to 16 shows that the errors occur in the prepit sync position, that is, in the positions of the PO row-1 and the PO row-2, and in the position next to the prepit sync position, that is, in the symbols of the positions of the PO row-3 and the PO row-4, and further, the errors occur in other two random places, thereby a total of six symbols are in error.

Further, the PI row-17 shows a state in which the errors occur in the prepit data position, that is, in the position of the PO row-2 and its next position, and in the symbol of the position of the PO row-4, and in addition, four symbol errors occur, thereby a total of six symbols are in error.

When the occurrence number of errors is within five pieces in one PI row, it is possible to perform the PI correction within own code row without given the error position information. In case the occurrence number of errors exceeds five pieces, it is totally impossible to perform the PI correction within own code row only.

In the errors shown in FIG. 28, the errors due to the prepit do not occur at all, but random errors only occur.

The PI rows-1 to 17 show that four symbols are in error in the prepit sync position, that is, in the positions of the PO row-1 and the PO row-2 and in the position next to the prepit sync position, that is, in other than the positions of PO row-3 and the PO row-4.

In the correction block shown in FIG. 29, the PI rows-1 to 17 show that no error occurs at all in the prepit sync position, that is, in the positions of the PO row-1 and the PO row-2, and in the position next to the prepit sync position, that is, in the positions of the PO row-3 and the PO row-4, and further, in other positions than the foregoing.

Figure 30:
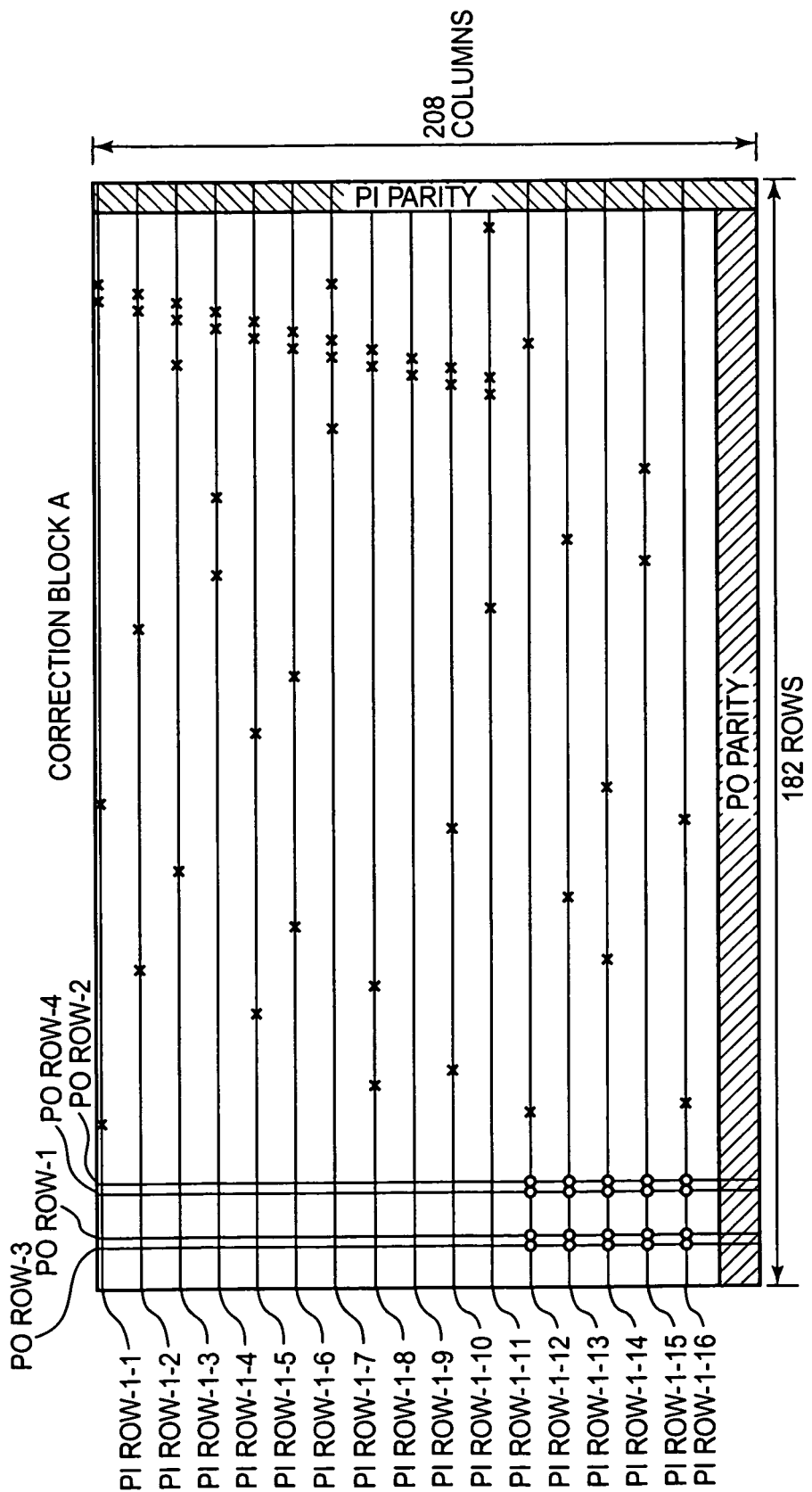
FIG. 30 is an explanatory drawing showing the error occurrence status on a correction block A in case two symbol errors occur due to the effect of the prepit (even number position) and other errors occur.
Figure 31:
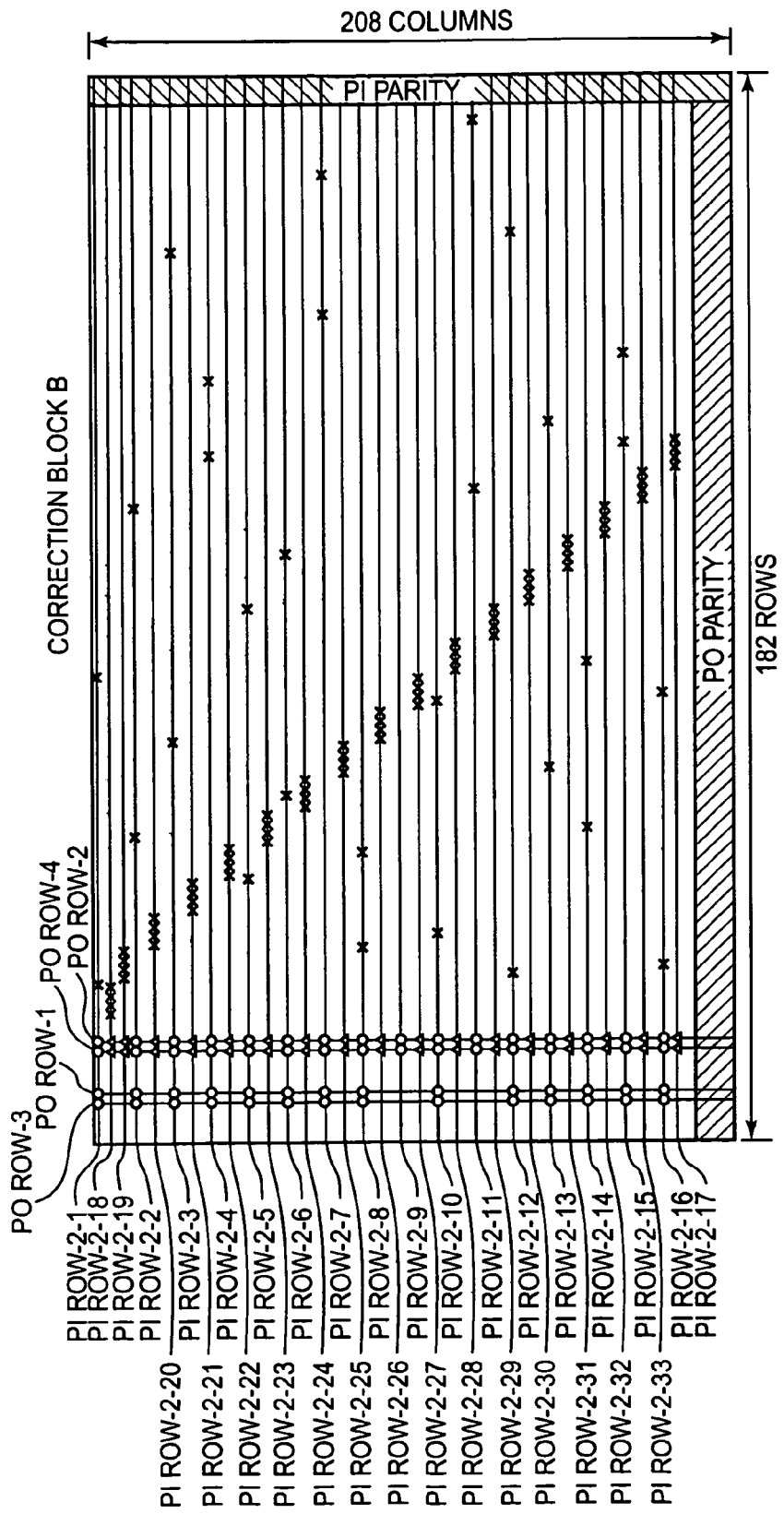
FIG. 31 is an explanatory drawing showing the error occurrence status on a correction block B in case two symbol errors occur due to the effect of the prepit (even number position) and other errors occur.
Figure 32:
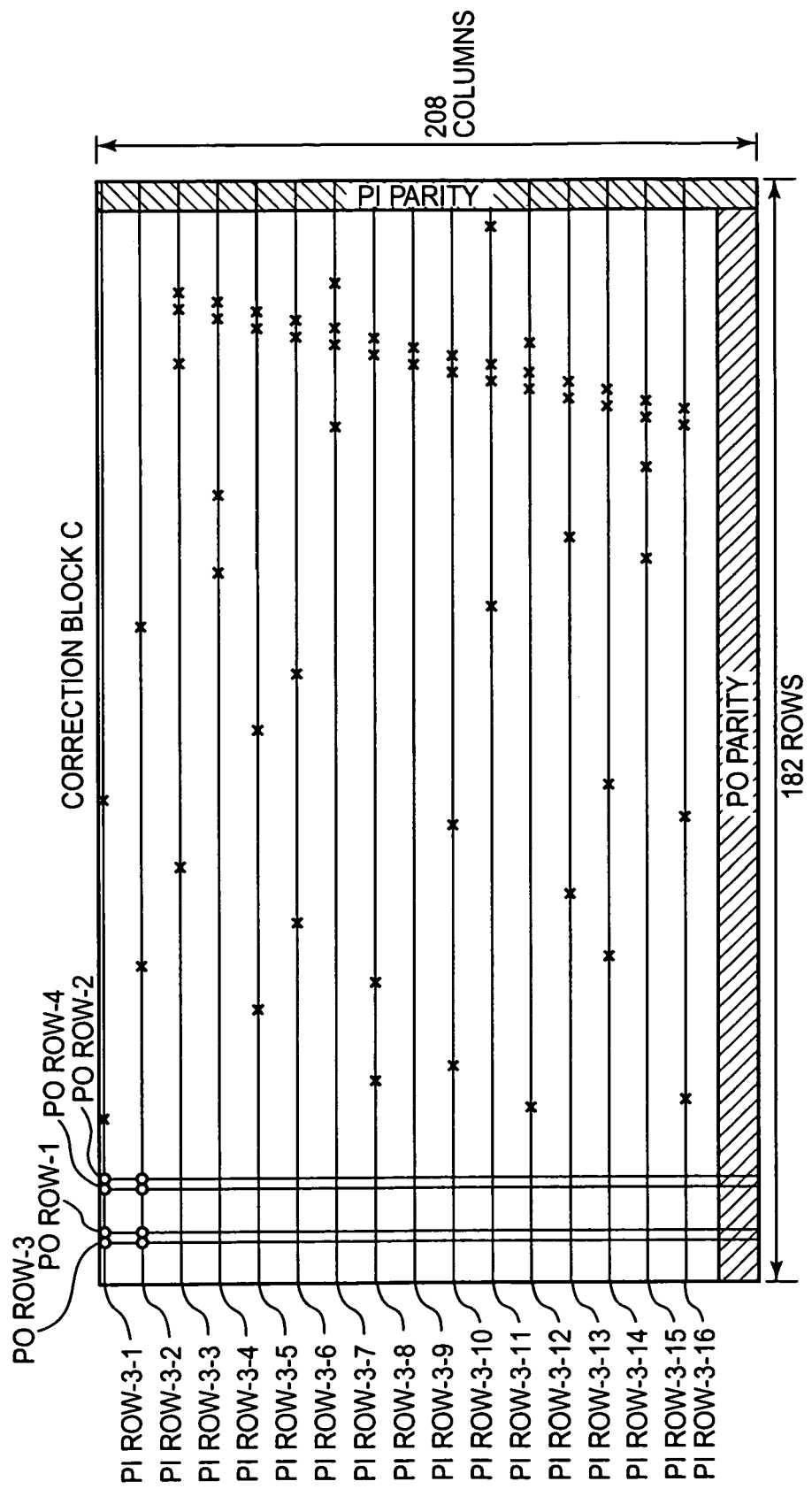
FIG. 32 is an explanatory drawing showing the error occurrence status on a correction block C in case two symbol errors occur due to the effect of the pre-it (even number position) and other errors occur.

Next, as the data reproduced from the optical disk 1, a correction block A is shown in FIG. 30, a correction block B in FIG. 31, and a correction block C in FIG. 32 in a reproduced order.

The correction block A in FIG. 30 shows that, from PI rows-1-1 to 11, four symbols are in error in the prepit sync positions, that is, in the positions of the PO row-1 and the PO row-2, and in the position next to the prepit sync position, that is, in the positions other than the PO row-3 and the PO row-4.

From the PI rows-1-12 to 1-16, the errors occur in four symbols in the prepit sync position and in the position next to the prepit sync position, and the errors occur in two symbols in other positions, thereby the errors occur in a total of six symbols.

The correction block B in FIG. 31 shows that, from the PI rows-2-1 to 2-8, 2-10, and 2-12 to 2-16, the errors occur in four symbols in the prepit sync position and in the position next to the prepit sync position, and the errors occur in two symbols in other positions, thereby a total of six symbols are in error.

In the PI row 2-9, the errors occur in two symbols in the prepit sync position (position of the PO row-2) and in the position (position of the PO row-4) next to the prepit sync position, and no error occurs in the prepit sync position (position of the PO row-1) and in the position (position of the PO row-3) next to the prepit sync position. Thus, the errors occur in a total of two symbols.

In the PI row 2-11, the errors occur in two symbols in the prepit sync position (position of the PO row-2) and in the next position (position of the PO row-4) next to the prepit sync position, and no error occurs in the prepits sync position (position of the PO row-1) and in the position (position of the PO row-3) next to the prepit sync position. In the prepit sync position and the position other than the position next to the prepit sync position, the errors occur in two symbols, thereby a total of four symbol errors occur.

In the PI rows 2-17 to 2-33, the errors occur in two symbols in the prepit data position and in the position next to the prepit data position, and the errors occur in four symbols in other positions, thereby the errors occur in a total of six symbols.

The correction block C in FIG. 32 shows that, in the PI rows 3-1 and 3-2, the errors occur in four symbols in the prepit sync position and the position next to the prepit sync position, and the errors occur in two symbols in other positions, thereby a total of six symbols are in error.

In the PI rows 3-3 to 3-16, the errors occur in four symbols in the prepit sync position and in the position other than the position next to the prepit sync.

Figure 33:
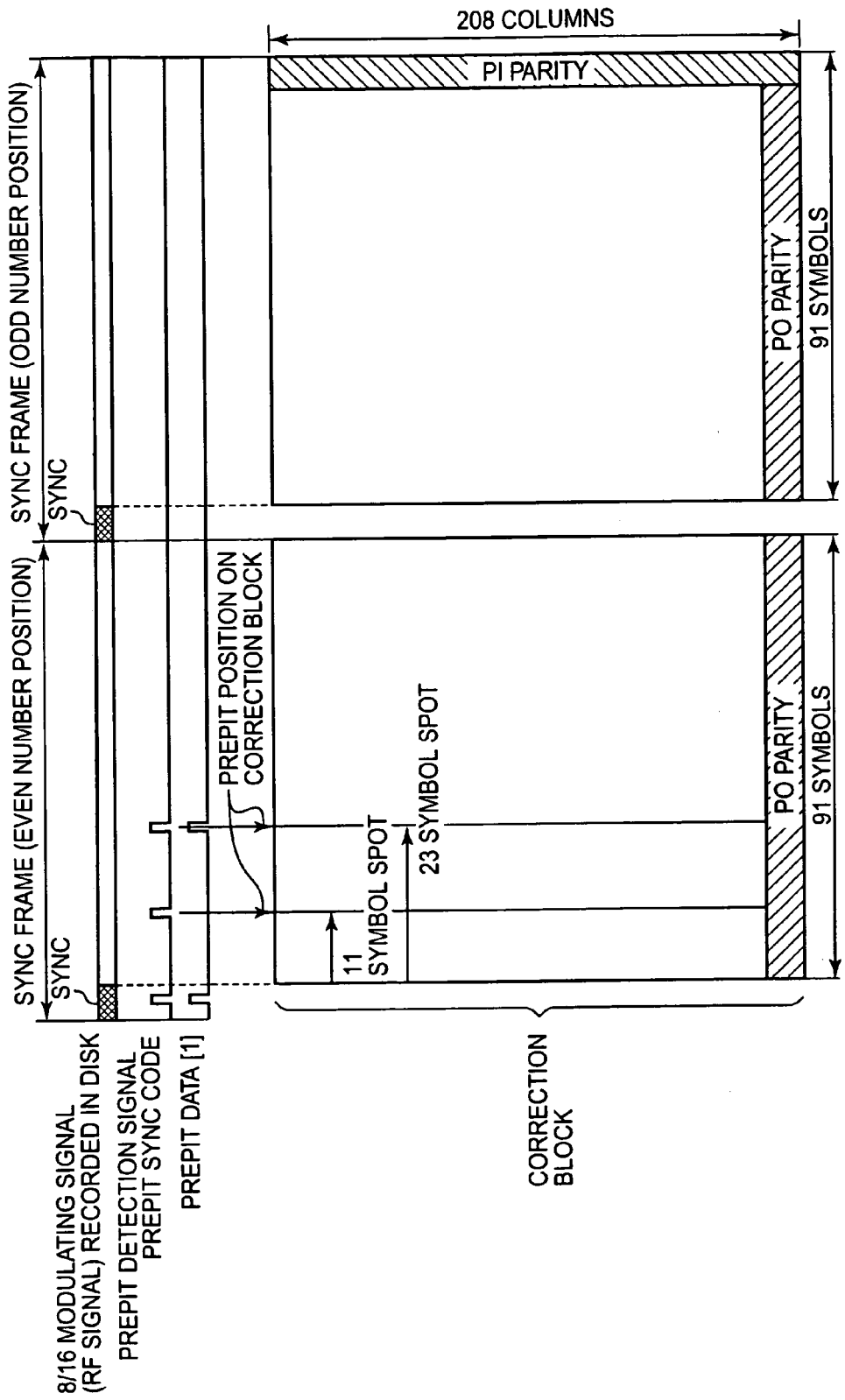
FIG. 33 is an explanatory drawing showing the relationship between the data position and the prepit position in the correction block.

In FIG. 33 is shown the relationship between the prepit detection signal where when the prepit is detected a pulse occurs in that position and detects any of three types of the prepits, and the symbol position on the correction block of the recorded data recorded in conformity to the standard.

The recorded data recorded in the optical disk 1 is usually recorded in conformity to the standard. Hence, with respect to the position on the correction block of the second prepit of the prepit sync in the even number position, as shown in FIG. 32, the eleventh symbol from the leading head of the PI code row corresponds to the position of the PO row-1 in the correction blocks A to C, and the twenty third symbol from the leading head of the PI code row corresponds to the third prepit sync, and the position of the PO row-2 on the correction blocks A to C of the second prepit of the prepit data "1".

Further, in case the recorded data is recorded in conformity to the standard, the prepit sync exists in the first line of the sector leading head, and the prepit data exists in the subsequent second to thirteenth lines.

A prepit position information generating circuit 15 shown in FIG. 21 generates prepit position information which takes the position of the PO row-1 of the PI row-1-1 to 1-16 in the correction block A, and the PI row-2-1 to 2-16 in the correction block B and the PI row-3-1 to 3-16 in the correction block C and the positions of the PO row-2 in the correction blocks A to C as the prepit positions, and output such information to an error measurement circuit 16 of the prepit position.

The error measurement circuit 16 of the prepit position detects the presence or absence of the prepit position errors from a correction status of the PI code row of the prepit position generated by the prepit position information generating circuit 15.

Here, the correction status is information regarding the presence or absence of the errors in the PI code row or the PO code row, correction possible or impossible, error positions, the number of errors, and the like.

Figure 34:
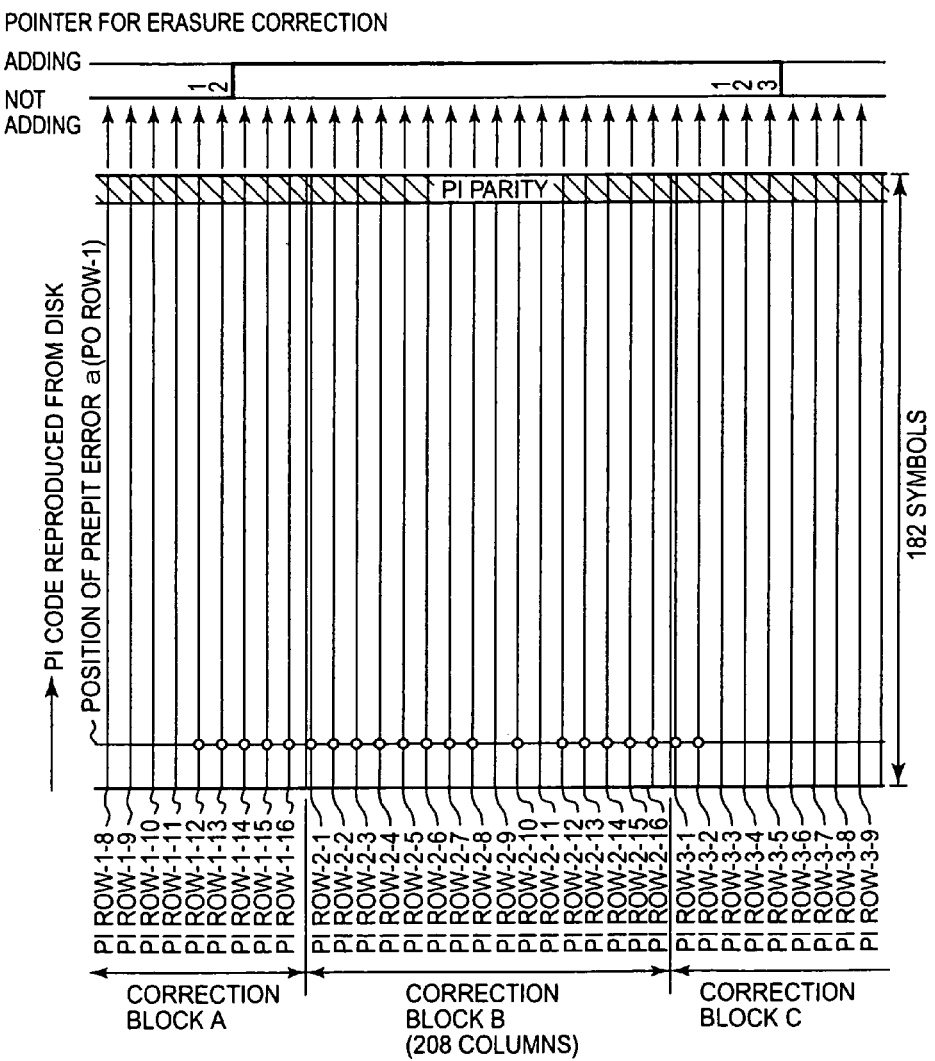
FIG. 34 is an explanatory drawing showing the positional relationship between the PI code row and the prepit error reproduced from the optical disk.

In FIG. 34 is shown the relationship between the presence or absence of the errors of the PO row-1, which are the prepit positions of the correction blocks A to C, and PI code row sequence reproduced from the optical disk 1. Incidentally, the position of a prepit error "a" corresponds to the PO row-1.

The PI rows 1-8 to 1-11, 2-9, 2-11, and 3-3 to 3-9 are in a state in which no error occurs in the position of the prepit error a, and the PI rows 1-12 to 1-16, 2-1 to 2-8, 2-10, 2-12 to 2-16, and 3-1 to 3-2 are in a state in which errors occur in the position of the prepit error a.

As the condition to add the pointer for erasure correction to the prepit position, for example, in case the errors continuously occur in the prepit position in two rows of the PI code row in which the prepits exist, probability of the errors existing in the prepit positions is high, and since it is considered that processing efficiency is increased if correction is made on the assumption that there exist the errors, the pointer for erasure correction is added to the prepit position. Further, in case no error continuously occurs in the prepit position in three continuous rows of the PI code row in which the prepits exist, it is considered that probability of no error existing in the prepit position is high, and in this case, it is better not to perform the erasure correction at the prepit position because the number of errors correctable at other random positions can be increased, and therefore, the pointer for erasure correction at the prepit position is erased. Hereinafter, such condition is referred to as a condition $\alpha$.

In the PI correction shown in FIG. 34, the errors occur in the position of the prepit error a in two continuous rows of the PI rows-1-12 and 1-13. In this case, since the condition $\alpha$ is satisfied, a signal to the effect that the pointer for erasure correction is added to the prepit position is transmitted to the system controller 14 from the error measurement circuit 16 of the prepit position.

Subsequent to the PI row-3-3, no error occurs in the position of the prepit error a. In the PI row-3-5, the rows, in which no error occurs in the position of the prepit error a, continue in three rows, thereby satisfying the condition $\alpha$. Hence, a signal to the effect that the pointer for erasure correction added to the prepit position is erased is transmitted to the system controller 14 from the error measurement circuit 16 of the prepit position.

Such error detection and measurement in the position of the PO row-1, that is, in the position of the prepit error "a" are similarly performed for other prepit positions, that is, for the PO row-2 to 4 also.

In case the error correction circuit 5 receives the signal to the effect that the pointer for erasure correction is added to the prepit position from the system controller 14, the pointer for erasure correction is added to the prepit position, thereby to perform the PI correction. Further, in case the signal to the effect that the pointer for erasure correction is erased in the prepit position is received from the system controller 14, the error correction circuit 5 performs the independent correction by the PI code without adding the pointer for erasure correction to the prepit position.

Taking the correction block A shown in FIG. 30 as an example, in the PI rows-1-1 to 11, the pointers for erasure correction are not added to the prepit positions of the PO rows-1 to 4, and the independent correction by the PI code is performed. Hence, the errors of the PI rows-1-1 to 11 are corrected by the PI correction.

In the PI rows-1-12 and 13, since the pointers for erasure correction are not added to the prepit positions of the PO rows-1 to 4, the independent correction by the PI code is performed. The errors of the PI rows-1-12 and 1-13 are not corrected by the PI correction, but can be corrected by the PO correction.

In the PI rows-1-14 to 1-16, the pointers for erasure correction are added to the prepit positions of the PO row-1 to 4. Hence, in these prepit positions, together with the independent detection correction by the PI code for random errors other than the prepit positions, the erasure correction of the prepit positions is performed. The errors of the PI rows-1-14 to 1-16 are corrected by the PI correction only.

Taking the correction block B shown in FIG. 31 as an example, in the PI rows-2-1 to 2-16, the pointers for erasure correction are added to the prepit positions of the PO rows-1 to 4. Hence, together with the independent correction by the PI code, the erasure correction of the prepit positions is performed. The errors of the PI rows-2-1 to 2-16 are corrected by the PI correction only.

In the PI rows-2-17 to 2-33, the pointers for erasure correction are added to the prepit positions of PO rows-2 and 4. Hence, together with the independent correction by the PI code, the erasure correction of the prepit positions is performed. The errors of the PI rows-2-17 to 2-33 are corrected by the PI correction only.

Taking the correction block C shown in FIG. 32, in the PI rows-3-1 and 3-2, the pointers for erasure correction are added to the prepit positions of the PO rows-1 to 4. Hence, together with the independent correction by the PI code, the erasure correction of the prepit positions is performed. The errors of the PI rows-3-1 and 2 are corrected by the PI correction only.

In the PI rows-3-3 to 3-5, the pointers for erasure correction are added to the prepit positions of PO rows-1 and 4. Hence, together with the independent correction by the PI code, the erasure correction of the prepit positions is performed. The errors of the PI rows-3-3 to 3-5 are not correctable by the PI correction only, but by the subsequent PO correction, all the errors can be corrected.

According to the present fourth embodiment, in case the errors as shown in the correction blocks A, B, and C occur, since the errors can be corrected by the correction applied twice of PI-PO, the reproduction performance is improved.

Now, with respect to the error detection of the prepit position, when the correction result of the PI code row becomes uncorrectable, regardless of the presence or absence of the symbol error of the prepit position, in the prepit position, "error exists" may be indicated, or "no error exists" may be indicated.

In the present fourth embodiment, the setting of the condition $\alpha$ is performed based on the number of errors in which the errors continuously occur in the position of the prepit error a. However, even in case the errors noncontinuously occur in the position of the prepit error a, a condition may be set up such that the pointer for erasure correction is added to the position of the prepit error a in case the total occurrence number of errors of the position of the prepit error a satisfies the predetermined number.

Figure 35A:
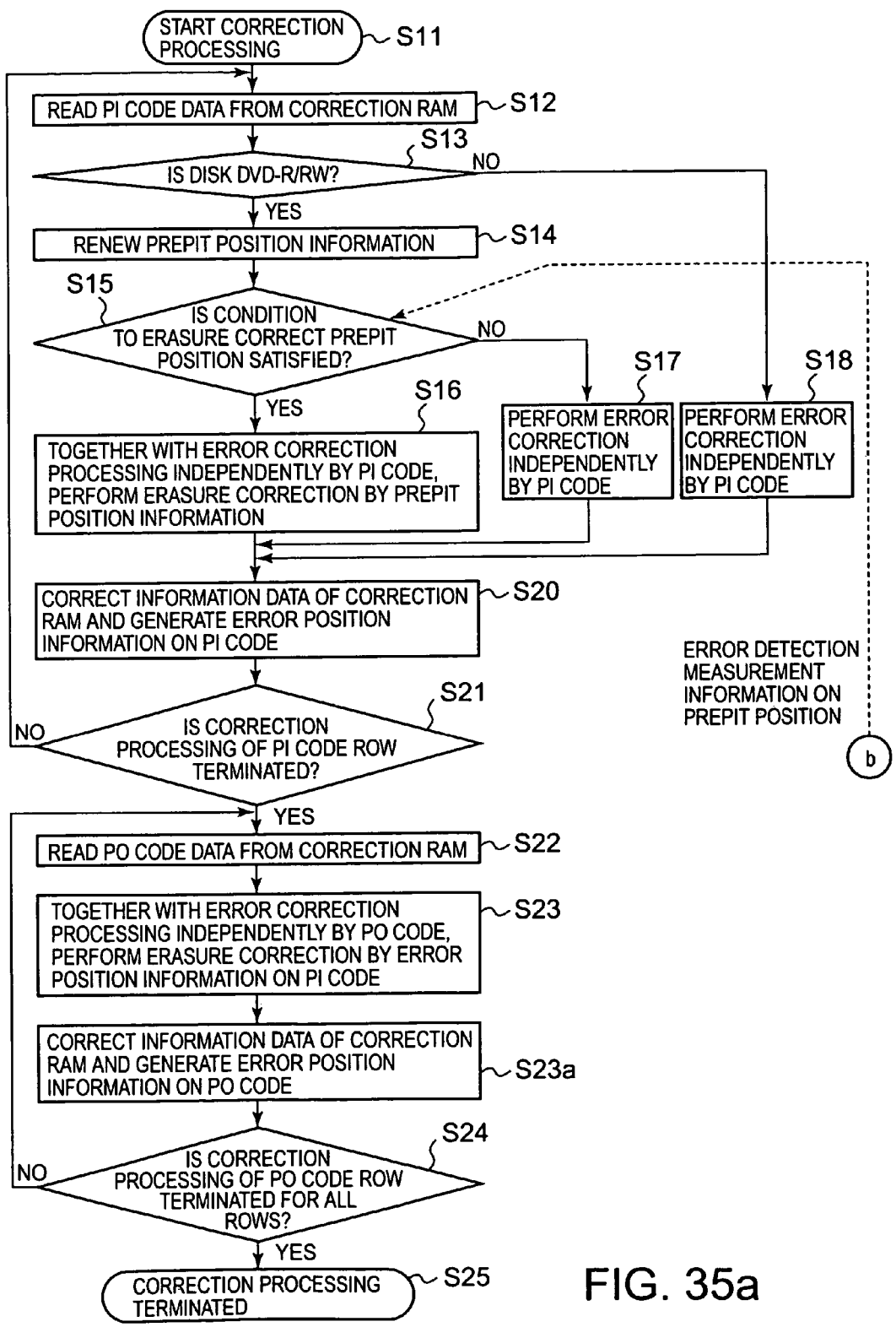
FIGS. 35a and 35b are portions of a flowchart showing the procedure in case error detection and measurement of the prepit position are performed for 208 rows portion of the PI code series.
Figure 35B:
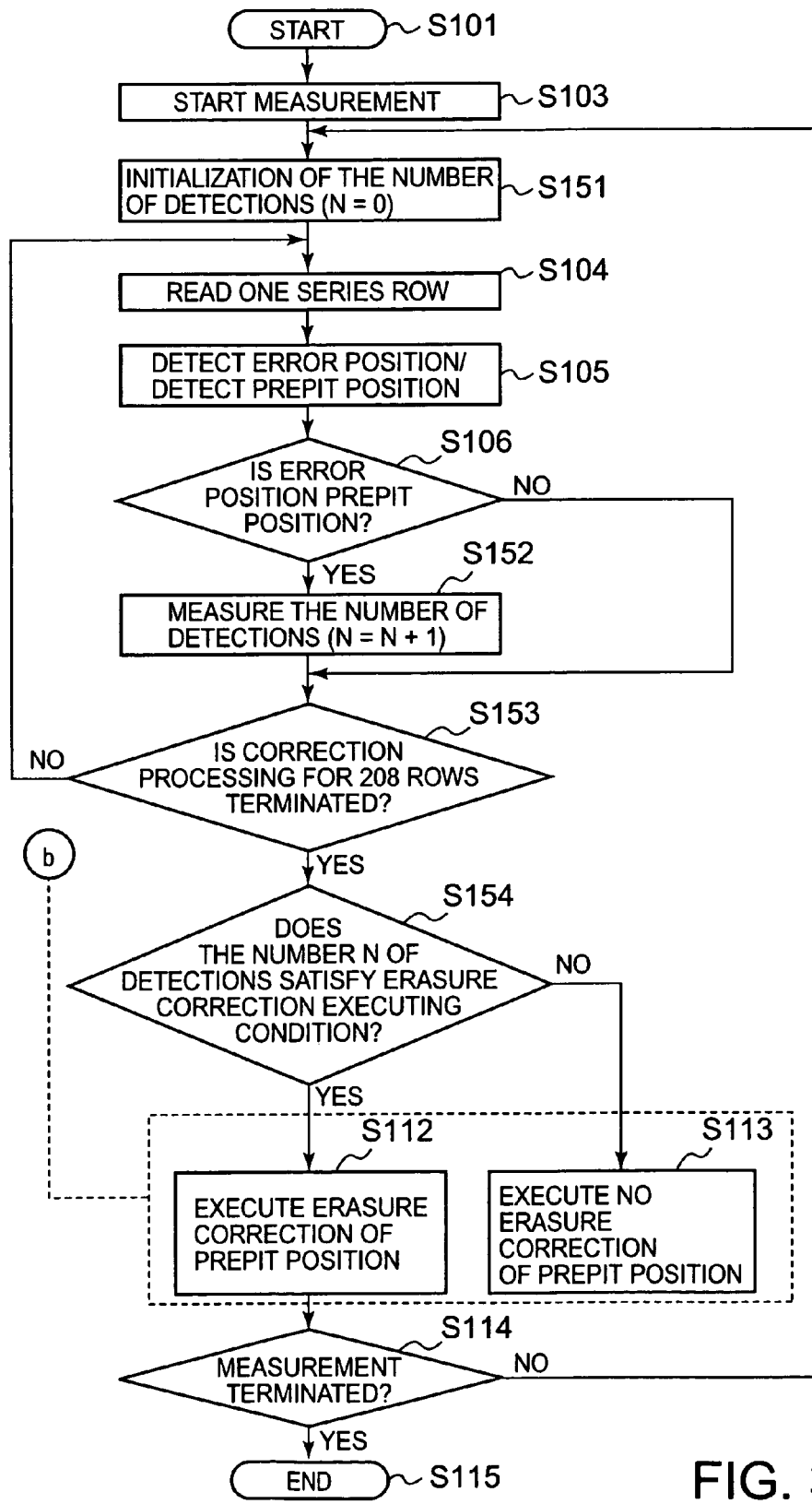

As an example of this case, a flow in case of performing the error detection and measurement of the prepit position for the PI code series 208 rows portion is shown in FIGS. 35a and 35b. Here, steps S11 to S25 in FIGS. 35a and 35b are the same as the foregoing fourth embodiment, and the description thereof will be omitted.

At step S101, the system controller 14 controls a start of the error detection and measurement of the prepit position.

As step S103, the error detection and measurement processing of the prepit position is started.

At step S151, the number N of error detection result measurements of the prepit position is initialized.

At step S104, the data of one code row (PI code row) is read, and at step S105, the prepit position and the error position are detected.

The detection of the prepit position is performed based on the prepit position information generated by the prepit position information generating circuit 15, and the error position detection is performed based on correction processing information on the error correction circuit 5 of one code row.

At step S106, in case the error position is a prepit position, at step S152, the error detection result of the prepit position is measured (N=N+1).

In case the error position is not a prepit position, the error detection result of the prepit position is not measured, but the procedure proceeds to step S153.

At step S153, in case the correction processing of all the PI code series is terminated, the determination processing of the error detection result of the prepit position is performed, and in case the processing is not terminated, the processing of the next row is performed.

At step S154, in case the number N of error detection result measurements satisfies the condition to add the pointer for performing the erasure correction to the prepit position, at step S112, the error detection and measurement information on the prepit position to the effect that the erasure correction is executed for the prepit position is generated.

In case the number N of error detection result measurements of the prepit position does not satisfy the condition to add the pointer for erasure correction to the prepit position, as step S113, the error detection and measurement information on the prepit position to the effect that no erasure correction is executed for the prepit position is generated.

At step S114, if the measurement termination condition is satisfied, at step S115, the measurement is terminated, and if not satisfied, the procedure returns to step S151 and performs the measurement processing.

Further, in the condition α, the number of PI rows to add the pointer for erasure correction may be set to the arbitrary number.

In the present fourth embodiment, when adding the pointer for erasure correction to the prepit position, a signal to that effect is transmitted to the error correction circuit 5 through the system controller 14. However, not limiting to this, information to the effect that the pointer for erasure correction is added to the prepit position is retained in a memory or register such as the correction RAM 6 and the like, and based on that information, the error correction circuit 5 may decide a pointer position for erasure correction, thereby to perform the erasure correction.

The error measurement of the prepit position may be performed by successively measuring the presence or absence of the error of the prepit position for every detected code row or by measuring after detecting and retaining the presence or absence of the error of the prepit position for every code row.

Fifth Embodiment

Figure 36A:
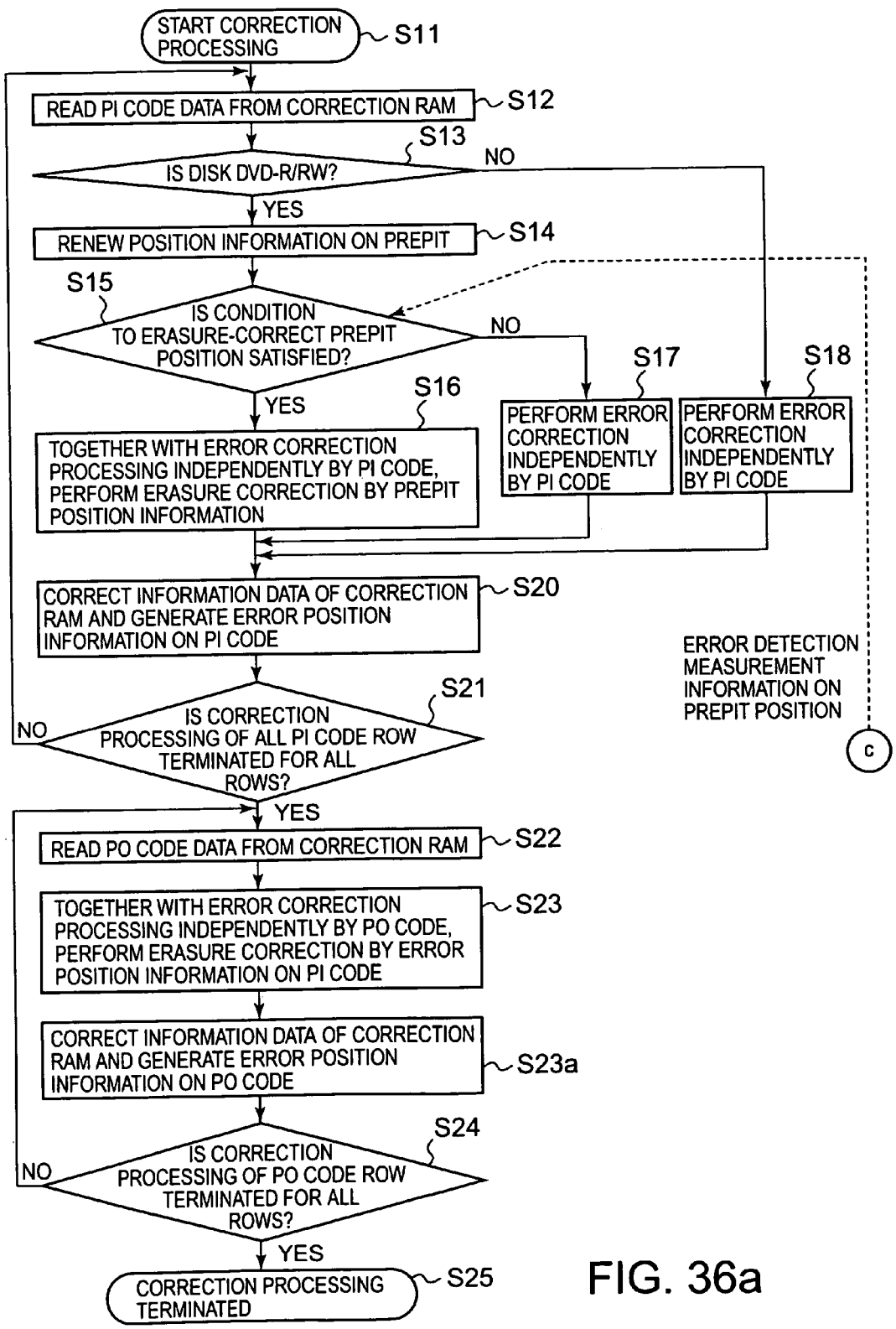
FIGS. 36a, 36b and 36c are portions of a flowchart showing the procedure of correction processing in an error correction method of an optical disk according to a fifth embodiment.
Figure 36B:
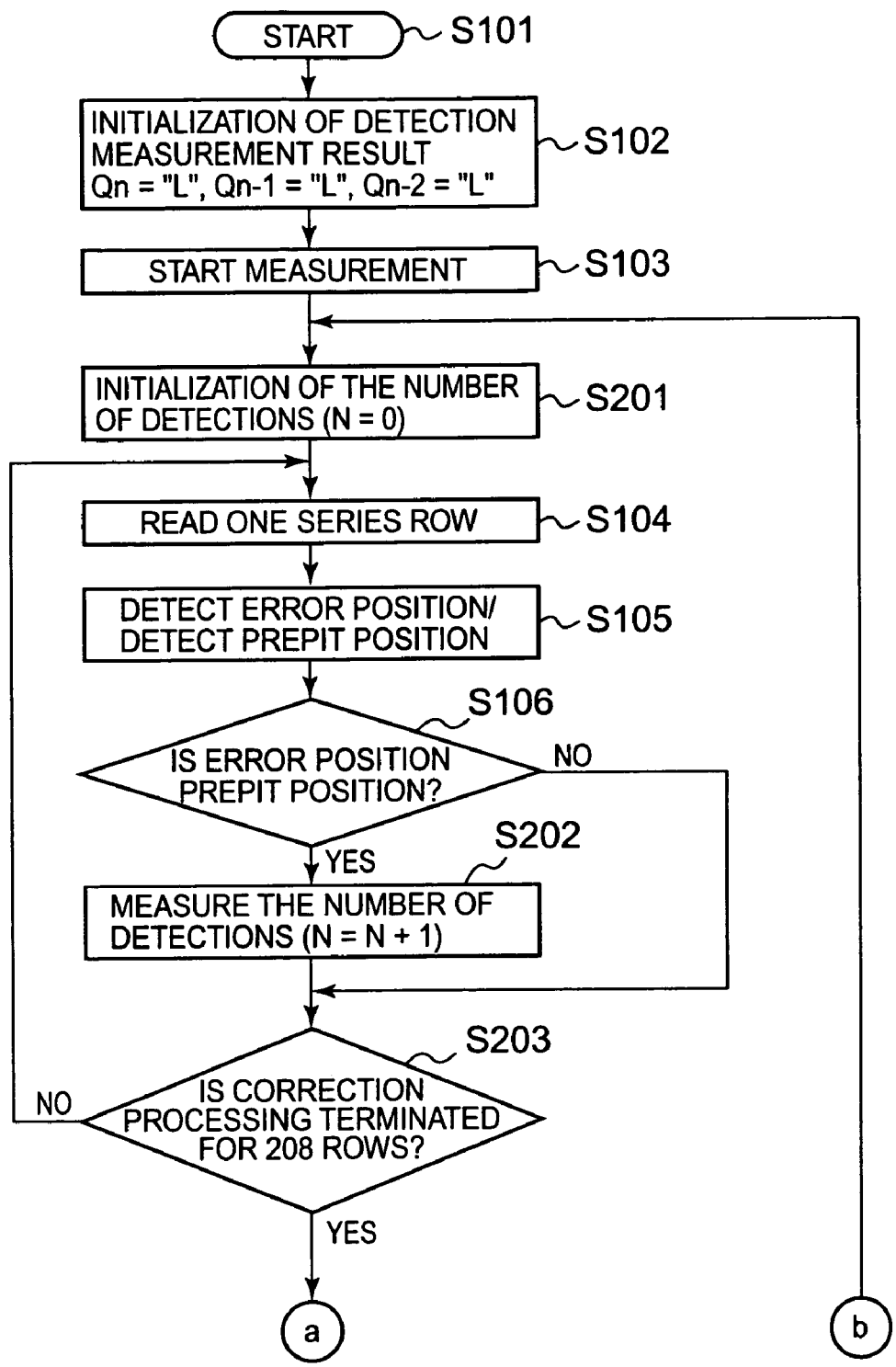
Figure 36C:
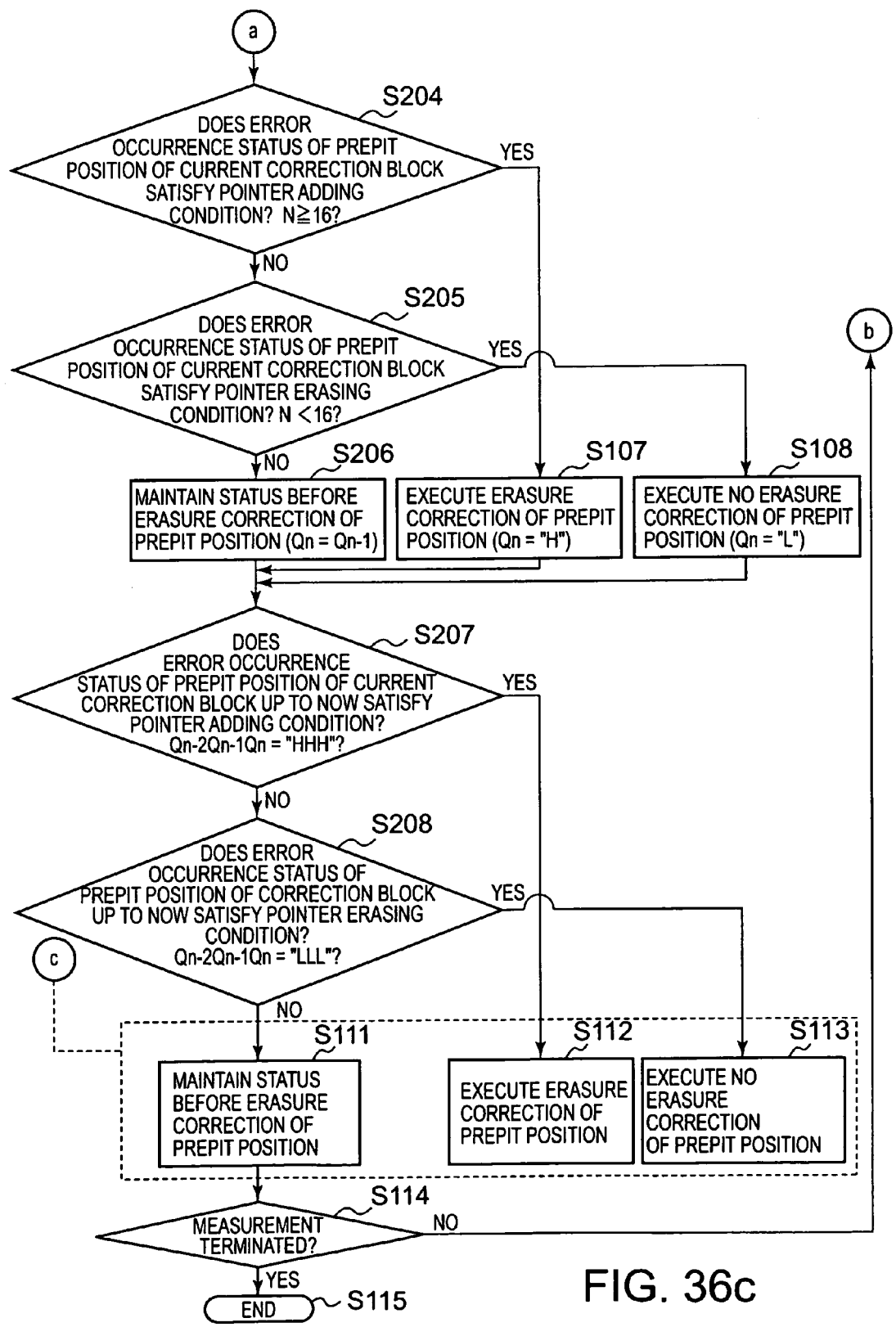

An error correction device of an optical disk according to a fifth embodiment will be described. A circuit configuration is similar to the fourth embodiment as shown in FIG. 21, and a procedure of the processing is as shown in FIGS. 36a, 36b and 36c. Here, from among steps S11 to S42, the processings of step S11 to S25 are the same as those in the fourth embodiment, and the description thereof will be omitted.

At step S15, a routine for generating error detection and measurement information on a prepit position used when determining whether or not the condition for erasure-correcting the prepit position is satisfied will be described below.

At step S101, by a system controller 14, a start of the error detection and measurement of the prepit position is controlled.

At step S102, an error detection measurement result Q is initialized.

At step S103, an error detection and measurement processing of the prepit position is started.

At step S201, the number N of error detection result measurements is initialized.

At step S104, the data of one code row (PI code row) is read, and at step S105, the prepit position and an error position are detected.

The detection of the prepit position is performed based on prepit position information generated by a prepit position information generating circuit 15, and the error position detection is performed based on information on the correction processing of an error correction circuit 5 of one code row.

At step S106, in case the error position is a prepit position, at step S202, the error detection result of the prepit position is measured (N=N+1).

In case the error position is not a prepit position, the error detection result of the prepit position is not measured, but the procedure proceeds to step S203.

At step S203, in case the correction processings of all the PI code series are terminated, the procedure proceeds to the determination processing of the error detection result of the prepit position at step S204, and at step S203, in case the processing is not terminated, the procedure returns to step S104, and performs the processing of the next code row.

At step S204, in case the number N of error detection result measurements of the prepit position satisfies the condition to add the pointer for performing the erasure correction of the prepit position (N≧16), at step S107, a notice to the effect that the erasure correction of the prepit position is permitted is set for the error detection measurement result of the prepit position ($Q_n$="H").

In case the number N of error detection result measurements of the prepit position satisfies the condition to erase the pointer for performing the erasure correction of the prepit position (N<16), at step S108, a notice to the effect that the erasure correction of the prepit position is not permitted is set for the error detection measurement result of the prepit position ($Q_n$="L").

At step s207, in case the condition to add the pointer for erasure correction to the prepit position is satisfied (in case the erasure correction of the prepit position is permitted in the three continuous correction blocks ($Q_n$ $Q_{n-2}$ $Q_{n-1}$="HHH")), at step S112, the error detection and measurement information on the prepit position to the effect that the erasure correction is executed for the prepit position is generated.

At step S208, in case the condition to erase the pointer for erasure correction in the prepit position is satisfied (in case the erasure correction of the prepit position is not permitted in three continuous correction blocks ($Q_{n-2}$ $Q_{n-1}$ $Q_n$="LLL")), at step S113, the error detection and measurement information on the prepit position to the effect that the erasure correction is not executed in the prepit position is generated.

In case neither the condition to add the pointer for erasure correction to the prepit position nor the condition to erase the pointer for erasure correction in the prepit position is satisfied, at step S111, the error detection and measurement information on the prepit position to the effect that the previous state is maintained regarding the erasure correction is generated.

At step S114, if the measurement termination condition is satisfied, at step S115, the measurement is terminated, and if not satisfied, the procedure returns to step S201 and performs the measurement processing again.

Although the foregoing procedure is a processing for the error detection and measurement in one prepit position, the same processings are performed for other prepit positions, respectively.

By the system controller 14, for example, the pointer for erasure correction is added to the PO row-1 and the PO row-3 adjacent to this, and the PO row-2 and the PO row-4 adjacent to this shown in FIG. 27, thereby performing PI correction.

Here, in FIG. 27 the PO row-1 is taken as the position of a prepit error 1, and the PO row-3 adjacent to this as the position of a prepit error 3, the PO row-2 as the position of a prepit error position 2, and the PO row-4 adjacent to this as the position of a prepit error 4.

An operation, in which an error measurement circuit 16 of the prepit position measures the occurrence number of errors of the prepit position and adds or erases the pointer for erasure correction of the PI correction to and from the prepit position, will be described.

First, the operation to add the pointer for erasure correction of the PI correction to the prepit position will be described by taking the case of performing the operation at the position of the prepit error 1 as an example.

In one correction block, based on a correction status of PI correction, the occurrence number of errors in the position of the prepit error 1 is measured, and further, based on a correction status of PO correction, the occurrence number of errors in the row of the prepit error 1 is measured.

Based on the measurement result of the occurrence number of errors in the position of the prepit error 1 and the measurement result of the occurrence number of errors in the row of the prepit error 1, information showing an error occurrence status at the position of the prepit error 1 in the correction block is generated.

In case the information on the error occurrence status of the position of the prepit error 1 in the correction block satisfies the condition (hereinafter referred to as condition 1) to add the pointer for erasure-correcting the position of the prepit error 1, information showing that the condition 1 is satisfied is generated.

Similarly in each of other correction blocks sequentially reproduced, the occurrence number of errors of the position of the prepit error 1 in each correction block is measured, and in case the condition 1 is satisfied, information showing that effect is generated.

The number of correction blocks satisfying the condition 1 for each reproduced correction block is measured, and in case a condition (hereinafter referred to as condition 2) to add the pointer for erasure-correcting the position of the prepit error 1 across one or plural reproduced correction blocks is satisfied, this fact that the condition for adding the position of the prepit error 1 as a pointer for erasure correction of the PI correction is satisfied is transmitted from the error measurement circuit 16 of the prepit position to the system controller 14.

The system controller 14, upon notified that the position of the prepit error 1 satisfies this condition, transmits to the prepit position information generating circuit 15 and the error correction circuit 5 a notice that the position of the prepit error 1 is added as the pointer for erasure correction in the PI correction subsequent to the next correction blocks.

The operation to add the pointer for erasure correction of the PI correction to the prepit position will be described by taking a case where the data reproduced from an optical disk 1 is a correction block as shown in FIG. 26 as an example.

Here, the condition 1 is taken as a case where 16 pieces or more of the errors exist in the position of the prepit error 1 in one correction block, and the condition 2 is taken as a case where the correction block satisfying the condition 1 continuously occurs in three blocks since starting the measurement.

In the correction block n of FIG. 26, the occurrence number of errors in the position of the prepit error 1 is measured, and the information showing that the condition 1 is satisfied is generated and stored. Similarly, in the correction blocks n+1 and n+2 also of FIG. 26, the occurrence number of errors in the position of the prepit error 1 is measured, and the information showing that the condition 1 is satisfied is generated.

Further, since the correction block satisfying the condition 1 in the correction block n+2 continues in three correction blocks, the condition 2 is satisfied. In this manner, a notice is transmitted to the system controller 14 that the condition to add the position of the prepit error 1 as the pointer for erasure correction of the PI correction is satisfied.

The system controller 14, upon notified that the condition to add the position of the prepit error 1 as the pointer for erasure correction of the PI correction is satisfied, transmits to the prepit position information generating circuit 15 and the error correction circuit 5 a notice that the position of the prepit error 1 is added as the pointer for erasure correction in the PI correction subsequent to the next correction blocks.

Similarly, the occurrence number of errors is measured also for the prepit errors 2, 3, and 4. To satisfy the condition 1 and the condition 2, the processing of adding the pointer for erasure correction of the PI correction to the prepit position is performed.

In the correction block n+2 of FIG. 26, to satisfy the condition to add the pointer for erasure correction of the PI correction of the prepit position, the pointer for erasure correction of the PI correction is added to the prepit position in the correction block n+3.

The occurrence number of errors of the prepit position is measured, and in case the measurement result satisfies the condition to add the pointer for erasure correction of the PI correction to the prepit position, by adding the pointer for erasure correction of the PI correction to the prepit position, in many cases, the correction applied twice of PI-PO is made possible, thereby the reproduction performance can be improved.

The operation to erase the pointer for erasure correction of the PI correction in the prepit position will be described by taking the case in the position of the prepit error 1 as an example.

In one correction block, based on the correction status of the PI correction, the occurrence number of errors in the position of the prepit error 1 is measured, and further, based on the correction status of the PO correction, the occurrence number of errors in the row of the prepit error 1 is measured.

Based on the measurement result of the occurrence number of errors in the position of the prepit error 1 and the measurement result of the occurrence number of errors in the row of the prepit error 1, the information regarding the error occurrence status in the position of the prepit error 1 in the correction block is generated.

In case the information regarding the error occurrence status in the position of the prepit error 1 in the correction block satisfies a condition (hereinafter referred to as condition 3) to erase the pointer for erasure-correcting the position of the prepit error 1, the information showing that the condition 3 is satisfied is generated.

Similarly, in each of correction blocks sequentially reproduced, the number of error occurrences of the position of the prepit error 1 in each correction block is measured, and the information showing that the condition 3 is satisfied is generated.

The number of correction blocks satisfying the condition 3 for each reproduced correction block is measured, and in case the condition (hereinafter referred to as condition 4) to erase the pointer for erasure-correcting the position of the prepit error 1 across one or plural reproduced correction blocks is satisfied, a notice that the position of the prepit error 1 satisfies the condition to erase the pointer for erasure correction of the PI correction is transmitted to the system controller 14.

Here, the condition 3 may be taken as a case not satisfying the condition 1, and further, the condition 4 may be taken as a case not satisfying the condition 2.

The system controller 14, upon notified that the condition to erase the pointer for erasure correction of the PI correction in the position of the prepit error 1 is satisfied, transmits to the prepit position information generating circuit 15 and the error correction circuit 5 a notice that the pointer for erasure correction of the PI correction subsequent to the next correction blocks is erased.

The operation to erase the pointer for erasure correction of the PI correction in the prepit position will be described by taking a case where the data reproduced from the optical disk 1 is a correction block as shown in FIG. 26 as an example.

Here, the condition 3 is taken as a case where the number of errors is below sixteen in the position of the prepit error 1 in one correction block, and the condition 4 is taken as a case where the correction block to satisfy the condition 3 continuously occurs in three correction blocks since starting the measurement.

In the correction block m of FIG. 26, the occurrence number of errors in the position of the prepit error 1 is measured, and the information showing that the condition 3 is satisfied is generated and stored. Similarly, in the correction blocks m+1 and m+2 also of FIG. 26, the occurrence number of errors in the position of the prepit error 1 is measured, and the information showing that the condition 3 is satisfied is generated.

Further, since the correction block satisfying the condition 3 in the correction block m+2 continues in three correction blocks, the condition 4 is satisfied. Hence, a notice is transmitted to the system controller 14 that the position of the prepit error 1 satisfies the condition to erase the pointer for erasure correction of the PI correction.

The system controller 14, upon notified that the condition to erase the pointer for erasure correction of the PI correction in the position of the prepit error 1 is satisfied, transmits to the prepit position information generating circuit 15 and the error correction circuit 5 a notice that the pointer for erasure correction in the PI correction subsequent to the next correction blocks is erased.

Similarly, the occurrence number of errors is measured also for the prepit errors 2, 3 and 4. To satisfy the conditions 3 and 4, the pointer for erasure correction of the PI correction in the prepit position is erased.

In the correction block m+2 shown in FIG. 26, the condition to erase the pointer for erasure correction of the PI correction in the prepit position is satisfied. Hence, the pointer for erasure correction of the PI correction in the prepit position is erased from the correction block m+3.

In case the error as shown in FIG. 28 occurs, if the pointer for erasure correction is not added to the prepit position, it is possible to correct all the errors by the detection correction of the PI code row within its own code row without compulsorily performing the error correction of the prepit position. In case all the errors are corrected in the initial PI correction, the correction processing of the error does not occur in the subsequent PO correction step.

In case an error correction execution processing does not occur in the final PO correction, an output data error occurring due to erroneous correction or some factors when renewing the data on a memory does not occur in the final PO correction. Hence, there is no need to perform the correction applied thrice of PO-PI-PO, and the correction can be made by the correction applied twice of PI-PO.

Incidentally, in the present fifth embodiment, the condition 2 takes "whether or not the correction block satisfying the condition 1 continuously satisfies the predetermined number" as the criterion of determination. However, being not limited to this, whether or not the correction block satisfying the condition 1 continuously or non-continuously satisfies the predetermined number may be taken as a criterion.

Similarly, in the present fifth embodiment, the condition 4 takes "whether or not the correction block satisfying the condition 3 continuously satisfies the predetermined number" as a criterion of determination. However, whether or not the correction block satisfying the condition 3 continuously or noncontinuously satisfies the predetermined number may be taken as a criterion of determination.

As described above, according to the present fifth embodiment, in case the occurrence number of errors of the prepit position is measured and the measurement result satisfies the condition to add or erase the pointer for erasure correction of the PI correction in the prepit position, by adding or erasing the pointer for erasure correction of the PI correction in the prepit position, in many cases, the error correction can be made by the correction applied twice of PI-PO, thereby improving the reproduction performance.

Sixth Embodiment

Figure 37:
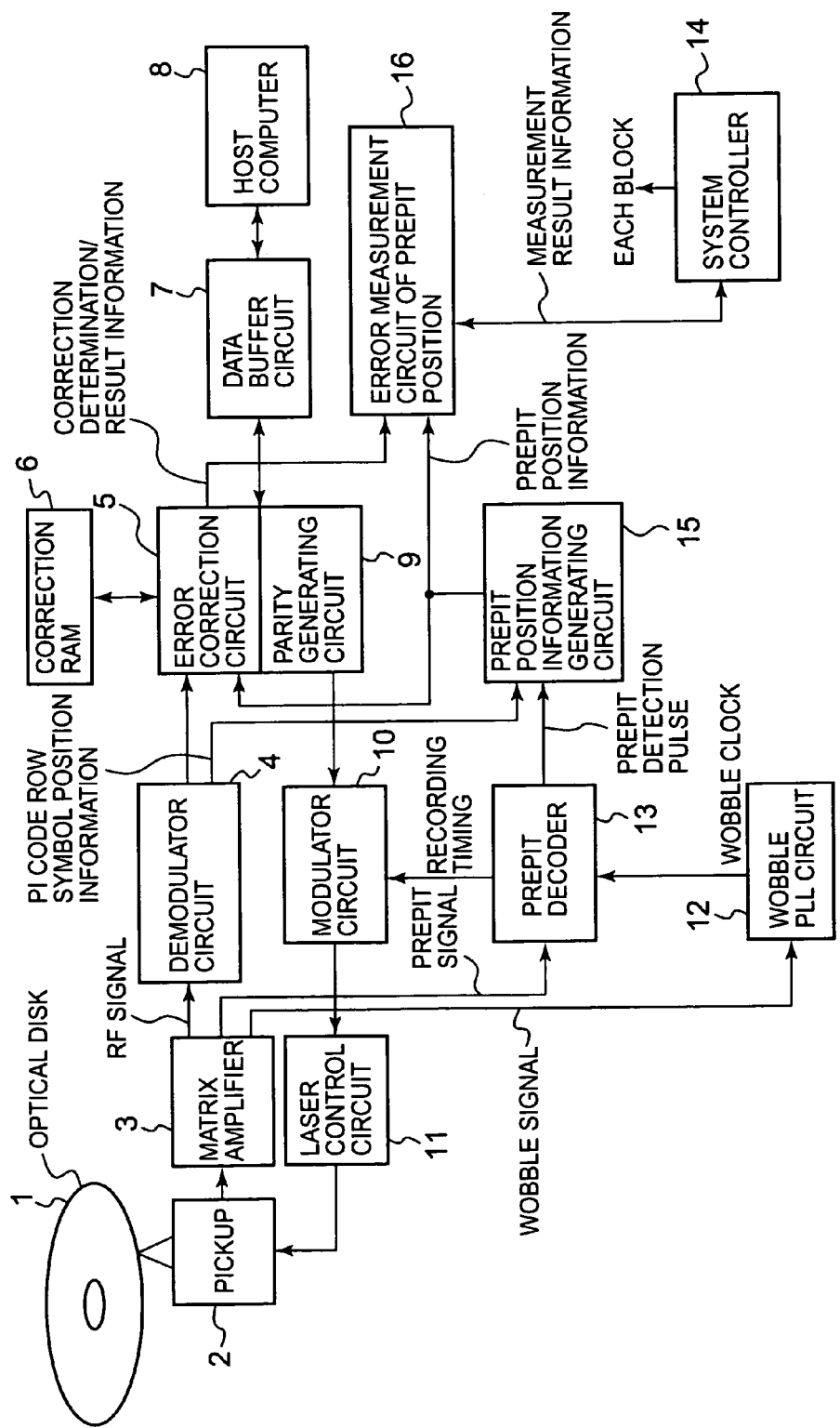
FIG. 37 is a block diagram showing the configuration of the error correction device of the optical disk according to a sixth embodiment.

A configuration of an error correction device of an optical disk according to a sixth embodiment is shown in FIG. 37. The present sixth embodiment is different from the foregoing fourth and fifth embodiments provided with the configuration shown in FIG. 21, and has a configuration in which a PI code row symbol position information is generated from a demodulator circuit 4 and is outputted to a prepit position information generating circuit 15, and further, from a prepit decoder 13, a prepit detection pulse is generated and is outputted to the prepit position information generating circuit 15.

Further, unlike the forgoing fourth embodiment 2, even in case the prepit position exists at an even number position or an odd number position, the present embodiment performs addition or erasion of a pointer for erasure correction accordingly.

Figure 38:
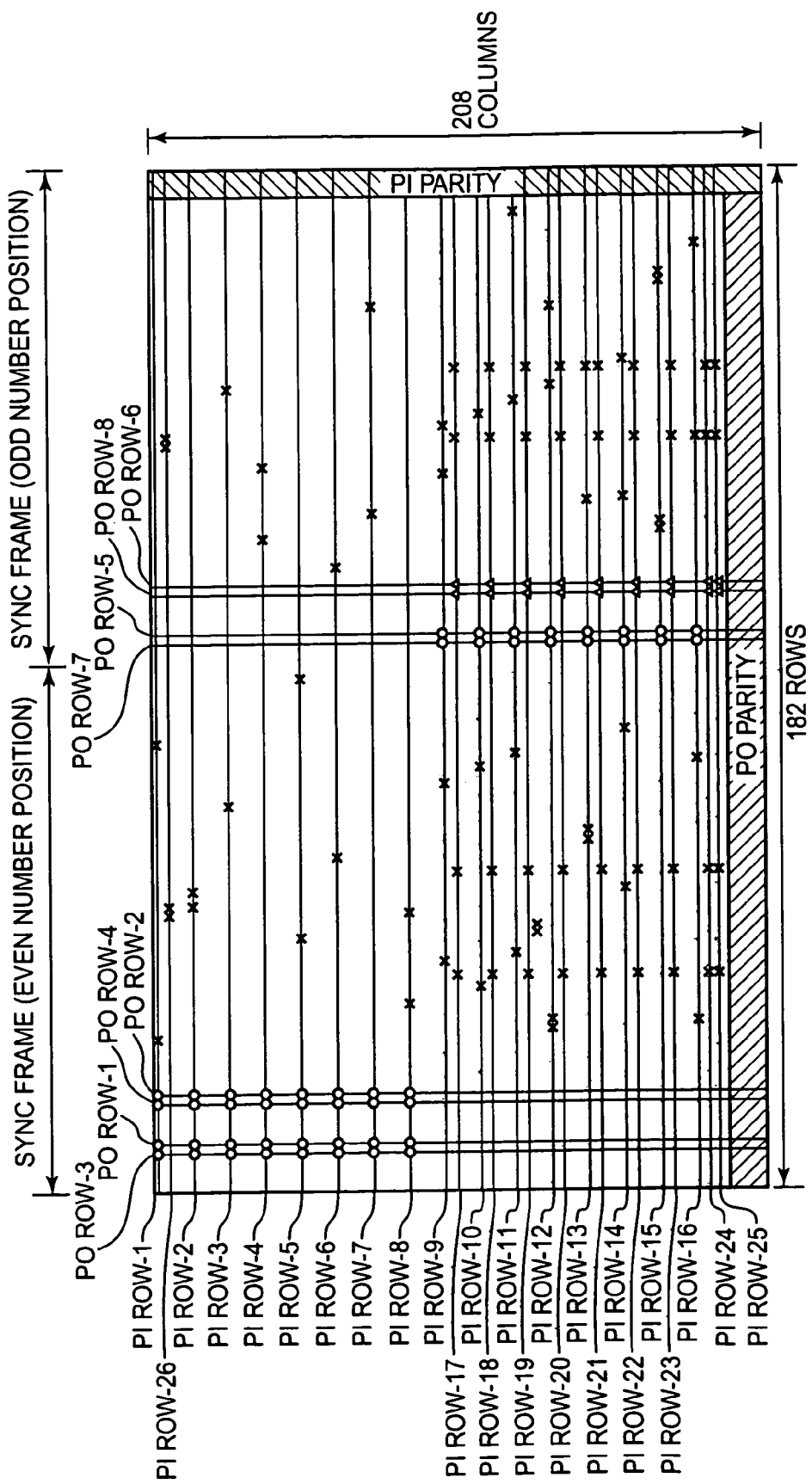
FIG. 38 is an explanatory drawing showing the error occurrence status on the correction block in case two symbol errors and other errors occur due to the effect of the prepits (even number position and odd number position)

A correction processing in the sixth embodiment will be described by taking a case where errors occur as shown in FIG. 38 as an example.

In the present sixth embodiment, it is presumed that recorded data is recorded in a recording disk in a state deviated from the standard from a state conformed thereto for some factors when recorded in the recordable disk.

In FIG. 38, in the first half of one correction block, errors occur in the prepit of the even number position, and in the second half, errors occur in the prepit of the odd number position.

In the PI code rows from the PI rows-1 to 8, errors occur in the symbols at the prepit sync positions of the even number position, that is, at the positions of the PO row-1 and the PO row-2 and their adjacent position, that is, at the positions of the PO row-3 and the PO row-4, and further, at other random two places, errors occur, thereby a total of six symbols are in error.

In the PI code rows from the PI rows-9 to 16, errors occur in the symbols at the prepit sync positions of the odd number position, that is, at the position of the PO row-5 and its adjacent position, that is, at the position of the PO row-7, and in addition, four symbol errors occur, thereby a total of six symbol errors occur.

In the PI code rows from the PI rows-17 to 25, errors occur in the symbols at the prepit data positions of the odd number position, that is, at the position of the PO row-6 and its adjacent position, that is, at the position of the PO row-8, and in addition, four symbol errors occur, thereby a total of six symbol errors occur.

In the PI code rows of the PI row-26, four errors occur in the symbols at the prepit sync position and at the position other than the prepit data position.

Here, as a condition to add the pointer for erasure correction to the prepit position of the PI code row in which the prepit exists, in case a row in which the errors exist at the prepit position exists for one row portion, the pointer for erasure correction is added, and in case a row in which no error exists in the prepit position of the PI code row in which the prepit exists is available for one row portion, the pointer for erasure correction is erased (hereinafter, this is referred to as a condition β).

Figure 39:
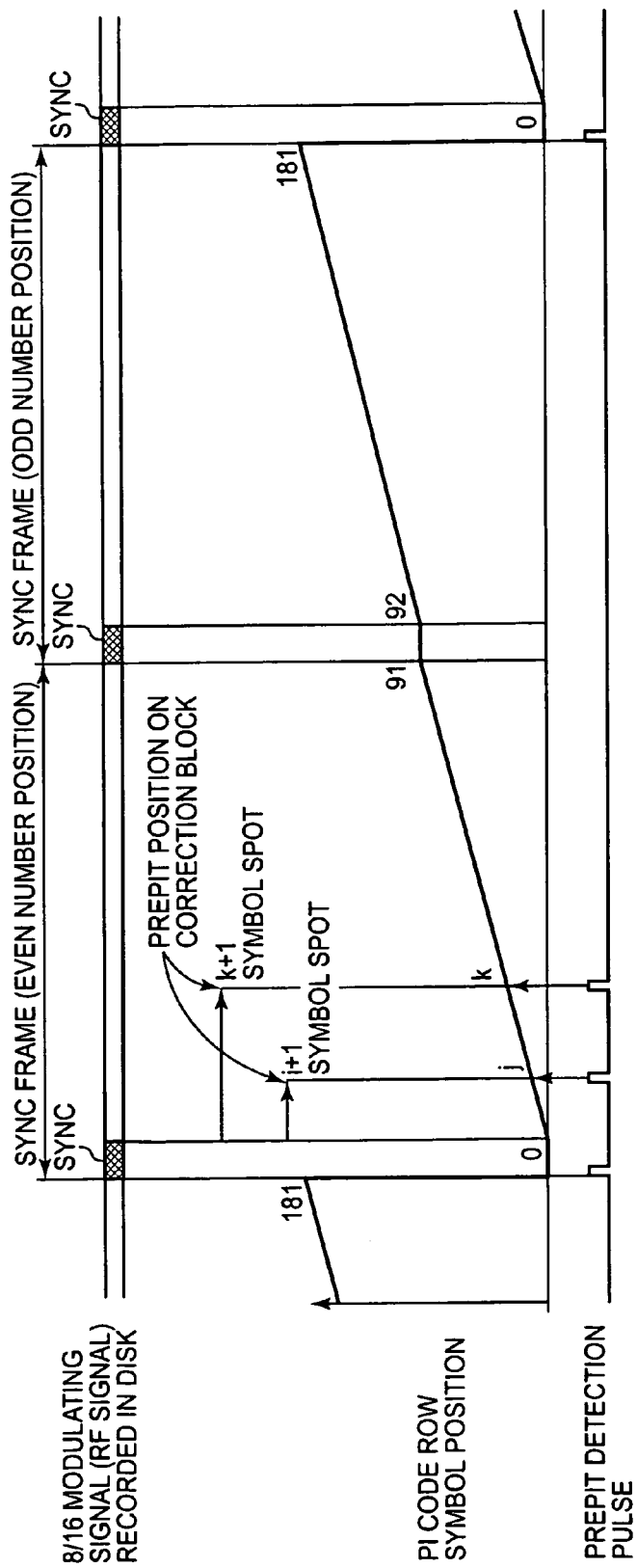
FIG. 39 is an explanatory drawing showing technique for generating a signal to detect the prepit position of even number position in the correction block by the prepit information generating circuit.

The prepit decoder 13 generates PI code row symbol position information equivalent to counter values as shown in FIG. 39 when the PI rows-1 to 8 of FIG. 38 and the prepit detection pulse. In a sync frame at the even number position, prepit detection pulses are outputted at a starting point of time and at a j+1 symbol spot equivalent to the prepit position on the correction block and at a k+1 symbol spot, respectively.

Figure 40:
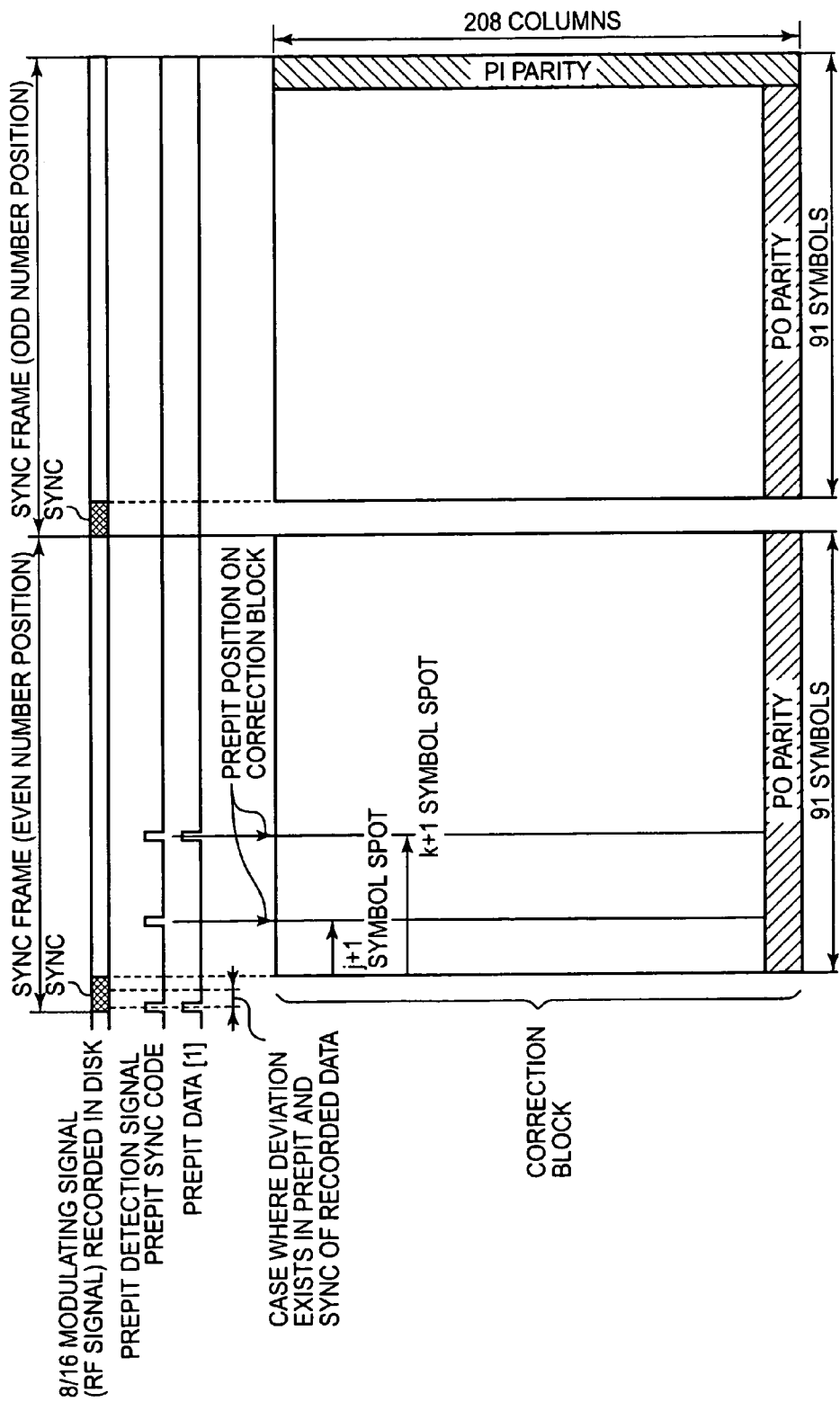
FIG. 40 is an explanatory drawing showing the positional relationship between the prepit detection signal and the correction block data of the even number position in the correction block.

Here, in FIG. 40 are shown the prepit positions of the j+1 symbol spot and the k+1 symbol spot in one correction block.

Figure 41:
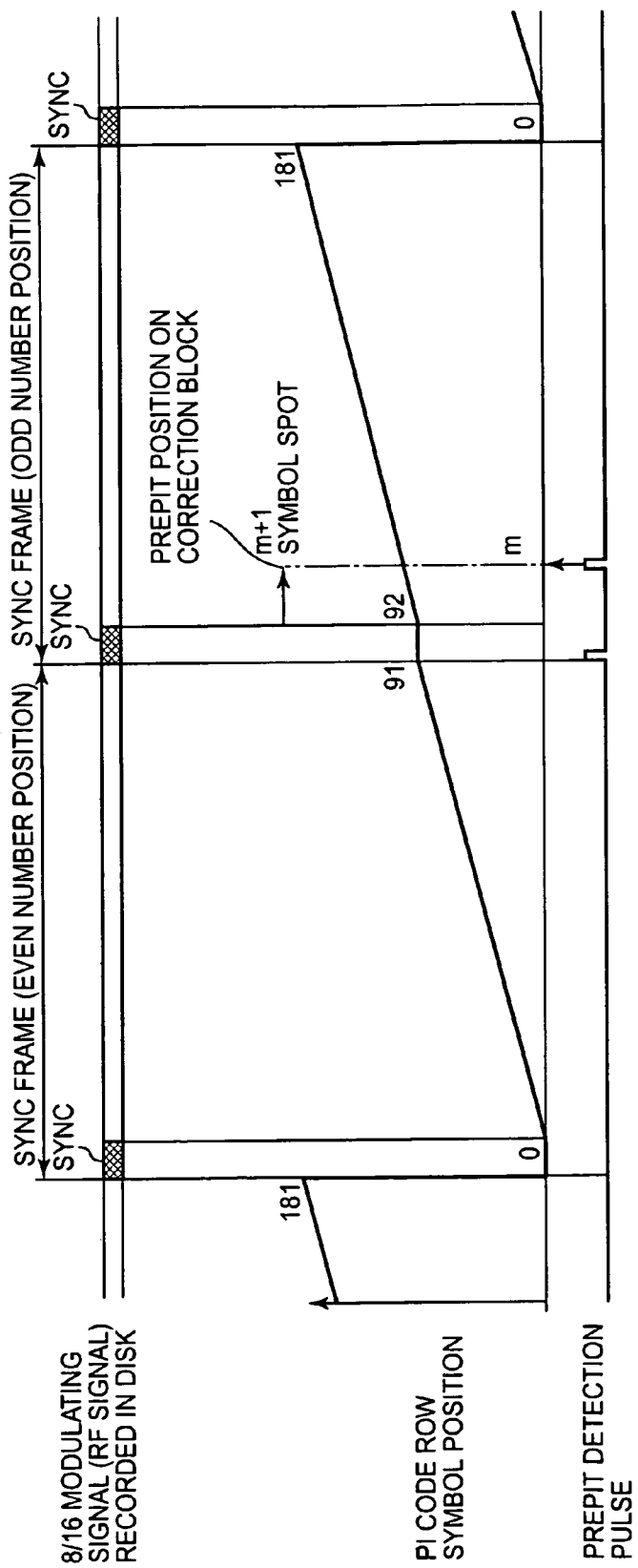
FIG. 41 is an explanatory drawing showing technique for generating a signal to detect the prepit position in the odd number position of the correction block by the prepit information generating circuit.

Similarly, when the PI rows-9 to 16 in FIG. 38 are reproduced, as shown in FIG. 41, the prepit detection pulses are outputted at the starting point of time in the odd number position and at an m+1 symbol spot. Further, when the PI rows-17 to 25 are reproduced, as shown in FIG. 42, the prepit detection pulses are outputted at the starting point of time in the odd number position and at an n+1 symbol spot.

Figure 42:
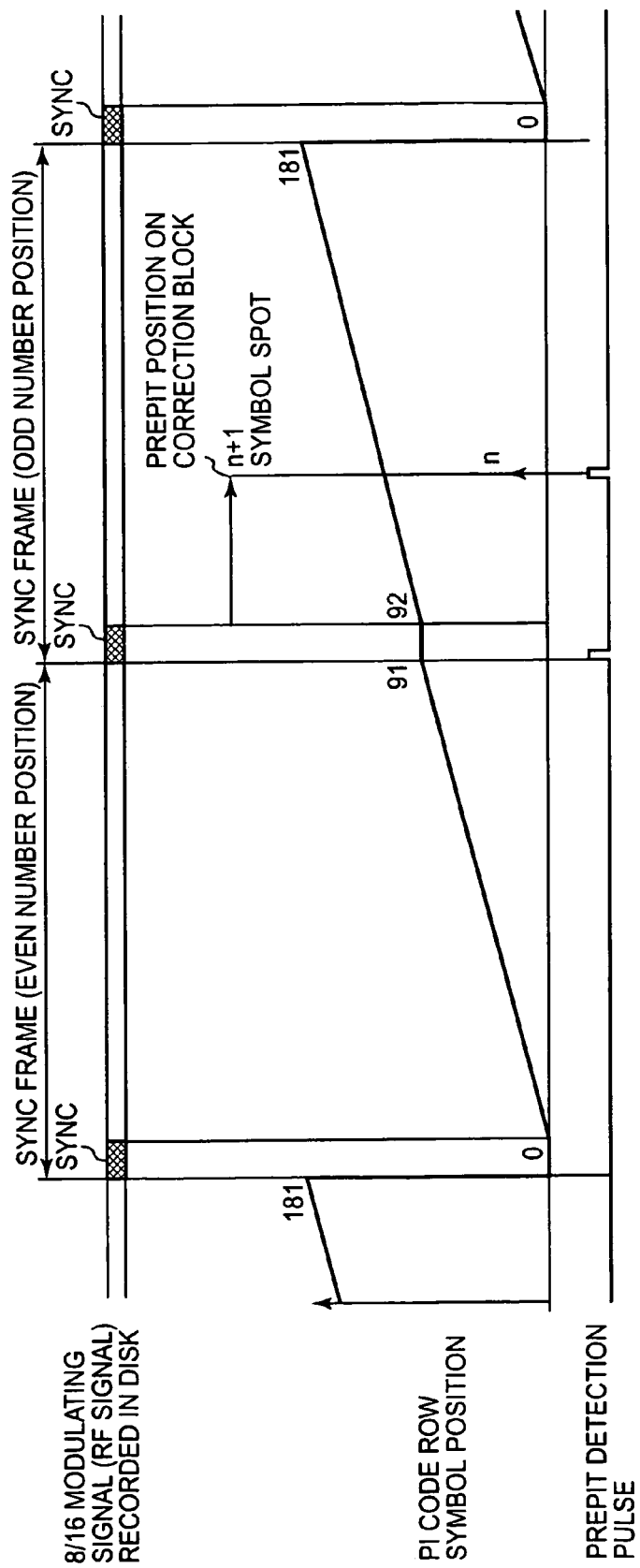
FIG. 42 is an explanatory drawing showing a technique for generating a signal to detect the prepit position in the odd number position of the correction block by the prepit information generating circuit.

The prepit position information generating circuit 15 receives a signal showing the PI code row symbol position as shown in FIGS. 39, 41, and 42 and a signal showing a segmentation such as a correction block unit, a sector unit, and the like from a demodulator circuit 4, and then, generates the prepit position information in the direction of the PI code row on the correction block from a signal showing the PI code row symbol position.

Taking the prepit position information on the correction block shown in FIG. 38 as an example, the rows of the PI rows-1 to 8 correspond to the j+1 symbol spot shown in FIGS. 39 and 40 in the position of the PO row-1, and the position of the PO row-2 corresponds to the k+1 symbol spot. The rows of the PI rows-9 to 16 correspond to the m+1 symbol spot of FIGS. 41 and 43 in the position of the PO row-5, and the rows of the PI rows-17 to 25 correspond to the n+1 symbol spot shown in FIGS. 42 and 43 in the position of the PO row-6.

Further, the prepit position information generating circuit 15 generates prepit position information in the direction of the PO code row regarding whether the received prepit detection pulse is a sector head line (the first line of the sector where the prepit sync exists) or the second to thirteenth line (where the prepit data exists) from a signal showing a segmentation such as a correction block unit, a sector unit, and the like Hereinafter, the position of the PO row-1 is taken as the position of a prepit error 21, the position of the PO row-2 as the position of a prepit error 22, the position of the PO row-3 as the position of a prepit error 23, the position of the PO row-4 as the position of a prepit error 24, the position of the PO-5 as the position of a prepit error 25, the position of the PO row-6 as the position of a prepit error 26, the position of the PO row-7 as the position of a prepit error 27, and the position of the PO row-8 as the position of a prepit error 28.

Figure 44A:
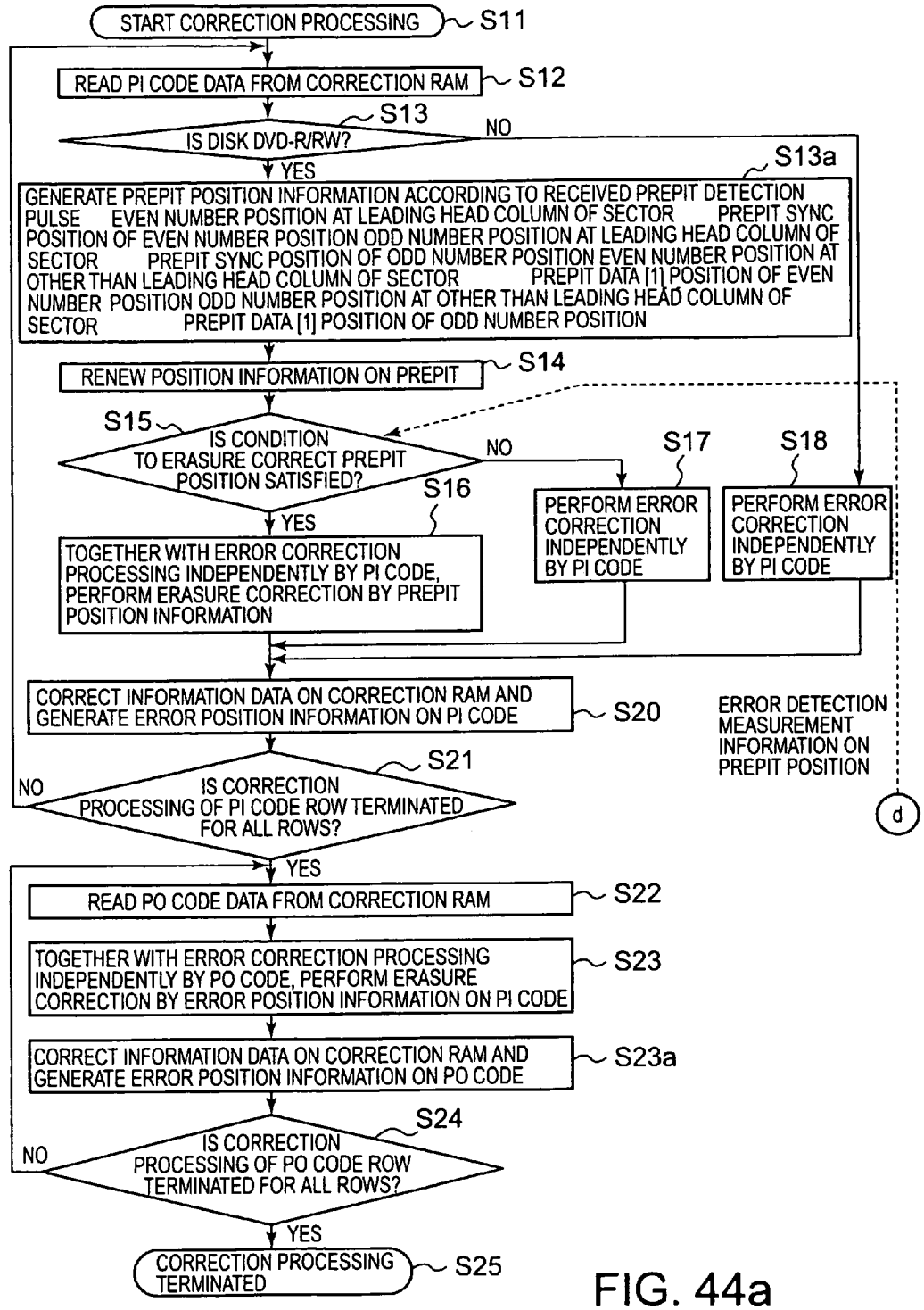
FIGS. 44a and 44b are portions of a flowchart showing the procedure of the correction processing in the error correction method of the optical disk according to the sixth embodiment.
Figure 44B:
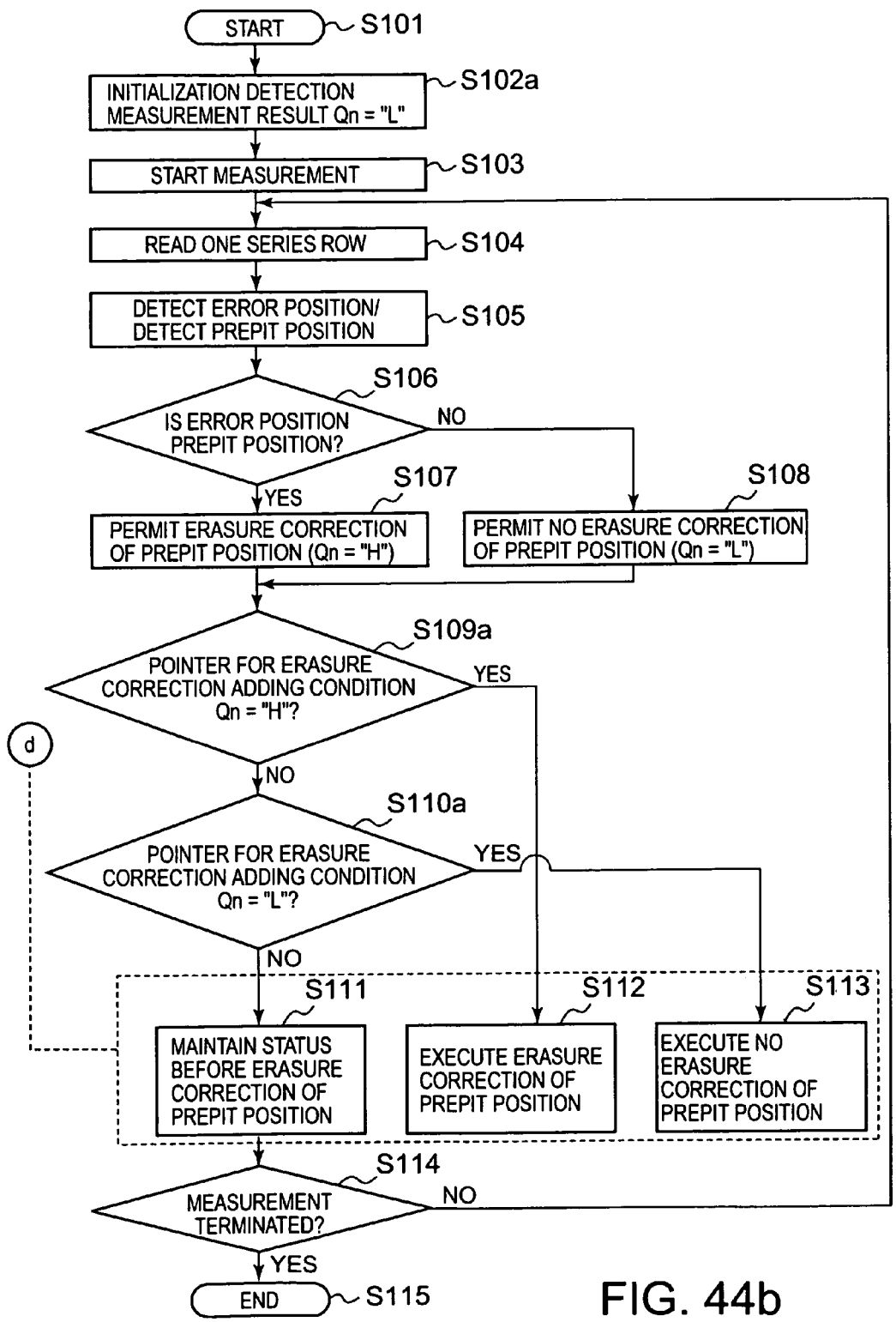

In FIGS. 44a and 44b is shown a flow of the correction processing in the present sixth embodiment. In particular, comparing with the foregoing fourth embodiment shown in FIGS. 25a and 25b, the sixth embodiment is different in that step S13a is added after step S13.

At step S13a, based on the generated prepit detection pulse, the prepit position information is generated. This prepit position information shows that the detected prepit position is any of the prepit sync position in the even number position in the sector head line, the prepit sync position in the odd number position, a prepit data "1" position in the even number position, and the prepit data "1" position in the odd number position. At the next step S14, based on this information, the prepit position is newly recognized. A description regarding other same steps as those in the foregoing fourth embodiment will be omitted.

Figure 45:
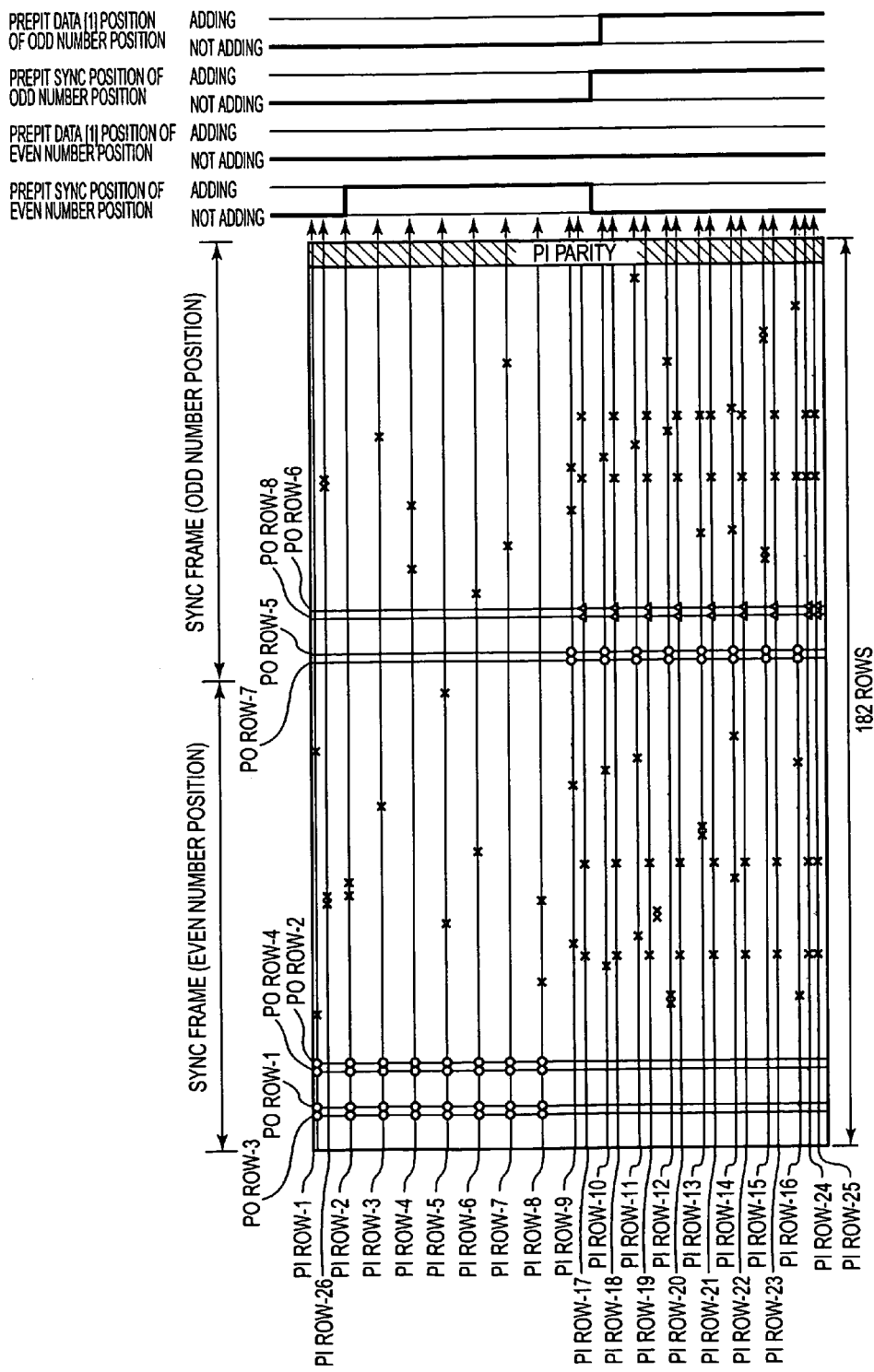
FIG. 45 is an explanatory drawing showing an error occurrence status in case two symbol errors and other errors occur due to the effect of the prepits in the even number position and the odd number position of the correction block.

In FIG. 45 is shown a schematic illustration of addition determination of each pointer for erasure correction in the prepit sync position of the even number position, the prepit data "1" position of the even number position, the prepit sync position of the odd number position, and the prepit data "1" position of the odd number position.

The errors of the PI rows-2 to 8, 10 to 16, and 18 are corrected by the PI correction, and the errors of the PI rows-1, 9, and 17 are corrected by the PO correction.

As against the case where the pointer for erasure correction is added to the positions of the prepit errors 21 to 24 of all the PI code rows, the pointer for erasure correction is added or not added according to the prepit position error, so that correction processing efficiency is improved, and in many cases, because the correction applied thrice of PO-PI-PO does not occur, the reproduction performance is improved.

Seventh Embodiment

Figure 46:
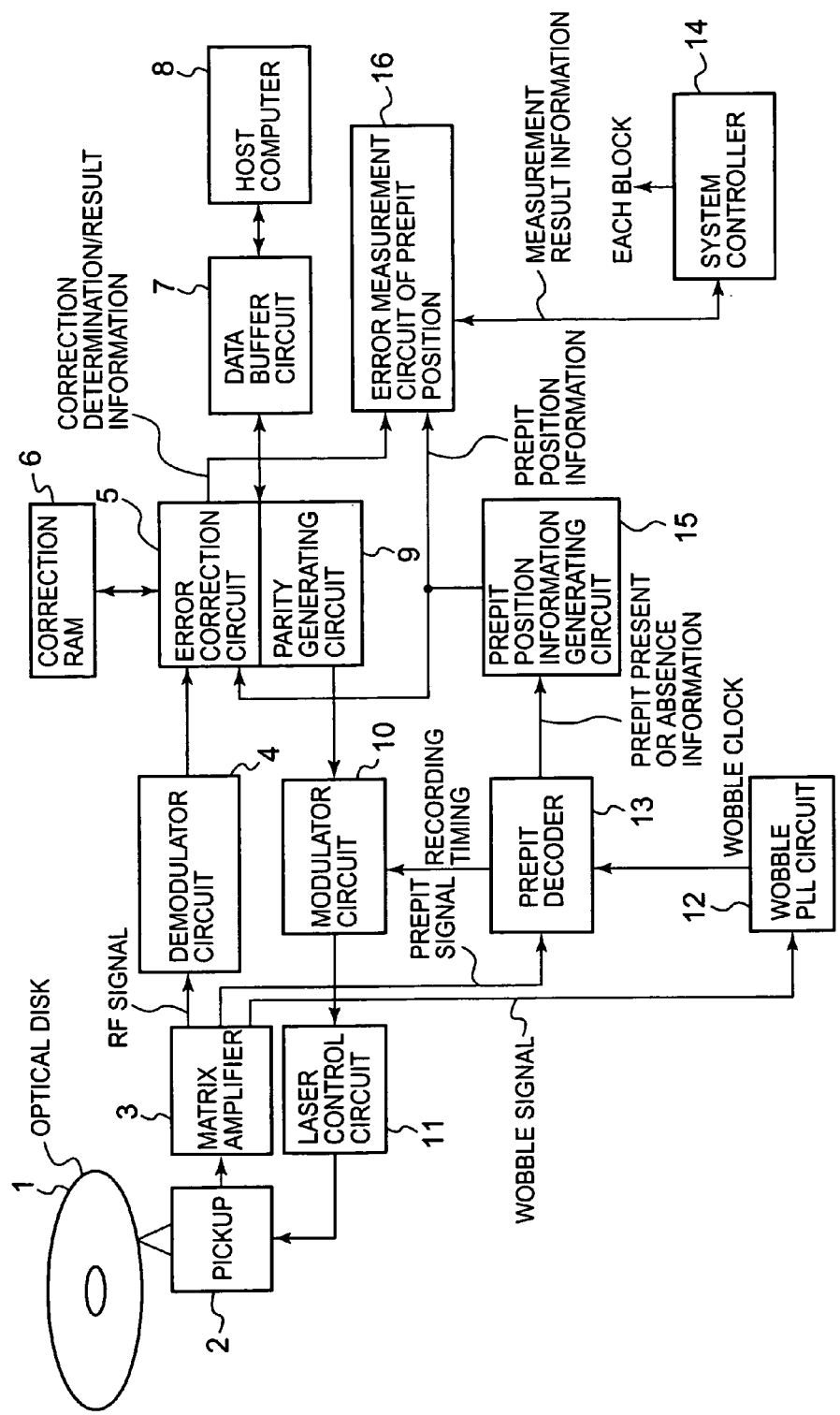
FIG. 46 is a block diagram showing the configuration of the error correction device of the optical disk according to a seventh embodiment and an eighth embodiment.

A configuration of an error correction device of an optical disk according to a seventh embodiment is shown in FIG. 46.

Comparing with the foregoing fourth to sixth embodiments shown in FIG. 21, the present seventh embodiment is different in that information on the presence or absence of prepit is outputted from a prepit decoder 13 to a prepit position information generating circuit 15. The prepit decoder 13 transmits the information on the presence or absence of prepit showing whether or not a bit pattern of the prepit reproduced from an optical disk 1 is a prepit sync or a prepit data "1" to the prepit position generating circuit 15.

Here, since the prepit data "0" has no prepit existing in the data write area, an error does not occur due to the prepit when reading, and the error is excluded.

Figure 47A:
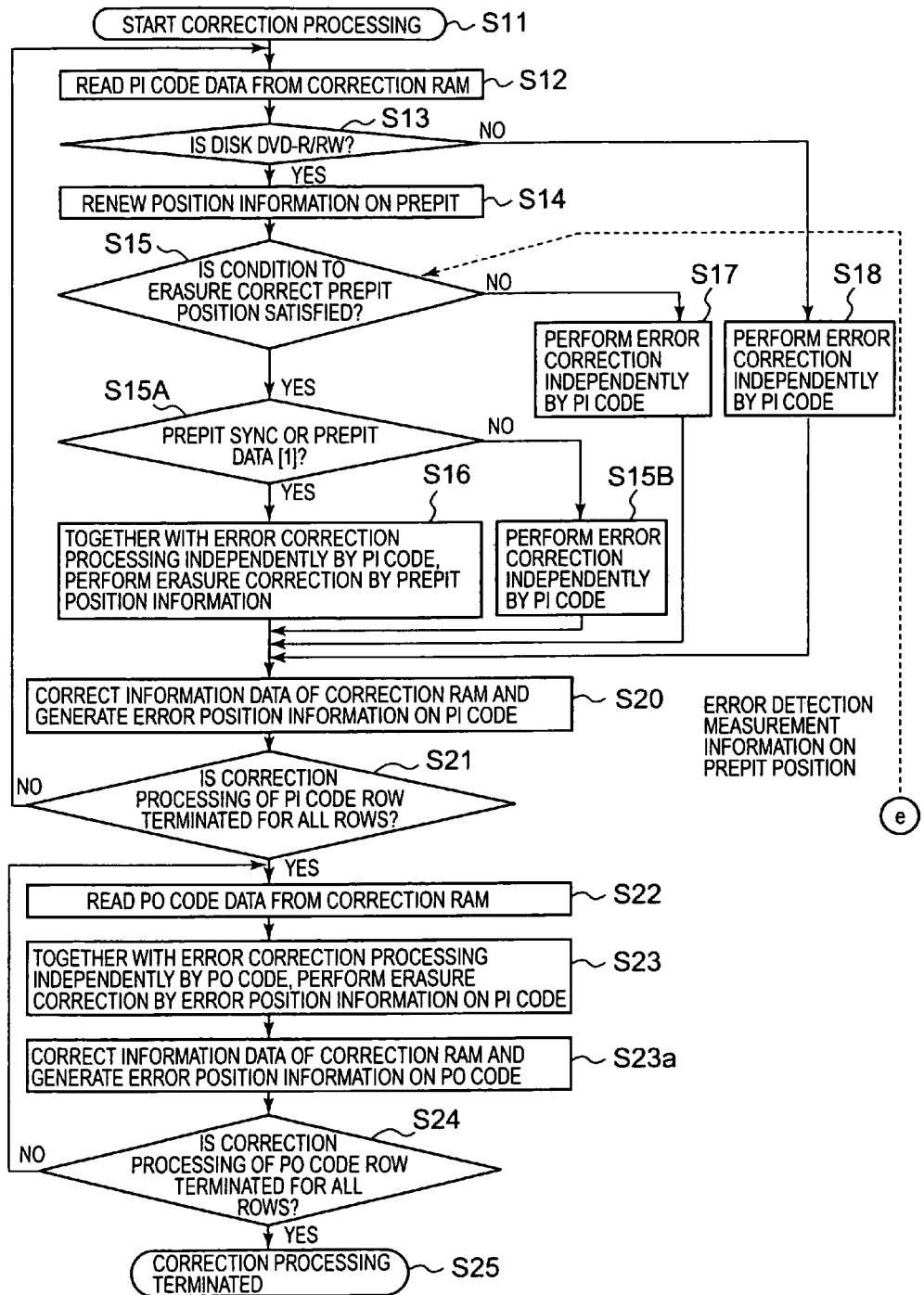
FIGS. 47a and 47b are portions of a flowchart showing a procedure of the processing in the error correction method of the optical disk according to the seventh embodiment.
Figure 47B:
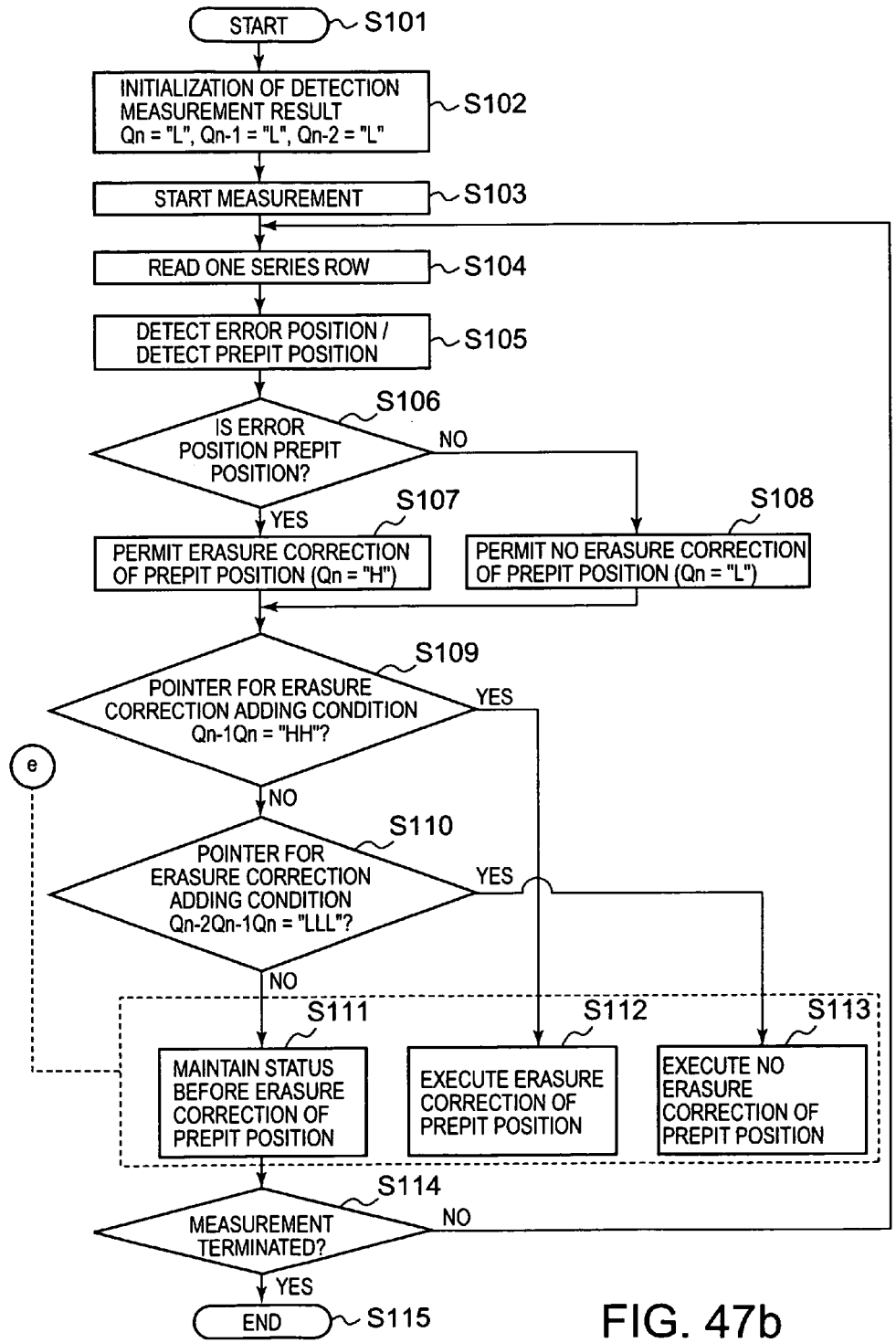

The processing procedure in the present seventh embodiment is shown in the flow chart of FIGS. 47a and 47b. Comparing with the processing procedure in the foregoing fourth embodiment shown in FIGS. 25a AND 25b, the present embodiment is different in that step S15A and step S15B are added between step S15 and step S16.

At step S15, the procedure determines whether or not the condition to erasure-correct the prepit position is satisfied.

In case this condition is satisfied, the procedure proceeds to step S15A, and determines whether or not the prepit position is a prepit sync or a prepit data "1".

In case the prepit position is a prepit sync or a prepit data "1", the procedure proceeds to the same step S16 as the foregoing fourth embodiment, and if not, the procedure proceeds to step S15B.

Figure 43:
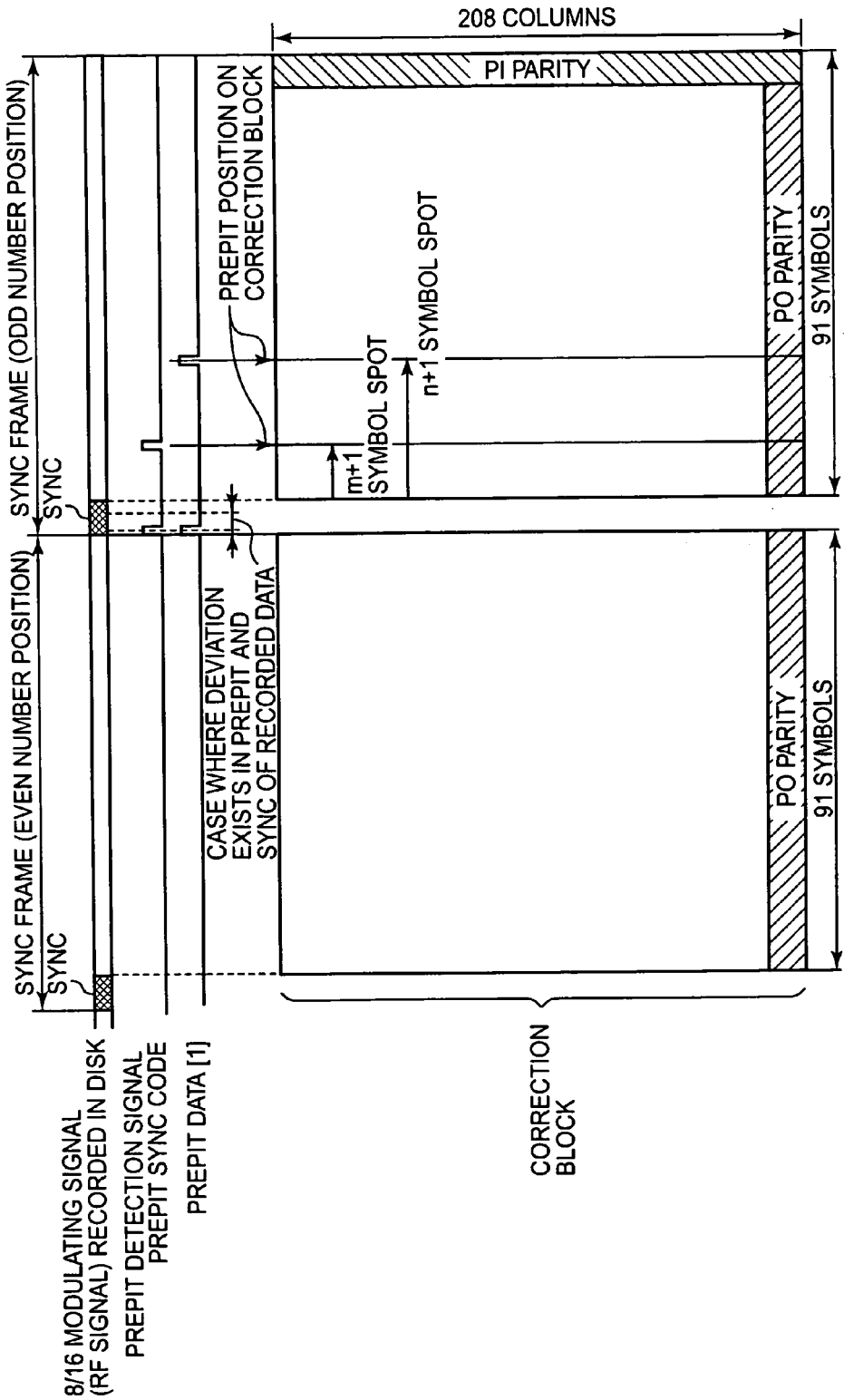
FIG. 43 is an explanatory drawing showing the positional relationship between the prepit detection signal and the correction block data in the odd number position of the correction block.

In case the prepit position is the prepit sync, the prepit position comes to the j+1 symbol spot and k+1 symbol spot shown in FIGS. 39 and 40 and the m+1 symbol spot shown in FIGS. 41 and 43.

In case the prepit position is the prepit data "1", the prepit position comes to the k+1 symbol spot shown in FIGS. 39 and 40 and the n+1 symbol spot shown in FIGS. 42 and 43.

In case the prepit position is not the prepit sync or the prepit data "1" at step S15A, at step S15B, an independent detection correction by a PI code is performed, and the procedure proceeds to step S20.

The prepit position information generating circuit 15 generates prepit position information for every PI code on a correction block.

The error measurement circuit 16 of the prepit position, based on the correction status of an error correction circuit 5, performs detection and measurement for each of the prepit positions of the PI code row in which the prepit sync or the prepit data "1" exists, that is, for each of the j+1 symbol spot, the k+1 symbol spot, the m+1 symbol spot, and the n+1 symbol spot like the position of the prepit error "a" shown in FIG. 34 similarly to the foregoing fourth embodiment, and in case the condition α is satisfied, a signal to the effect that the pointer for erasure correction is added is transmitted to the system controller 14.

The error correction circuit 5 receives the signal to the effect that the pointer for erasure correction is added to the prepit position, and in case the correction processing of the PI code row where the prepit sync or the prepit data "1" exists is performed, the pointer for erasure correction is added to the prepit position, thereby performing the error correction.

In case there exists a prepit sync of the even number position in the PI code row to be corrected, the pointer for erasure correction is added to the j+1 symbol spot and the k+1 symbol spot of the PI code row, thereby performing the erasure correction. In case there exists no prepit in the PI code row to be corrected, the independent detection correction by the PI code is performed.

In case the errors occur like the correction block B shown in FIG. 31, for the PI rows-2-1 to 16, the pointer for erasure correction is added to the PO-rows 1 to 4, and together with the independent correction by the PI code, the erasure correction is performed.

For the PI rows-2-17 to 2-33, the pointer for erasure correction is added to the positions of the PO row-2 and the PO row-4, and together with the independent correction by the PI code, the erasure correction is performed. For the PI rows other than the foregoing, the independent correction by the PI code is performed. In this manner, since all the errors can be corrected by the PI correction only, there is no need to perform the correction applied thrice of PO-PI-PO, thereby improving the reproduction performance.

In the present seventh embodiment, in case the prepit position on the correction block is the prepit sync, it comes to the j+1 symbol spot and the k+1 symbol spot, and further the m+1 symbol spot. Further, in case the prepit position on the correction block is the prepit data "1", it comes to the k+1 symbol spot and the n+1 symbol spot. However, being not limited to this, these positions may be the positions in conformity to the standard or may be controlled by the system controller 14.

Further, in the present seventh embodiment, the prepit positions on the correction block are set to the even number positions only since the prepits are generally prone to abound in the even number positions. However, the prepit positions on the correction block may be set to the odd number positions only or set to both the even number positions and the odd number positions.

Eighth Embodiment

Figure 48A:
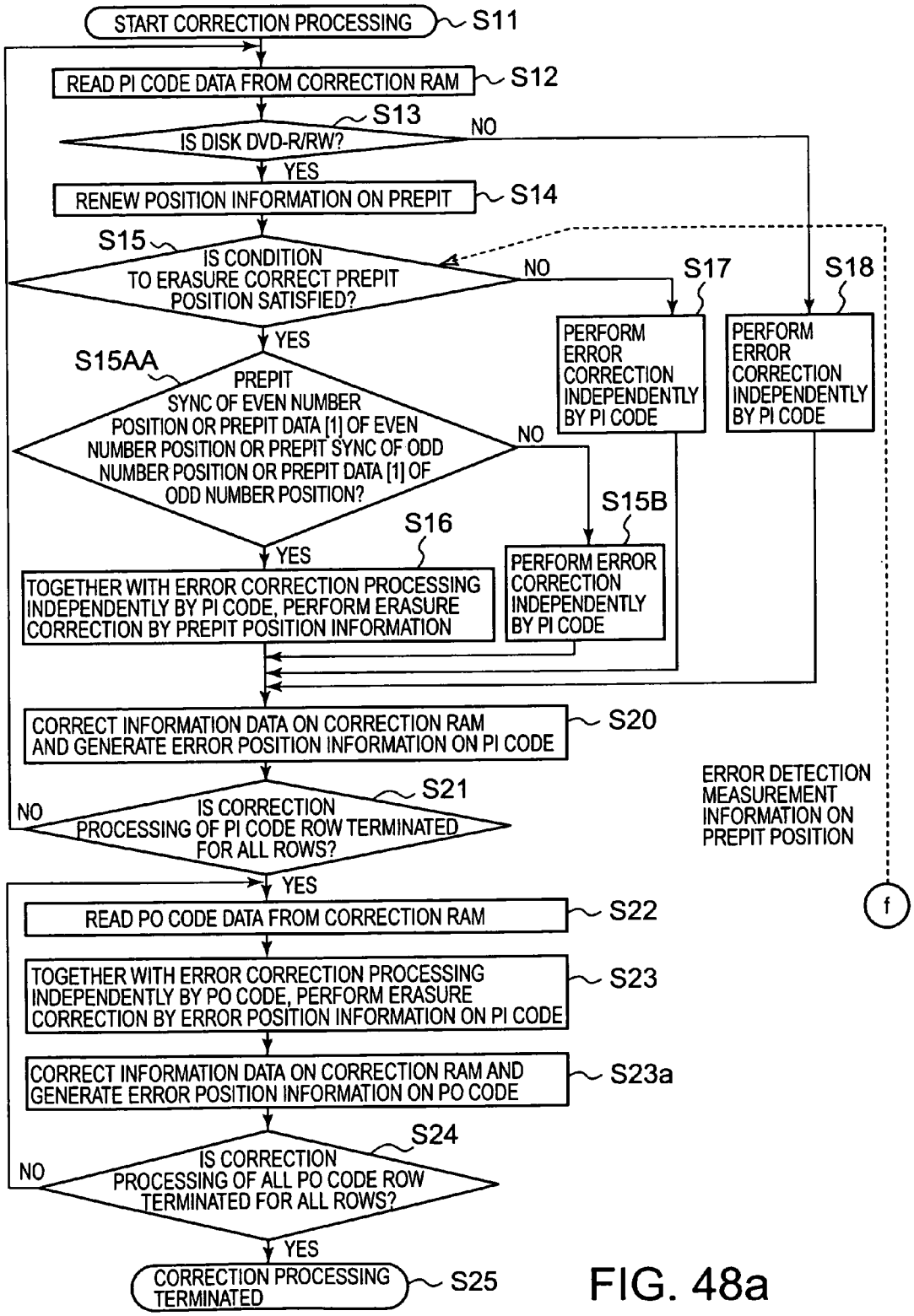
FIGS. 48a and 48b are portions of a flowchart showing a procedure of the processing in the error correction method of the optical disk according to the eighth embodiment.
Figure 48B:
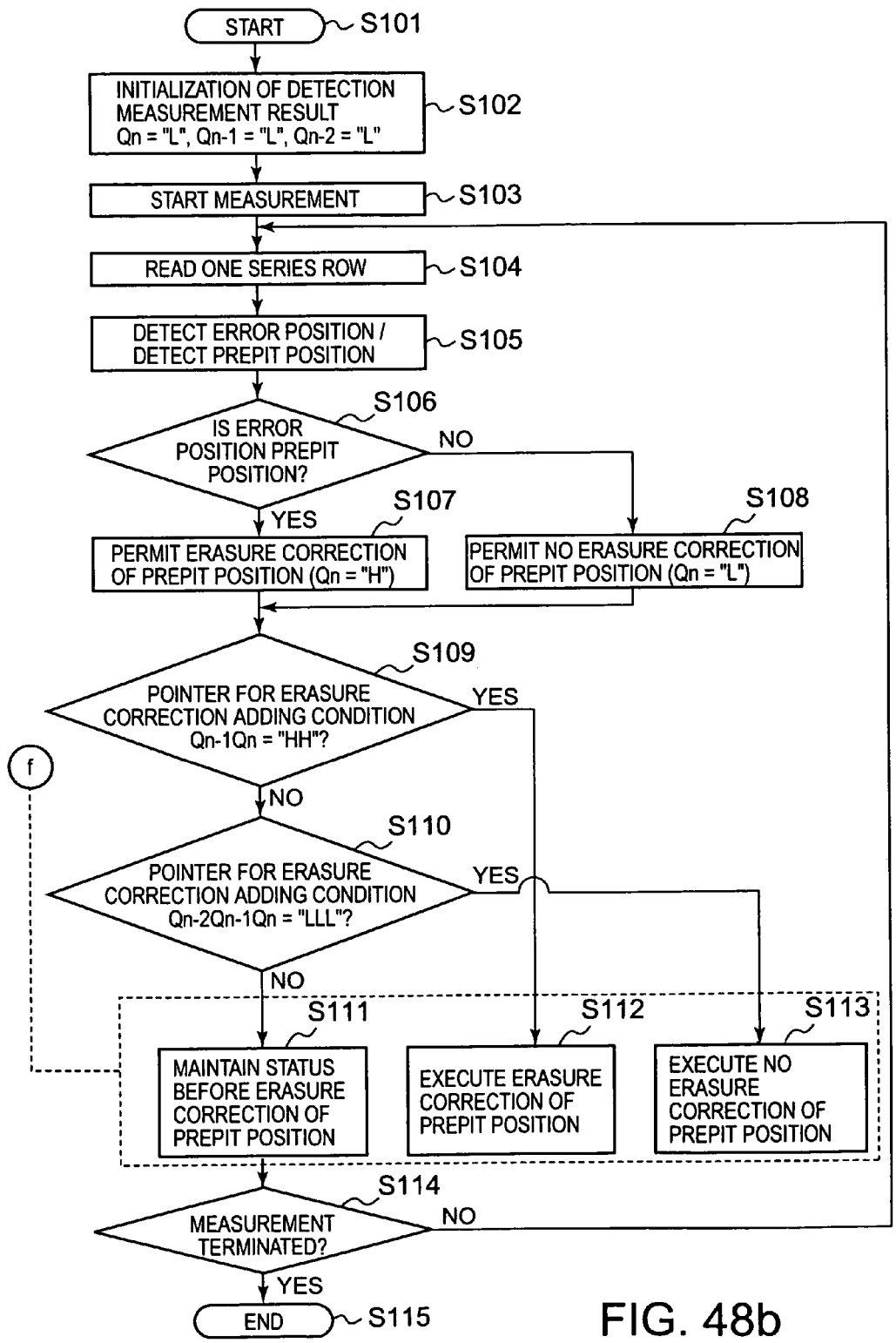

A configuration of an error correction device of an optical disk according to an eight embodiment is shown in FIG. 46 similarly to the foregoing seventh embodiment, and the processing procedure is shown in FIGS. 48a and 48b.

Comparing with the processing procedure in the foregoing seventh embodiment shown in FIGS. 47a and 47b, the present embodiment is different in the processing at step S15AA. That is, a prepit decoder 13 generates information on the presence or absence of a prepit showing whether or not a bit pattern of the prepit reproduced from an optical disk 1 is a prepit sync of an even number position, a prepit data "1" of an even number position, a prepit sync of an odd number position, and a prepit data "1" of an odd number position, and transmits the information to a prepit position information generating circuit 15.

The prepit position information generating circuit 15 generates prepit position information for every PI code row. In case the bit pattern of the reproduced prepit is a prepit sync, the prepit position comes to a j+1 symbol spot and a k+1 symbol spot, and further comes to an m+1 symbol spot.

In case the bit pattern of the prepit is a prepit data "1", the prepit position comes to a k+1 symbol position and an n+1 symbol position.

An error measurement circuit 16 of the prepit position, based on the correction status of an error correction circuit 5, performs detection and measurement for each of the prepit positions of the PI code row in which the prepit sync or the prepit data "1" exists, that is, for each of a j+1 symbol spot, a k+1 symbol spot, an m+1 symbol spot, and an n+1 symbol spot like the prepit error "a" shown in FIG. 34, and in case the condition α is satisfied, a signal to the effect that a pointer for erasure correction is added is transmitted to a system controller 14.

The error correction circuit 5 receives a signal to the effect that the pointer for erasure correction is added to the prepit position from the system controller 14, and in case the correction processing of the PI code row in which the prepit sync or the prepit data "1" exists is performed, the pointer for erasure correction is added to the prepit position of either the even number position or the odd number position in which the prepit sync or the prepit data "1" exists, thereby performing error correction.

In case there exists the prepit sync of the even number position in the PI code row to be corrected, the pointer for erasure correction is added to the j+1 symbol spot and the k+1 symbol spot of the PI code row, thereby performing the erasure correction. In case there exists no prepit in the PI code row to be corrected, an independent correction by the PI code is performed.

In case the errors as shown in FIG. 38 occur, the pointer for erasure correction is added to the PO rows-1 to 4 for the PI rows-1 to 8, and together with the independent correction by the PI code, the erasure correction is performed.

For the PI rows-9 to 16, the pointer for erasure correction is added to the positions of the PO rows-5 to 7, and together with the independent correction by the PI code, the erasure correction is performed.

For the PI rows-17 to 25, the pointer for erasure correction is added to the positions of the PO rows-6 and 8, and together with the independent correction by the PI code, the erasure correction is performed. For the PI rows other than these, the independent correction by the PI code is performed.

In this manner, according to the present eighth embodiment, the pointer for erasure correction of the PI correction is added to or erased from the prepit position according to the error occurrence status of the prepit position, so that the occurrence status of the error occurring due to the effect of the prepit can be flexibly dealt with, thereby improving the reproduction performance.

According to the fourth to fifth embodiments described as above, in case the data recorded in a recordable disk such as DVD-R/RW is reproduced, when an error occurs in the recorded data due to the effect of the prepit of the preformat information recorded in a non-erasable state in advance, the pointer for erasure correction of the PI correction is added to or erased from the prepit position according to the error occurrence status of the prepit position, so that the correction applied twice of PI-PO can be realized and the reproduction performance can be improved.

What is claimed is:

1. An error correction device of an optical disk reproduction unit for reproducing recorded information from an optical disk recorded with a code row data added with an error code in the same direction as a sequence of recorded information in a recording portion of the optical disk and with recorded guide information recorded in advance in an inerasable state before the code row data is recorded as a recorded guide for recording said code row data in said optical disk, comprising:
    a first position detection portion configured to detect a physical configurational singular point in said recorded guide information as a first position;
    a second position generating portion configured to generate a second position replacing said first position detected by said first position detection portion with said code row data position; and
    an error correction portion configured to erasure-correct said code row data error by using said second position.

2. The error correction device of the optical disk unit according to claim 1, wherein said optical disk is a recordable digital versatile disk including DVD-R and DVD-RW, and said first position is a prepit recorded in advance as recorded guide information in said digital versatile disk.

3. The error correction device of the optical disk unit according to claim 1, wherein said first position is said physical configurational singular point artificially formed for said recording portion of said optical disk, and a position of said physical configurational singular point is detected as said first position when said recorded information is reproduced from said optical disk, and said second position is generated by the relative positional relationship between said physical configurational singular point and said code row data.

4. The error correction device of the optical disk unit according to claim 3, wherein said optical disk is a recordable digital versatile disk including DVD-R and DVD-RW, and said first position is a prepit recorded in advance as recorded guide information in said digital versatile disk.

5. The error correction device of the optical disk unit according to claim 1, wherein the positional relationship between said physical configurational singular point artificially formed for said recording portion of said optical disk and said code row data obtained by reproducing said optical disk is detected, and based on this detection result, said second position is decided.

6. The error correction device of the optical disk unit according to claim 5, wherein said optical disk is a recordable digital versatile disk including DVD-R and DVD-RW, and said first position is a prepit recorded in advance as recorded guide information in said digital versatile disk.

7. The error correction device of the optical disk unit according to claim 1, wherein, when said first position is located between said code row data and a code row data in its vicinity, said second position comprises said second position information generating portion taken as a position including even the code row data in front and in rear replacing said first position with the position of said code row data.

8. The error correction device of the optical disk unit according to claim 7, wherein said optical disk is a recordable digital versatile disk including DVD-R and DVD-RW, and said first position is a prepit recorded in advance as recorded guide information in said digital versatile disk.

9. An error correction device of an optical disk reproduction unit for reproducing recorded information from an optical disk recorded with a first code row data added with an error code in the same direction as a sequence of recorded information in a recording portion of the optical disk and with recorded guide information recorded in advance in an inerasable state before said first code row is recorded as a recorded guide for recording said first code row data in said optical disk, comprising:
    a first position detection portion configured to detect a physical configurational singular point in said recorded guide information as a first position;
    a second position generating portion configured to generate a second position replacing said first position detected by said first position detection portion with said first code row data position;
    an error detection portion configured to detect a data error of said second position; and
    an error measurement portion configured to measure the number of errors detected by said error detection portion,
    wherein, when the number of errors measured for a predetermined period by said error measurement portion satisfies a predetermined value, errors of said first code row data are erasure-corrected by using said second position.

10. The error correction device according to claim 9, wherein said optical disk is DVD-R and DVD-RW disks, and based on whether or not said first detection portion detects a prepit, said second position is generated.

11. The error correction device according to claim 10, wherein said first detection portion has means for recognizing a bit pattern of the prepit, and said second position generating portion takes a first predetermined position (J) and a second predetermined position (K) as second positions (where, J<K) in case the bit pattern of the prepit detected by said first detection portion is a prepit sync, and takes a second predetermined position (K) as a second position in case the bit pattern of said prepit is a prepit data 1.

12. The error correction device according to claim 10, wherein said first detection portion has means for recognizing the bit pattern of the prepit and means for recognizing in which frame of an even number sync frame and an odd number sync frame of said first code row data, the prepit detected by said first detection portion exists,
    wherein said second position generating portion takes a first predetermined position (J) and a second prepit position (K) as second positions in case the prepit detected by said first detection portion exists in the even number sync frame of said first code row data, and moreover, the bit pattern of the prepit detected by said first detection portion is a prepit sync,
    wherein said second position generating portion takes a second predetermined position (K) as a second position in case the prepit detected by said first detection portion exists in the even number sync frame of said first code row data, and moreover, the bit pattern of the prepit detected by said first detection portion is a prepit data 1,
    wherein said second position generating portion takes a third predetermined position (L) as a second position in case the prepit detected by said first detection portion exists in the odd number sync frame of said first code row data, and moreover, the bit pattern of the prepit detected by said first detection portion is a prepit sync, and wherein said second position generating portion takes a fourth predetermined position (M) as a second position (where, J<K<L<M) in case the prepit detected by said first detection portion exists in the odd number sync frame of said first code row data, and moreover, the bit pattern of the prepit detected by said first detection portion is a prepit data 1.

13. The error correction device according to claim 9, wherein the error detection portion for detecting the error of said second position data detects the error position from said first code row data.

14. The error correction device according to claim 13, wherein said optical disk is DVD-R and DVD-RW disks, and said second position is generated based on the information as to whether or not said first detection portion detects the prepit.

15. The error correction device according to claim 14, wherein said first detection portion has means for recognizing the bit pattern of the prepit, and
   wherein said second position generating portion takes a first predetermined position (J) and a second predetermined position (K) as second positions (where, J<K) in case the bit pattern of the prepit detected by said first detection portion is a prepit sync, and takes a second predetermined position (K) as a second position in case the bit pattern of said prepit is a pit data 1.

16. The error correction device according to claim 14, wherein said first detection portion has means for recognizing the bit pattern of the prepit and means for recognizing in which frame of the even number sync frame and the odd number sync frame of said first code row data, the prepit detected by said first detection portion exists,
   wherein said second position generating portion takes a first predetermined position (J) and a second prepit position (K) as second positions in case the prepit detected by said first detection portion exists in the even number sync frame of said first code row data, and moreover, the bit pattern of the prepit detected by said first detection portion is a prepit sync,
   wherein said second position generating portion takes a second predetermined position (K) as a second position in case the prepit detected by said first detection portion exists in the even number sync frame of said first code row data, and moreover, the bit pattern of the prepit detected by said first detection portion is a prepit data 1,
   wherein said second position generating portion takes a third predetermined position (L) as a second position in case the prepit detected by said first detection portion exists in the odd number sync fame of said first code row data, and moreover, the bit pattern of the prepit detected by said first detection portion is a prepit sync, and
   wherein said second position generating portion takes a fourth predetermined position (M) as a second position (where, J<K<L<M) in case the prepit detected by said first detection portion exists in the odd number sync frame of said first code row data, and moreover, the bit pattern of the prepit detected by said first detection portion is a prepit data 1.

17. The error correction device according to claim 9, wherein the error detection portion for detecting the error of said second position detects the error position from the second code row data added with an error code in a direction different from said first code row.

18. The error correction device according to claim 17, wherein said optical disk is DVD-R and DVD-RW disks, and based on whether or not said first detection portion detects a prepit, said second position is generated.

19. The error correction device according to claim 18, wherein said first detection portion has means for recognizing the bit pattern of the prepit, and
   wherein said second generating portion takes a first predetermined position (J) and a second predetermined position (K) as second positions (where, J<K) in case the bit pattern of the prepit detected by said first detection portion is a prepit sync, and takes a second predetermined position (K) as a second position in case the bit pattern of said prepit is a prepit data 1.

20. The error correction device according to claim 19, wherein said first detection portion has means for recognizing in which frame of the even number sync frame and the odd number sync frame of said first code row data, the prepit detected by said first detection portion exists,
   wherein said second position generating portion takes a first predetermined position (J) and a second prepit position (K) as second positions in case the prepit detected by said first detection portion exists in the even number sync frame of said first code row data, and moreover, the bit pattern of the prepit detected by said first detection portion is a prepit sync,
   wherein said second position generating portion takes a second predetermined position (K) as a second position in case the prepit detected by said first detection portion exists in the even number sync frame of said first code row data, and moreover, the bit pattern of the prepit detected by said first detection portion is a prepit data 1,
   wherein said second position generating portion takes a third predetermined position (L) as a second position in case the prepit detected by said first detection portion exists in the odd sync frame of said first code row data, and moreover, the bit pattern of the prepit detected by said first detection portion is a prepit sync, and
   wherein said second position generating portion takes a fourth predetermined position (M) as a second position (where, J<K<L<M) in case the prepit detected by said first detection portion exists in the odd number sync frame of said first code row data, and moreover, the bit pattern of the prepit detected by said first detection portion is a prepit data 1.

* * * * *